United States Patent [19]

Nakabayashi et al.

[11] Patent Number: 5,283,304

[45] Date of Patent: Feb. 1, 1994

[54] FLUORINE-CONTAINING RESIN AND COATING COMPOSITION CONTAINING SAME AS MAIN COMPONENT

[75] Inventors: Akira Nakabayashi; Kaoru Ueyanagi, both of Nobeoka; Atsushi Shimizu, Tokyo; Hiromasa Sasahara, Nobeoka, all of Japan

[73] Assignee: Asahi Kasei Kogyo Kabushiki Kaisha, Osaka, Japan

[21] Appl. No.: 847,984

[22] PCT Filed: Aug. 12, 1991

[86] PCT No.: PCT/JP91/01074

§ 371 Date: Apr. 13, 1992

§ 102(e) Date: Apr. 13, 1992

[87] PCT Pub. No.: WO92/03485

PCT Pub. Date: Mar. 5, 1992

[30] Foreign Application Priority Data

Aug. 13, 1990 [JP] Japan ............................ 2-211706

[51] Int. Cl.$^5$ ............................ C08F 12/20
[52] U.S. Cl. ............................ 526/249; 526/265; 526/270; 526/250; 526/254; 526/255; 526/245
[58] Field of Search ............ 526/249, 265, 270, 250, 526/254, 255, 245

[56] References Cited

U.S. PATENT DOCUMENTS

4,908,410 3/1990 Malhotra .

FOREIGN PATENT DOCUMENTS

| 0080617 | 6/1983 | European Pat. Off. | 526/249 |
| 343527 | 11/1989 | European Pat. Off. | 526/249 |
| 0459369 | 12/1991 | European Pat. Off. | 526/249 |
| 61-264065 | 11/1986 | Japan | 526/249 |
| 62-292814 | 12/1987 | Japan | 526/249 |
| 3188105 | 8/1991 | Japan | 526/249 |
| 3281612 | 12/1991 | Japan | 526/249 |
| 3292347 | 12/1991 | Japan | 526/249 |
| 41216 | 1/1992 | Japan | 526/249 |

Primary Examiner—Joseph L. Schofer
Assistant Examiner—N. Sarofim
Attorney, Agent, or Firm—Armstrong, Westerman, Hattori, McLeland & Naughton

[57] ABSTRACT

A fluorine-containing resin being soluble in an organic solvent and having excellent compatibility with a curing agent, which contains Component (A) formed of a unit having the formula

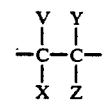

and at least one of Component (B)

formed of a unit having a cyclic hydrocarbon group introduced through a urethane bond in the molecule and Component (C) of a unit having the formula

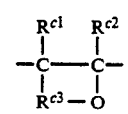

and which further optionally contains Component (D) of a unit formed from a vinyl monomer having a specific functional group, Component (E) of a unit formed from a vinyl monomer other than monomers forming the Components (A), (B), (C) and (D), and Component (T) of a unit formed from an acrylic resin having a specific substituent; and a coating composition containing said resin, (wherein V, Y, X, Z, $R^{c1}$, $R^{c2}$ and $R^{c3}$ are as defined in the specification).

22 Claims, 15 Drawing Sheets

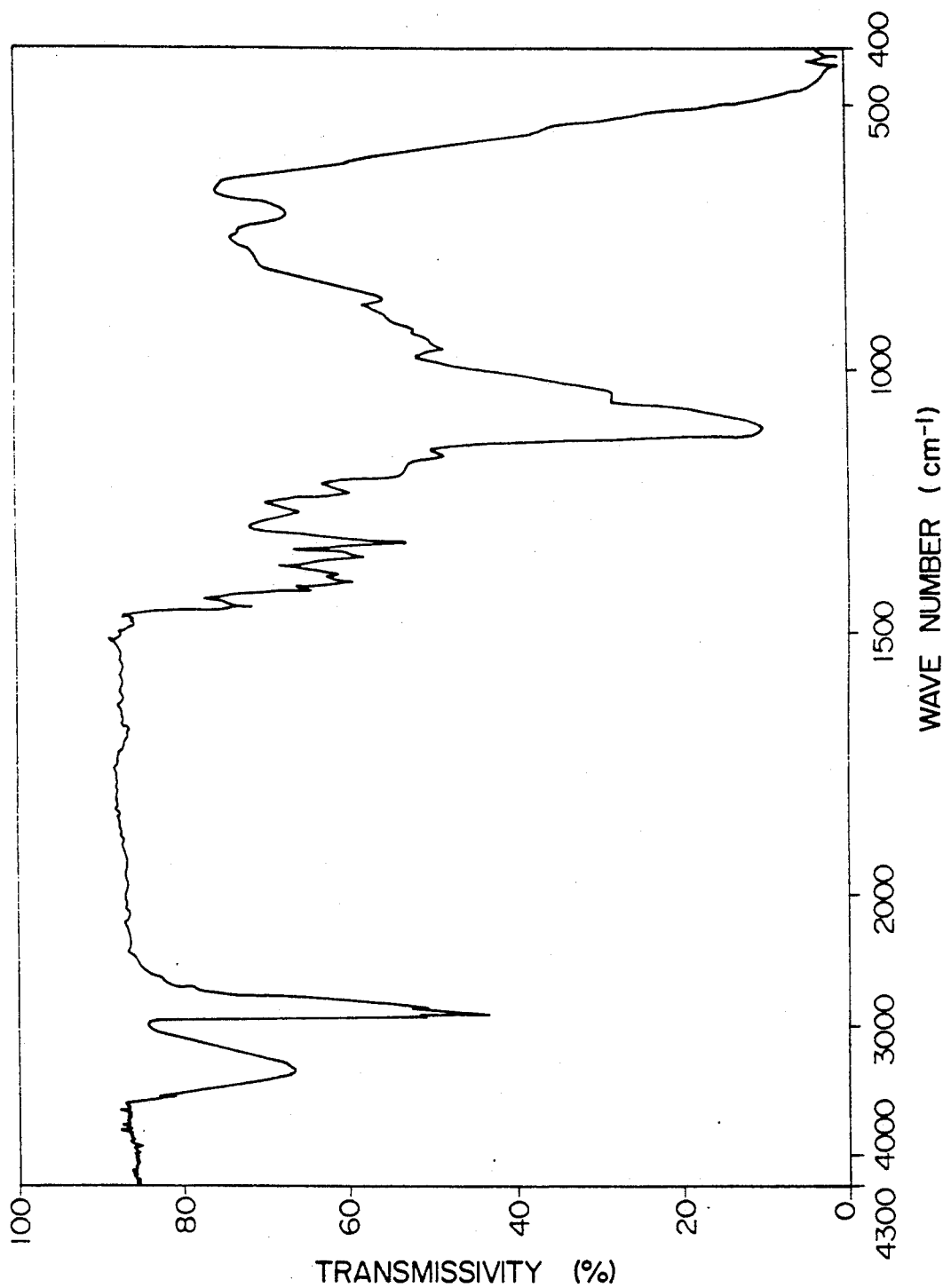

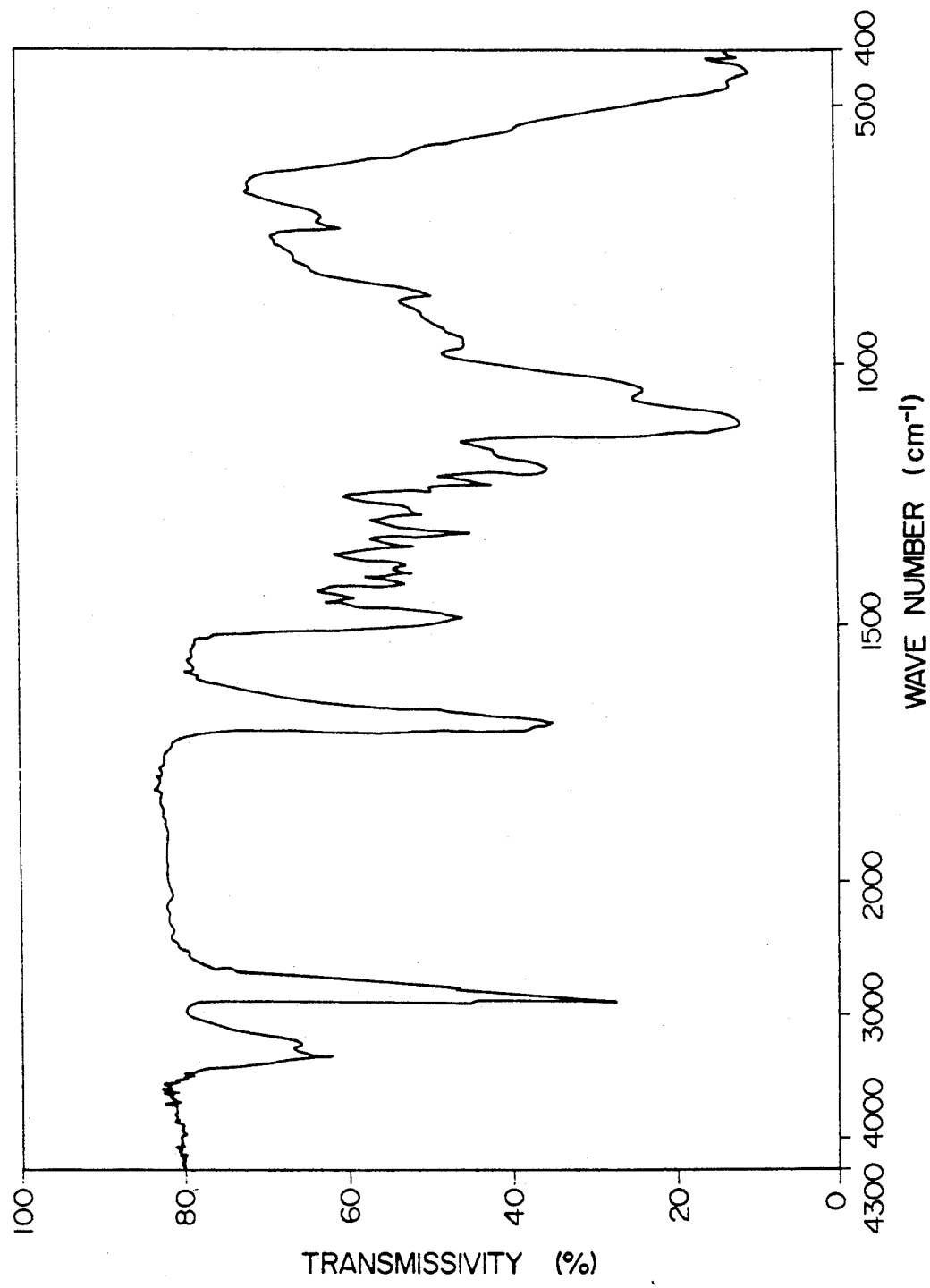

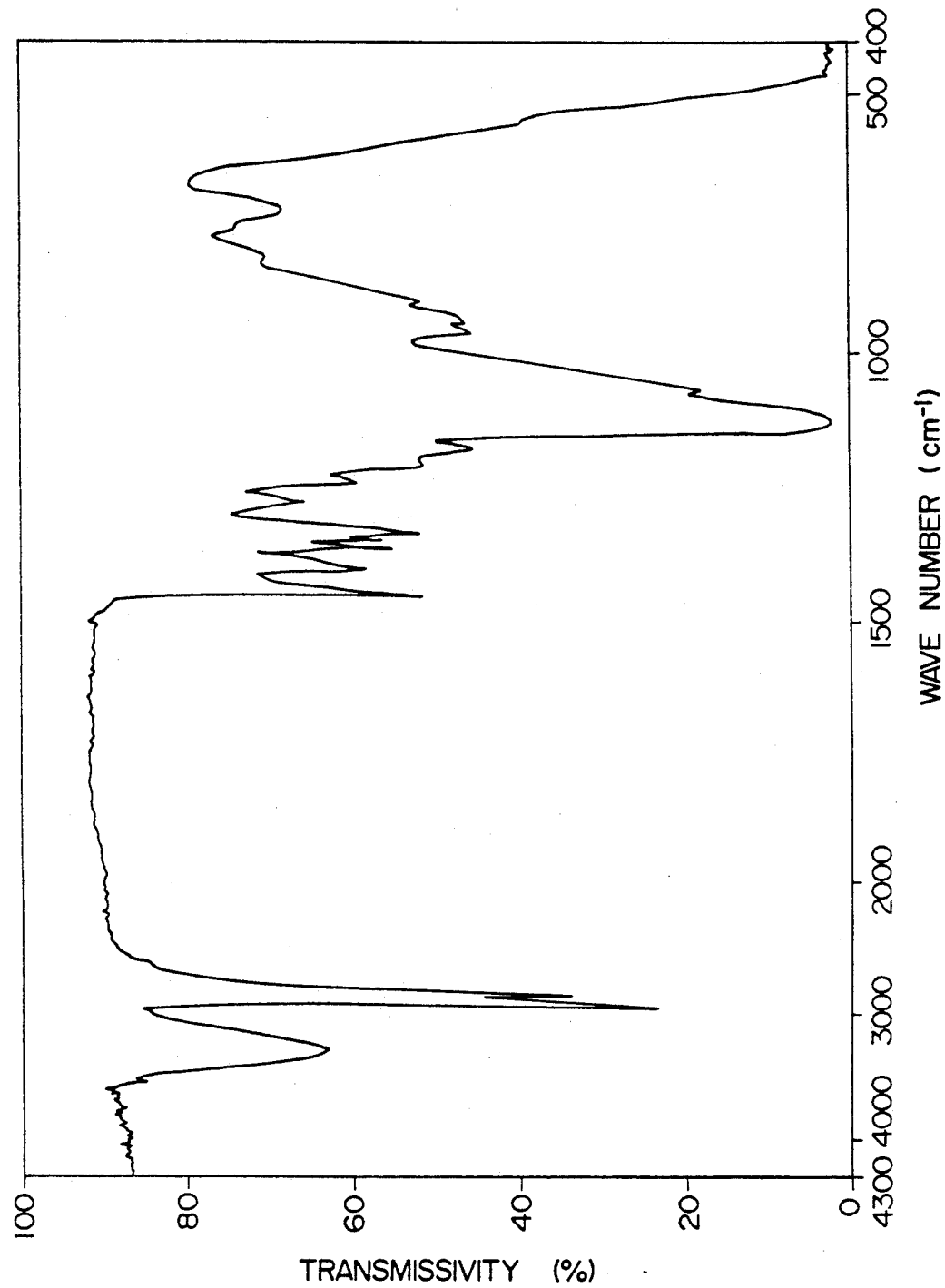

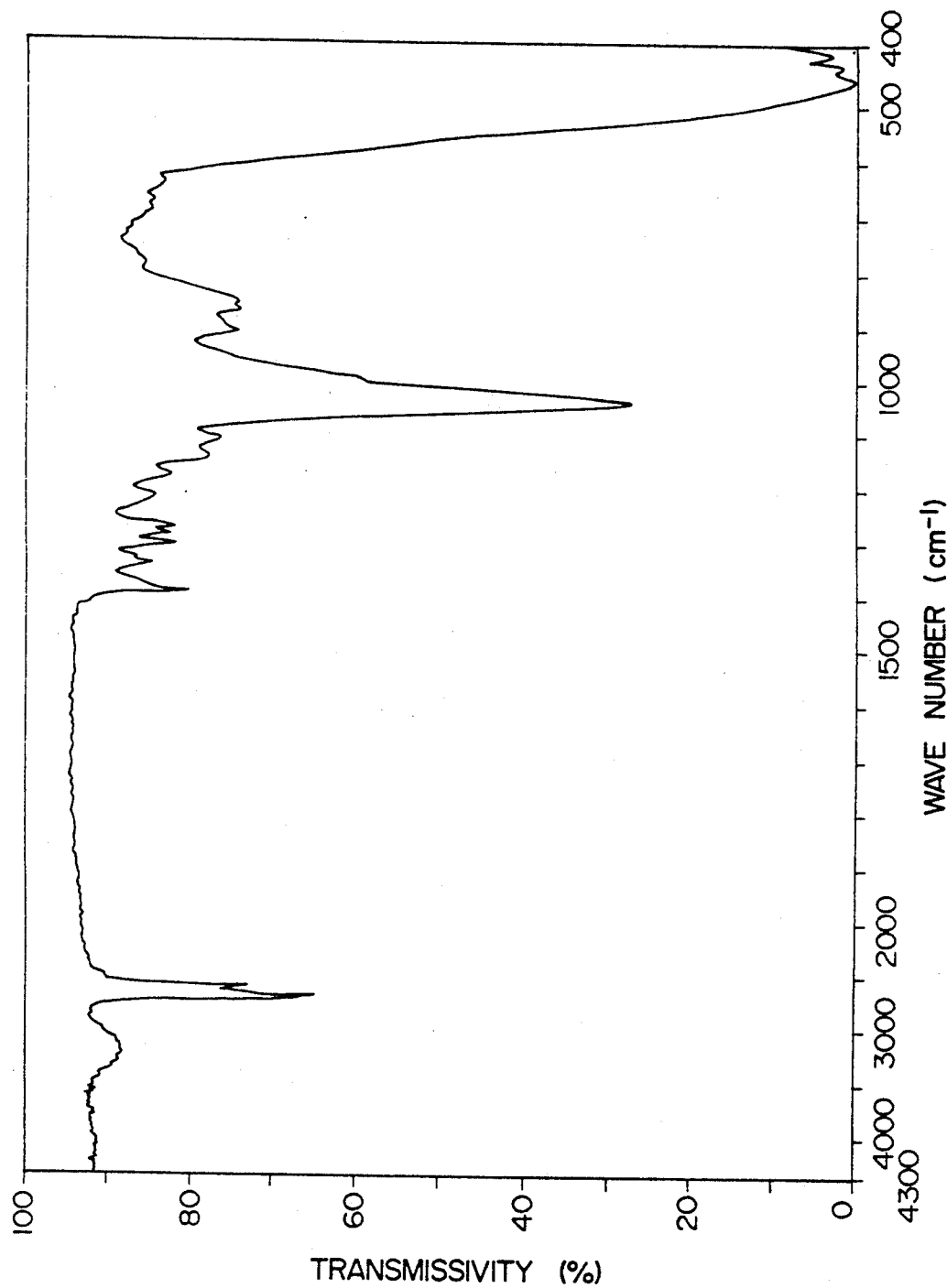

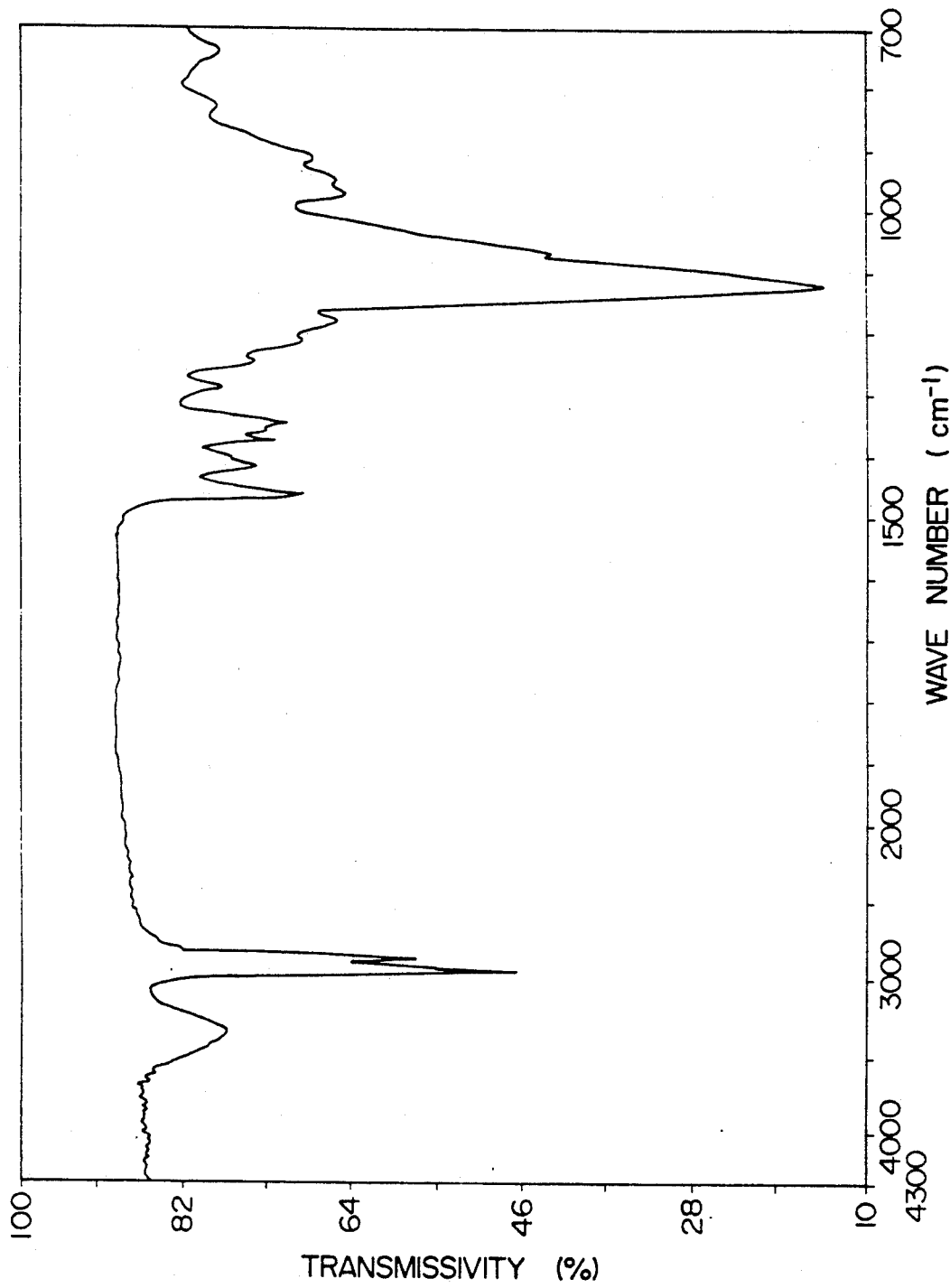

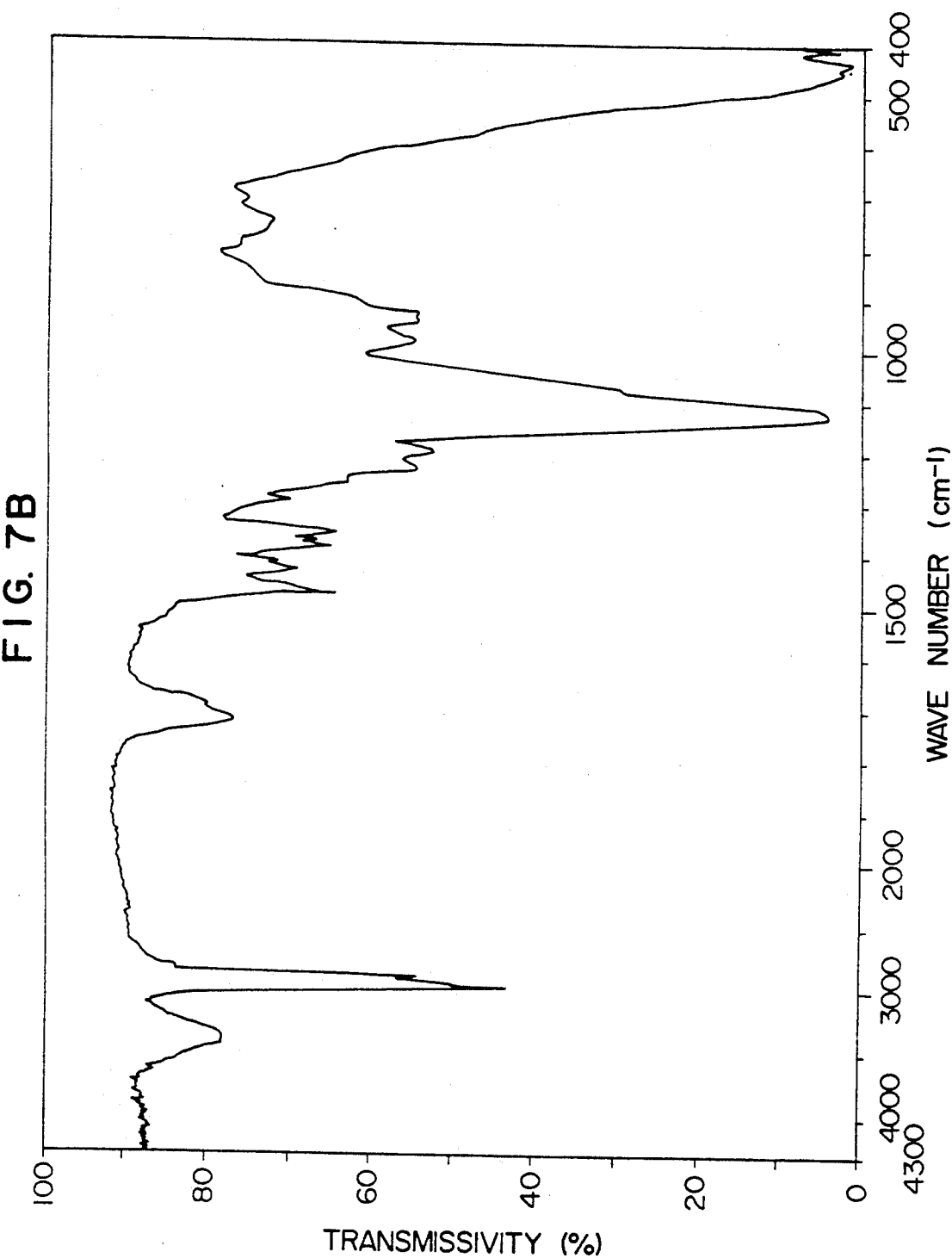

FLUORINE-CONTAINING RESIN AND COATING COMPOSITION CONTAINING SAME AS MAIN COMPONENT

TECHNICAL FIELD

The present invention relates to a novel fluorine-containing resin and a coating composition containing it as main component.

More specifically, it relates to a fluorine-containing resin which is soluble in an organic solvent and excellent in compatibility with a curing agent and to a fluorine-based coating composition containing the fluorine-containing resin as a main component, which is cold-curable and capable of giving a coating excellent in gloss, hardness and weatherability.

BACKGROUND OF THE INVENTION

A fluorine-containing resin has been and is widely used in many fields due to its remarkable excellence in heat resistance, mechanical properties, chemical resistance and weatherability. The use of it includes a use as a coating-forming component in a coating composition. For example, there is known a fluorine resin coating composition containing a tetrafluoroethylene polymer or a vinylidene fluoride polymer, which is used in the fields of chemical industry, foods, construction and machinery due to its excellence in lubricity, nontackiness, weatherability and chemical resistance.

The defect with the above fluorine resin coating composition is that it is required to be baked at a high temperature and the range of its use is inevitably limited. In recent years, therefore, it has been attempted to develop a fluorine-based, solvent-type coating composition which contains, as a main component, a fluorine-containing resin soluble in an organic solvent and containing a reactive group curable at room temperature.

Meanwhile, as fluorine-containing resins soluble in an organic solvent, there are known copolymers obtained from fluoroolefins and vinyl monomers copolymerizable therewith, as disclosed in JP-A-61-275311, JP-A-61-57690, JP-A-62-174213, JP-A-63-182312, U.S. Pat. No. 4,960,827, U.S. Pat. No. 4,859,755, U.S. Pat. No. 4,690,968, U.S. Pat. No. 4,436,773, U.S. Pat. No. 4,436,772, U.S. Pat. No. 4,345,057, U.S. Pat. No. 3,218,287, U.S. Pat. No. 3,166,524, U.S. Pat. No. 2,834,767 and EP-A-328,157.

In the above copolymers, however, alkyl vinyl ethers or special vinyl carboxylates are used as a comonomer, and these comonomers, which provide a coating with flexibility, are insufficient with respect to coating hardness, coating gloss, adhesion of a coating to a substrate, pot life, drying properties of a coating, compatibility with a curing agent or a solvent for a fluorine-containing resin, pigment dispersibility and storage stability. Thus, a fluorine-containing resin having well-balanced properties among these properties has not yet been developed.

DISCLOSURE OF THE INVENTION

The present invention has been made for the purpose of overcoming the defects of the above prior art fluorine-containing resin soluble in an organic solvent. It is an object of the present invention to provide a novel fluorine-containing resin excellent in solubility in an organic solvent and compatibility with a curing agent, and a fluorine-based coating composition containing it as a main component, which can give a coating excellent in gloss, hardness and weatherability and further having well-balanced properties among other various properties.

In view of the above points the present inventors have made a diligent study and consequently found that the above object can be achieved by the use of a specific monomer as a fluorine-containing resin. The present invention has been completed on the basis of the above finding.

That is, the present invention relates to a fluorine-containing resin comprising:

Component A: 20 to 95 mol % of a unit of the following general formula,

(wherein in each of V, X, Y and Z is, independently of the others, H, F, Cl, an alkyl group having 1 to 6 carbon atoms, or a halo-substituted alkyl group having 1 to 6 carbon atoms, and at least one of these is F), Component (B): 0 to 80 mol % of a unit of the following general formula,

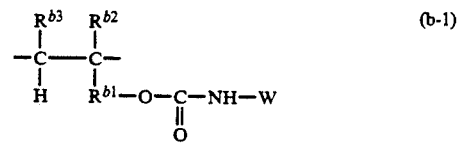

(wherein W is a monovalent organic group having a cyclic hydrocarbon group, $R^{b1}$ is a divalent organic group, and each of $R^{b2}$ and $R^{b3}$ is, independently of other, a hydrogen atom or an alkyl group having 1 to 8 carbon atoms), and Component (C): 0 to 80 mol % of a unit of the following general formula,

(wherein each of $R^{c1}$ and $R^{c2}$ is, independently of the other, hydrogen, an aliphatic hydrocarbon group having 1 to 8 carbon atoms or an alicyclic hydrocarbon group, $R^{c3}$ is a divalent organic group which can have any substituent), provided that the amounts of Components (B) and (C) are not simultaneously zero),
and a coating composition containing said fluorine-containing resin as a main component.

BRIEF DESCRIPTION OF DRAWINGS

FIG. 1A and FIG. 1B show IR spectra of a raw material (resin 2-A) and a product (polyol (1)).

FIG. 2A and FIG. 2B show IR spectra of a raw material (resin 2-B) and a product (polyol (3)).

FIG. 3A, FIG. 3B and FIG. 3C show IR spectra of copolymers obtained in Examples 3-1 to 3-3.

FIG. 7B is an infrared absorption spectrum of the fluorine-containing copolymer obtained in Example 10-3.

MOST PREFERRED EMBODIMENTS FOR WORKING THE INVENTION

Figure 2B:
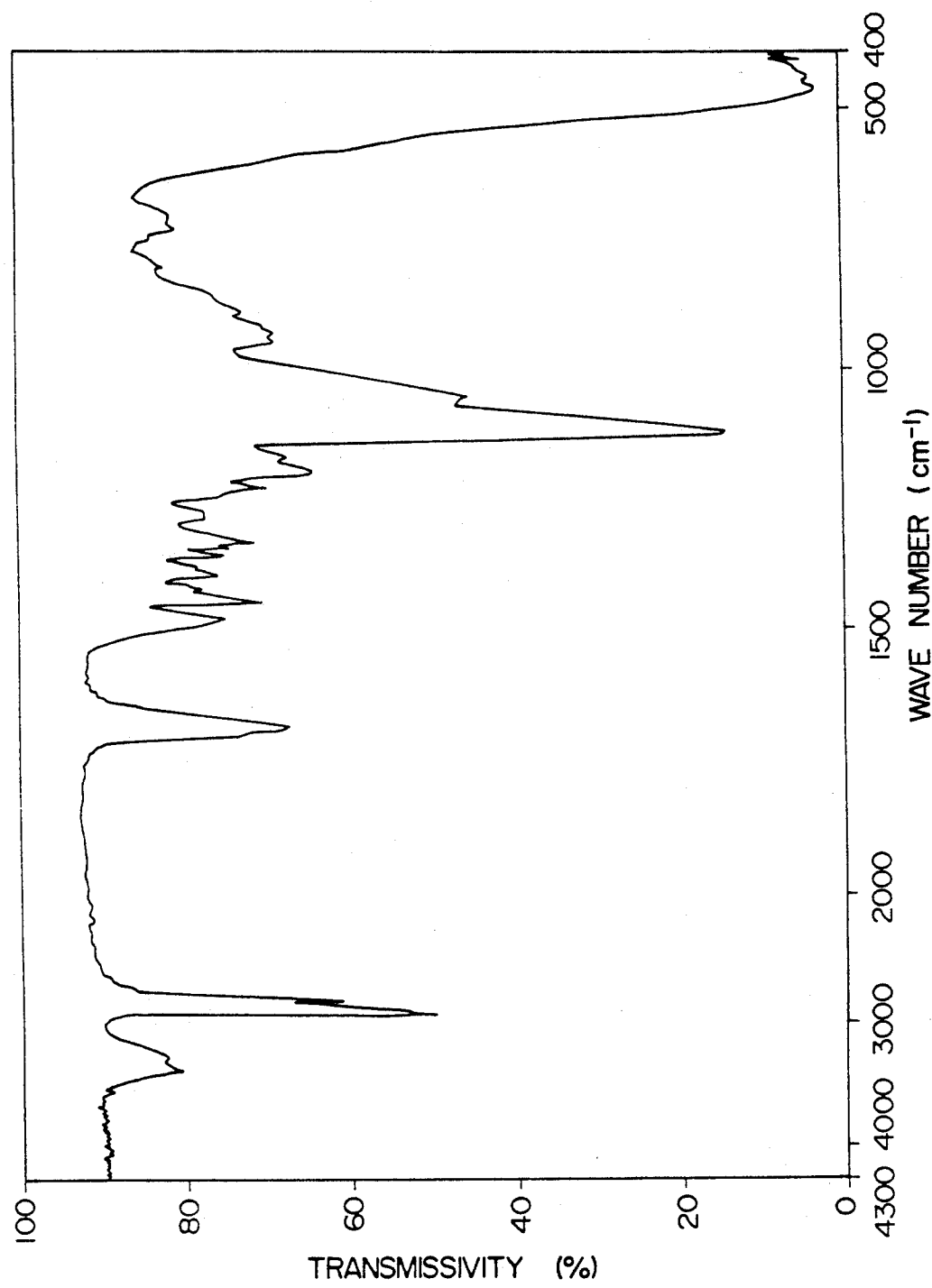

The present invention will be detailed hereinafter.

In the fluorine-containing resin of the present invention, each component can be formed by subjecting corresponding monomers and/or resins to a copolymerization method and/or a blending method.

As the vinyl monomer to form Component (A), there is used a monomer of the formula (a-2),

(wherein each of V, X, Y and Z is, independently of the others, H, F, Cl, an alkyl group having 1 to 6 carbon atoms, or a halo-substituted alkyl group having to 6 carbon atoms, and at least one of these is F).

Specific examples of the above vinyl monomer are fluoroethylene type compounds such as
$CH_2=CF_2$, $CHF=CF_2$, $CF_2=CF_2$, $CH_2=CHF$, $CClF=CF_2$, $CHCl=CF_2$, $CCl_2=CF_2$, $CClF=CClF$, $CHF=CCl_2$, $CH_2=CClF$ and $CCl_2=CClF$;
fluoropropene type compounds such as
$CF_3CF=CF_2$, $CF_3CF=CHF$, $CF_3CH=CF_2$,
$CF_3CF=CH_2$, $CF_3CF=CHF$, $CHF_2CF=CHF$,
$CF_3CH=CH_2$, $CH_3CF=CF_2$, $CH_3CH=CF_2$,
$CH_3CF=CH_2$, $CF_2ClCF=CF_2$, $CF_3CCl=CF_2$,
$CF_3CF=CFCl$, $CF_2ClCCl=CF_2$,
$CF_2ClCF=CFCl$, $CFCl_2CF=CF_2$,
$CF_3CCl=CClF$, $CF_3CCl=CCl_2$, $CClF_2CF=CCl_2$,
$CCl_3CF=CF_2$, $CF_2ClCCl=CCl_2$,
$CFCl_2CCl=CCl_2$, $CF_3CF=CHCl$,
$CClF_2CF=CHCl$, $CF_3CCl=CHCl$,
$CHF_2CCl=CCl_2$, $CF_2ClCH=CCl_2$,
$CF_2ClCCl=CHCl$, $CCl_3CF=CHCl$,
$CF_2ClCF=CF_2$, $CF_2BrCH=CF_2$, $CF_3CBr=CHBr$,
$CF_2ClCBr=CH_2$, $CH_2BrCF=CCl_2$,
$CF_3CBr=CH_2$, $CF_3CH=CHBr$, $CF_2BrCH=CHF$
and $CF_2BrCF=CF_2$;
and fluoroolefin compounds having 4 or more carbon atoms such as
$CF_3CF_2CF=CF_2$, $CF_3CF=CFCF_3$,
$CF_3CH=CFCF_3$, $CF_2=CFCF_2CHF_2$,
$CF_3CF_2CF=CH_2$, $CF_3CH=CHCF_3$,
$CF_2=CFCF_2CH_3$, $CF_2=CFCH_2CH_3$,
$CF_3CH_2CH=CH_2$, $CF_3CH=CHCH_3$,
$CF_2=CHCH_2CH_3$, $CH_3CF_2CH=CH_2$,
$CFH_2CH=CHCFH_2$, $CH_3CF_2CH=CH_2$,
$CH_2=CFCH_2CH_3$, $CF_3(CF_2)_2CF=CF_2$ and
$CF_3(CF_2)_3CF=CF_2$ Of the above compounds, preferred are fluoroethylene and fluoropropene compounds of the formula (a-3),

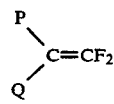

(wherein each of P and Q is, independently of the other, H, F, Cl or $CF_3$), and particularly preferred are tetrafluoroethylene ($CF_2=CF_2$), chlorotrifluoroethylene ($CF_2=CFCl$) and hexafluoropropene ($CF_2=CFCF_3$) Further, among these compounds, chlorotrifluoroethylene is the most preferred with respect to the balance of properties such as the compatibility of a fluorine-containing resin with a solvent and a curing agent and the weatherability of a coating.

The above fluoroolefins may be used alone or in combination.

In the fluorine-containing resin of the present invention, the content of Component (A) is 20 to 95 mol %, preferably 40 to 60 mol %. When this content is less than 20 mol %, the weatherability is insufficient. When it exceeds 95 mol % the solubility in an organic solvent decreases. The "content" refers to an amount based on the total resin amount, and the "total resin amount" refers to a sum total of Components (A), (B) and (C) or a sum total of Components (A), (B), (C), (D) and (E) when Components (D) and (E) to be described later are present.

The vinyl monomer to form Component (B) has the following general formula.

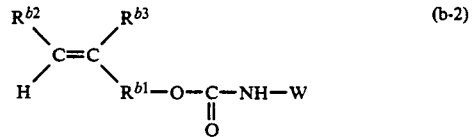

(wherein W is a monovalent organic group having a cyclic hydrocarbon group, $R^{b1}$ is a divalent organic group, and each of $R^{b2}$ and $R^{b3}$ is, independently of the other, a hydrogen atom or an alkyl group having 1 to 8 carbon atoms).

The above vinyl monomer can be obtained by reacting a vinyl monomer having a hydroxyl group, represented by

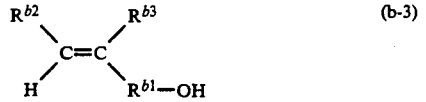

(wherein $R^{b1}$ is a divalent organic group, and each of $R^{b2}$ and $R^{b3}$ is, independently of the other, a hydrogen atom or an alkyl group having 1 to 8 carbon atoms), with a monoisocyanate having a cyclic hydrocarbon group.

Component (B) is introduced into the fluorine-containing resin by any one of the following methods: [1] a method in which the monomer of the above formula (b-2) is allowed to be present as a comonomer together with other monomer(s) when the fluorine-containing resin is produced, thereby to introduce the above Component (B) into the fluorine-containing resin, [2] a method in which the vinyl monomer having a hydroxyl group (formula (b-3)) is charged into a reactor together with other desired vinyl monomers and the monoisocyanate having a cyclic hydrocarbon group, thereby to simultaneously carry out a polymerization reaction and a urethane group forming reaction, and [3] a method in which a fluorine-containing resin having a hydroxyl group is first prepared and then the monoisocyanate having a cyclic hydrocarbon group is allowed to react with the hydroxyl group of the fluorine-containing resin.

In the reaction between the vinyl monomer having a hydroxyl group and the monoisocyanate having a cyclic hydrocarbon group, or in the reaction between the fluorine-containing resin having a hydroxyl group and the monoisocyanate having a cyclic hydrocarbon group, a solvent may be absent, or the reaction may be carried out in the presence of a solvent such as toluene, xylene, ethyl acetate, butyl acetate, cellosolve, acetate, methyl ether ketone or methyl isobutyl ketone. Further, a known urethanation-promoting catalyst such as dibutyltin dilaurate may be added to promote the reaction.

The reaction temperature is usually between room temperature and 120° C.

The progress of the reaction can be traced, for example, by tracing a decrease in NCO groups by means of an infrared absorption spectrum or titration, and when the NCO groups have disappeared, the reaction is terminated.

Specific examples of the vinyl monomer having a hydroxyl group include typically hydroxyalkyl vinyl ethers such as hydroxymethyl vinyl ether, 2-hydroxydiethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, 6-hydroxyhexyl vinyl ether and 4-hydroxycyclohexyl vinyl ether; hydroxyalkyl allyl ethers such as 2-hydroxyallyl ether, 4-hydroxybutyl allyl ether and ethylene glycol monoallyl ether; hydroxyl group-containing (meth)acrylates such as 2-hydroxyethyl (meth)acrylate and 4-hydroxypropy (meth)acrylate; hydroxyl group-containing crotonic esters such as 2-hydroxyethyl crotonate and 3-hydroxypropyl crotonate; and an allyl alcohol. Of these, hydroxyalkyl vinyl ethers are preferred in view of their alternating copolymerizability with a fluoroolefin. Hydroxybutyl vinyl ether is advantageous since raw materials therefor are easily available.

Specific examples of the monoisocyanate having a cyclic hydrocarbon group include monoisocyanates such as cyclohexyl isocyanate, alkyl-substituted cyclohexyl isocyanate, benzyl isocyanate and isocyanatomethylcyclohexane. Of these, cyclohexyl isocyanate is advantageous, since raw materials therefor are easily available.

Further, the above monoisocyanate includes half-blocked products of diisocyanates, which are isocyanate compounds obtained by reacting only one of the two isocyanate groups of diisocyanate monomers having a cyclic hydrocarbon group such as 3-isocyanatomethyl-3,5,5-trimethylcyclohexyl isocyanate (IPDI), 1,3- (or 1,4-)bisisocyanatomethylbenzene (XDI), 1,3- (or 1,4-)bis(α,α-dimethylisocyanatomethyl)-benzene (TMXDI), bis(4-isocyanatocyclohexylmethane (hydrogenated MDI), 1,4- (or 1,3-)diisocyanatocyclohexane and 1-methyl-2,4- (or 2,6-)diisocyanatocyclohexane (hydrogenated TDI) with compounds having monovalent active hydrogen such as methanol, ethanol, propanol, isopropanol, hexanol, cyclohexanol, benzyl alcohol, 2-ethylhexyl alcohol, dipropylamine and dicyclohexylamine.

The above monoisocyanate can be also selected from half-blocked products of diisocyanate compounds, obtained by reacting one isocyanate group of the above diisocyanates with blocked product-forming heat-dissociating blocking agents such as oximes, phenols, hydroxylamines, acetoacetic esters, phthalimides and caprolactams, or generally known heat-dissociating blocking agents such as hydroxypyridines, pyridines, quinolines, pyrazolines and imidazoles. A fluorine-containing resin having branches of the above-obtained blocked isocyanate group and a hydroxyl group at the same time can be used as a one-package coating composition.

The above half-blocked product can be generally obtained by reacting the corresponding diisocyanate monomer with an active hydrogen compound under conditions containing an excess amount of diisocyanate and then removing the excess of the diisocyanate by separation means of distillation, extraction or recrystallization.

The isocyanates used in the present invention are essentially required to have a cyclic hydrocarbon group or an aromatic ring. Of these isocyanates, isocyanates having a cyclic hydrocarbon group are particularly preferred since the resultant coating composition is scarcely colored by light or is excellent in weatherability. Cyclohexyl isocyanate is advantageous since raw materials therefor are easily available.

The above monoisocyanates may be used as a mixture as required. Further, there may be used a mixture obtained by freely mixing an aliphatic monoisocyanate such as butyl isocyanate, hexyl isocyanate, 2-ethylhexyl isocyanate or octadecyl isocyanate and/or an aliphatic diisocyanate such as hexamethylene diisocyanate or 3,3,5- (or 3,5,5-)trimethylhexamethylene diisocyanate or its half-blocked product with the above diisocyanate having a cyclic hydrocarbon group.

In the fluorine-containing resin of the present invention, the content of the (B) unit is 0 to preferably 0 to 50 mol %. When this content exceeds 80 mol %, the weatherability of the resultant coating composition decreases. Further, when no Component (C) is contained, a coating composition containing less than 3 mol % of Component (B) shows a decrease in compatibility with a curing agent, solubility in a solvent and hardness of a coating. The "content" refers to an amount based on the total resin amount, and the "total resin amount" refers to a sum total of Components (A), (B) and (C) or a sum total of Components (A), (B), (C), (D) and (E) when Components (D) and (E) to be described later are present.

As the vinyl monomer to form Component (C), there is used a vinyl monomer represented by

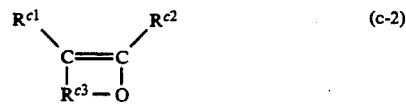

(wherein each of $R^{c1}$ and $R^{c2}$ is, independently of the other, hydrogen, an aliphatic group having 1 to 8 carbon atoms or an alicyclic hydrocarbon group, $R^{c3}$ and is a divalent organic group which can have any substituent).

Specific examples of the above vinyl monomer include dihydrofurans such as 2,3-dihydrofuran, 2,3-dihydro-5-methyl-furan, 2,2-dimethyl-3-hydrofuran, 3,3-dimethyl-2-hydrofuran and 2-methoxy-2,3-dihydrofuran; dihydropyrans such as 3,4-dihydro-2H-pyran, 3,4-dihydro-2-methoxy-2H-pyran, 3,4-dihydro-2-ethoxy-2H-pyran, 3,4-dihydro-6-methyl-pyran, 2-carboxy-3,4-dihydro-2H-pyran, 2-formyl-3,4-dihydro-2H-pyran and 3,4-dihydro-3,3-dimethyl-2H-pyran; dioxoles such as 1,3-dioxole and 2,2-dimethyl-1,3-dioxole; furans such as furan and α-methylfuran; benzofuran, naphthofuran and p-dioxene.

Further, the above vinyl monomer also includes a compound of the formula (c-2) in which the $R^{c3}$ group is a group of

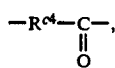

i.e., an endocyclic vinyl ester of the following general formula (c-3),

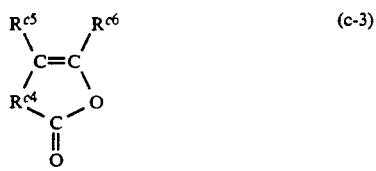

(wherein each of $R^{c5}$ and $R^{c6}$ is, independently of the other, hydrogen, an aliphatic hydrocarbon group having 1 to 8 carbon atoms or an alicyclic hydrocarbon group, and $R^{c4}$ is a divalent hydrocarbon group which can have an substituent).

Specific examples of the endocyclic vinyl ester include 3,4-dihydro-4,4-dimethyl-2H-pyran-2-one, 3,4-dihydro-2H-pyran-2-one, 3,4-dihydro-6-methyl-pyran-2-one, 2,3-dihydrofuran-2-one, and 2,3-dihydro-3,3-dimethyl-furan-2-one.

Of the above monomers, endocyclic vinyl esters in which $R^{c3}$ is a divalent saturated hydrocarbon group are preferred in view of weatherability, etc., and dihydrofurans and dihydropyrans are particularly preferred in view of a balance of properties among compatibility with a solvent and a curing agent for the fluorine-containing resin and weatherability and hardness of a coating.

The above-described components for Component (C) may be used alone or in combination.

In the fluorine-containing resin of the present invention, the content of the (C) unit is 0 to 80 mol %, preferably 0 to 80%. When this content exceeds 80 mol %, the weatherability of the resultant coating decreases. When no Component (B) is contained, a coating from a coating composition containing less than 3 mol % of Component (C) is inferior in rigidity, and the coating composition shows a decrease in compatibility with a curing agent and solubility in a solvent. The "content" refers to an amount based on the total resin amount, and the "total resin amount" refers to a sum total of Components (A), (B) and (C) or a sum total of Components (A), (B), (C), (D) and (E) when Components (D) and (E) to be described later are present.

In the fluorine-containing resin of the present invention, the solubility in an organic solvent, the compatibility with a curing agent, and the hardness and gloss of a coating from a coating composition containing the fluorine-containing resin are improved by using Component (B) and/or Component (C). The fluorine-containing resin of the present invention is essentially required to contain at least one of Components (B) and Component (C). These Components (B) and (C) can be contained alone or in combination. Two or more components as Component (B) or two or more components as Component (C) may also be contained.

In the fluorine-containing resin of the present invention, those having no curing site can be used as a lacquer type coating composition. A fluorine-containing resin having such a composition is soluble in an organic solvent. A coating from a coating composition containing such a fluorine-containing resin as a main component has gloss, high hardness and excellent weatherability.

Depending upon use and function, the fluorine-containing resin of the present invention preferably contains a unit (Component (D)) obtained by copolymerization of vinyl monomers having a functional group in addition to the above Components (A), (B) and (C), the content of Component (D) being not more than 40 mol %. The "content" refers to an amount based on the total resin amount, and the "total resin amount" refers to a sum total of Components (A), (B), (C) and (D) or a sum total of Components (A), (B), (C), (D) and (E) when Component (E) to be described later is present.

The above "functional group" refers to a group which can react by itself or react with another reagent, and includes an ionic group.

Specific examples of the above functional group include hydroxy, alkenyl, alkynyl, epoxy, formyl, carboxyl, a salt of a carboxyl group, amino, imino, mercapto, sulfo, an onium salt of nitrogen or sulfur, hydrolyzable silyl, silanol, a group having an amineimide structure, a group having an oxazoline ring, a group having a five-membered carbonate structure, a group having an acid anhydride structure, a group having a blocked isocyanate, nitronium ion, phosphonium ion and sulfonium ion. In particular, a resin having a hydroxyl group is useful as a raw material for a thermosetting resin or coating composition.

The above functional group can be introduced by copolymerizing a monomer having the functional group, or by first synthesizing a resin not having such a functional group and then modifying the resin with a compound having the functional group.

As a vinyl monomer having a hydroxyl group, there is used a compound represented by

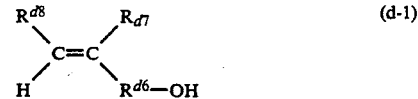

(wherein $R^{d6}$ is a divalent organic group, and each of $R^{d7}$ and $R^{d8}$ is, independently of the other, hydrogen or an alkyl group having 1 to 8 carbon atoms).

Specific examples of the vinyl monomer having a hydroxyl group [formula (d-1)] typically include hydroxyalkyl vinyl ethers such as hydroxymethyl vinyl ether, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, 6-hydroxyhexyl vinyl ether and 4-hydroxycyclohexyl vinyl ether, hydroxyalkyl allyl ethers such as 2-hydroxyallyl vinyl ether, 4-hydroxybutyl allyl ether and ethylene glycol monoallyl ether; hydroxyl group-containing (meth)acrylates such as 2-hydroxyethyl (meth)acrylate and 4-hydroxypropyl (meth)acrylate; hydroxyl group-containing crotonic esters such as 2-hydroxyethyl crotonate and 4-hydroxypropyl crotonate; and an allyl alcohol. Of these, hydroxyalkyl vinyl ethers are preferred in view of their alternating copolymerization reactivity with a fluoroolefin. Hydroxybutyl vinyl ether is advantageous since raw materials therefor are readily available.

In the present invention, the fluorine-containing resin having a hydroxyl group can react with a curing agent reactive with active hydrogen such as melamine, polyisocyanate or polyepoxy to form a crosslinked coating. The content of the unit formed from the vinyl monomer having a hydroxyl group in the fluorine-containing resin is a factor for adjusting the crosslinked density of a coating, and may be set at a desired value. In view of a balance of properties among drying properties, hardness and weatherability of a coating, however, it is generally preferable to set this content at not more than 40 mol %. A fluorine-containing resin having such a content is soluble in an organic solvent and excellent in compatibility with a curing agent. Moreover, a cured coating from a coating composition containing, as a main component, such a fluorine-containing resin and containing a curing agent in combination has gloss, high hardness and excellent weatherability.

When it is desirable to use epoxy curing as a curing mechanism for a coating, an epoxy group-containing vinyl monomer of the general formula (d-2),

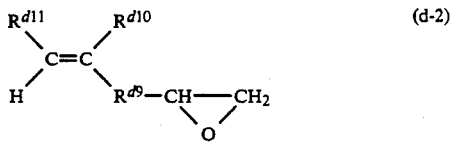

(wherein $R^{d9}$ is a divalent organic group, and each of $R^{d10}$ and $R^{d11}$ is, independently of the other, hydrogen or an alkyl group having 1 to 8 carbon atoms), can be added.

Specific examples of the epoxy group-containing vinyl monomer are as follows:

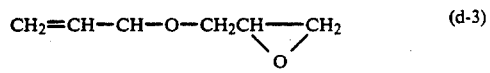

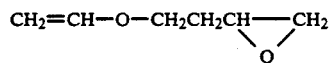

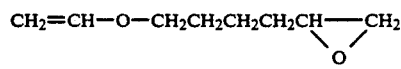

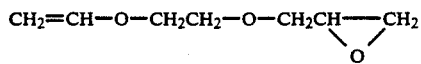

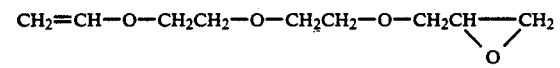

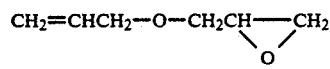

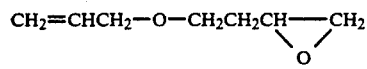

-continued

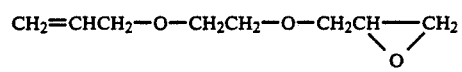

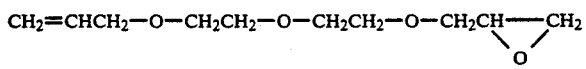

A fluorine-containing resin into which the above epoxy group has been introduced is usable as an epoxy resin even when it does not contain any unit obtained by copolymerization of the hydroxyl group-containing vinyl monomer of the formula (d-1). Further, the present inventors have found that a hydroxyl group-containing fluorine resin into which an epoxy group has been introduced has an effect of being excellent in storage stability. When it is desirable to use moisture-curing as a curing mechanism for a coating, a hydrolyzable silyl group-containing vinyl monomer of the general formula (d-4),

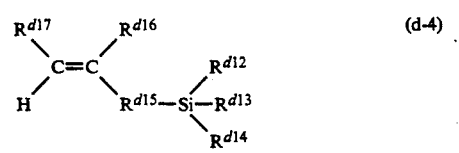

(wherein each of $R^{d12}$, $R^{d13}$ and $R^{d14}$ is, independently of the others, a monovalent organic group, with the proviso that at least one of these is an alkoxy group having 1 to 6 carbon atoms, $R^{d15}$ is a divalent organic group, and each of $R^{d16}$ and $R^{d17}$ is, independently of the other, a hydrogen atom or an alkyl group having 1 to 8 carbon atoms), can be added.

Specific examples of the hydrolyzable silyl group-containing vinyl monomer [formula (d-4)]include vinyltrimethoxysilane, vinyltriethoxysilane, vinyldimethoxymethylsilane, allyltrimethoxysilane, allyltriethoxysilane, allyldimethoxysilane, vinyloxypropyltrimethoxysilane, vinyloxyethoxypropyltrimethoxysilane and 3-trimethoxysilylpropyl (meth)acrylate. A fluorine-containing resin into which the above hydrolyzable silyl group has been introduced is usable as a moisture-curing resin even when it does not contain any unit obtained from the hydroxyl group-containing vinyl monomer of the formula (d-1) by copolymerization.

In general, a hydroxyl group-containing fluorine resin soluble in an organic solvent has been and is considered to be poor in storage stability since it shows an increase in molecular weight or gelation with time. The present inventors have found that the storage stability of the fluorine-containing resin of the present invention can be remarkably improved by copolymerizing monomers containing, as a monomer to form Component (D), a vinyl monomer having a 2,2,6,6-tetra-substituted piperidinyl group of the following general formula (d-5),

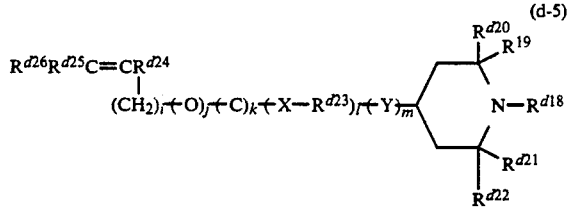

(d-5)

(wherein i, j, k, l and m are 0 or 1, $R^{d18}$ is hydrogen, an alkyl group having 1 to 18 carbon atoms or an acyl group having 1 to 18 carbon atoms, each of $R^{d19}$, $R^{d20}$, $R^{d21}$ and $R^{d22}$ is, independently of the others, an alkyl group having 1 to 18 carbon atoms, $R^{d23}$ is a divalent organic group, each of $R^{d24}$, $R^{d25}$ and $R^{d26}$ is, independently of the others, a hydrogen atom or an alkyl group having 1 to 8 carbon atoms, and each of X and Y is, independently of other, an imino group or oxygen atom).

Specific examples of the above vinyl monomer include (meth)acrylic ester derivatives such as 4-(meth)acryloyloxy-2,2,6,6-tetramethylpiperidine, 4-(meth)acryloyloxy-1,2,2,6,6-pentamethylpiperidine, 4-(meth)acryloyloxy-1-acetyl-2,2,6,6-tetramethylpiperidine, 4-(meth)acryloyloxy-1,2,2,6,6-pentaethylpiperidine and 4-(meth)acryloyloxyethyloxy-1,2,2,6,6-pentamethylpiperidine; acrylamide derivatives such as 4-(meth)acryloylamino-2,2,6,6-tetramethylpiperidine, 4-(meth)acryloylamino-1,2,2,6,6-pentamethylpiperidine and 4-(meth)acryloylamino-1-acetyl-2,2,6,6-tetramethylpiperidine; crotonic ester derivatives such as 4-crotonoyloxy-2,2,6,6-tetramethylpiperidine and 4-crotonoyloxy-1,2,2,6,6-pentamethylpiperidine; vinyl ether derivatives such as 4-vinyloxy-2,2,6,6-tetramethylpiperidine, 4-vinyloxy-1,2,2,6,6-pentamethylpiperidine, 4-vinyloxy-1-acetyl-2,2,6,6-tetramethylpiperidine, 4-vinyloxy-1,2,2,6,6-pentaethylpiperidine, 4-(2-vinyloxyethyloxy)-1,2,2,6,6-pentamethylpiperidine, vinyl-9-aza-3-ethyl-8,8,9,10,10-pentamethyl-1,5-dioxaspiro[5,5]-3-undecylmethyl ether and vinyl-9-aza-3-ethyl-8,8,10,10-tetramethyl-1,5-dioxaspiro[5,5]-3-undecylmethyl ether; and allyl derivatives such as 4-allyloxy-2,2,6,6-tetramethylpiperidine, 4-allyloxy-1,2,2,6,6-pentamethylpiperidine, 4-allyloxy-1-acetyl-2,2,6,6-tetramethylpiperidine, allyl-9-aza-3-ethyl-8,8,9,10,10-pentamethyl-1,5-dioxaspiro[5,5]-3-undecylmethyl ether and allyl-9-aza-3-ethyl-8,8,10,10-tetramethyl-1,5-dioxaspiro[5,5]-3-undecylmethyl ether. These may be used alone or in combination.

Of the above monomers, more preferred is a compound of the following formula,

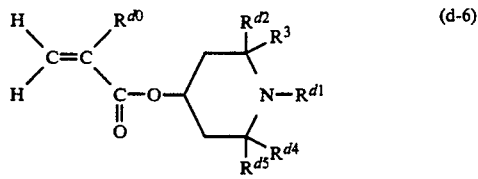

(d-6)

(wherein $R^{d0}$ is hydrogen or methyl, $R^{d1}$ is hydrogen, an alkyl group having 1 to 18 carbon atoms or an acyl group having 1 to 18 carbon atoms, and each of $R^{d2}$, $R^{d3}$, $R^{d4}$ and $R^{d5}$ and is, independently of the others, an alkyl group having 1 to 18 carbon atoms).

The mechanism of action as a storage stabilizer is not clear. However, in the mechanism of action as a storage stabilizer, it is assumed that the unit from the above monomer binds HF or HCl generated from a fluoroolefin or by decomposition of a unit formed therefrom. The aforementioned effect of the epoxy group on the storage stability is also assumed to be based on a similar mechanism of action.

The content of the unit of the formula (d-5) or (d-6) is preferably 0.01 to 20 mol %, more preferably 0.05 to 10 mol %. When this content is less than 0.01 mol %, the resultant fluorine-containing resin is inferior in storage stability. When it exceeds 20 mol %, a coating from the resultant coating composition shows a decrease in water resistance, chemical resistance and adhesion to a substrate. This unit is a hindered amine and can also be expected to have an effect as a light stabilizer. And, a fluorine-containing resin containing this unit, and a coating composition containing the resin as a main component, can be expected to show a further improvement in weatherability.

The fluorine-containing resin having the above-described composition, provided by the present invention, is soluble in an organic solvent and excellent not only in compatibility with a curing agent but also in storage stability. And a cured coating from a coating composition containing the above fluorine-containing resin as a main component has gloss, high hardness and excellent weatherability.

Further, when monomers including the above monomer are copolymerized in the presence of potassium carbonate according to a solution polymerization or bulk polymerization method, the effect of the above monomer is further remarkably improved, and the monomer can exert the maximum effect as a storage stabilizer even with the minimum addition of the monomer.

In the present invention, in order to provide a fluorine-based coating composition which is improved in affinity to a pigment and adhesion to a substrate, it is preferable to copolymerize monomers containing vinyl monomer(s) of the following formula (d-7) and/or the following formula (d-8).

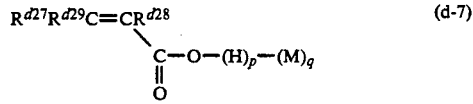

(d-7)

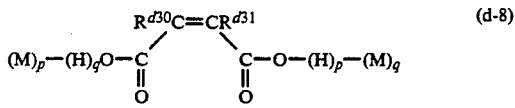

(d-8)

(wherein each of $R^{d27}$, $R^{d28}$, and $R^{d31}$ is, independently of the others, hydrogen or an alkyl group having 1 to 8 carbon atoms, $R^{d29}$ is hydrogen or an alkoxycarbonyl group, M is an alkali metal or a basic compound which is a compound containing a nitrogen atom or a phosphorus atom and has a pKa of at least 6, q is 0 or 1, and p is 0 when M is an alkali metal and 1 in the other case).

Specific examples of the above vinyl monomer(s) include acrylic acid, methacrylic acid, crotonic acid, fumaric acid, maleic acid, half ester of fumaric acid, half ester of maleic acid, alkali metal salts of these acids, and salts of these acids with basic compounds which are compounds containing a nitrogen atom or a phosphorus atom and have a pKa of at least 6. Of these, crotonic acid and a salt thereof are preferred in view of copolymerizability with a fluoroolefin. The above vinyl monomers may be used alone or in combination.

Examples of the above basic compounds which are compounds containing a nitrogen atom or a phosphorus atom and have a pKa of at least 6 include amines such as an aliphatic amine, an aliphatic amine having a substituent, a cyclic aliphatic amine and a cyclic amine having a substituent; and phosphines having an aliphatic or aromatic group. Specific examples of the amines include diethylamine, dipropylamine, N-methylethanolamine, diethanolamine, dimethylcyclohexylamine, dimethylethanolamine, triethanolamine, triethylamine, pyrrolidine, piperidine, 1-methylpiperidine, 2,2,6,6-tetramethylpiperidine, 4-hydroxy-2,2,6,6-tetramethyl-piperidine, 1,2,2,6,6-pentamethylpiperidine, morpholine, tetramethylammonium ion and tetraethylammonium ion. Specific examples of the phosphines include trimethylphosphine, triethylphosphine, tributylphosphine, dimethylphosphine, diethylphosphine, phenyldiethylphosphine, triphenylphosphine and tribenzylphosphine. Of these, particularly preferred are tertiary amines.

The content of the unit of the formula (d-7) or (d-8) is determined depending upon the expected modification effect. For example, when it is intended to impart a coating composition base with a self-curing catalyst function by introduction of a weak acid group or when it is intended to improve adhesion to a substrate and dispersibility of a pigment, the above content is preferably 0.01 to 15 mol %. When it is intended to increase affinity to an aqueous medium (aqueous, fluorine-containing resin), the above content is preferably 5 to 40 mol %.

The fluorine-containing resin having the above composition, provided by the present invention, is soluble in an organic solvent and excellent in compatibility with a curing agent. Further, when the carboxyl group is a salt, the storage stability is excellent, and a cured coating obtained from a coating composition containing this fluorine-containing resin as a main component has gloss, high hardness and excellent weatherability. Furthermore, the coating composition is excellent in adhesion to a substrate and pigment dispersibility. Further, the fluorine-containing resin can be converted to an aqueous coating composition.

In another method for providing a fluorine-based coating composition which is improved in affinity to a pigment, adhesion to a substrate and hydrophilic nature (or solubility in water), preferred is a fluorine-containing resin having a branch of a quaternary onium salt introduced through an ether bond.

The above fluorine-containing resin can be produced by either of the following methods (I) and (II).

Method (I): in which a fluorine-containing resin having an epoxy group and an onium salt-forming substance are allowed to react in combination with an organic or inorganic acid.

Method (II): in which a vinyl monomer having an epoxy group and an onium salt-forming substance are allowed to react in combination with an organic or inorganic acid, and the resultant vinyl monomer is copolymerized.

The fluorine-containing resin of the present invention can be produced by any one of the above methods (I) and (II).

The method (I) is described first. In this method, the fluorine-containing resin having an epoxy group as a starting material is selected from fluorine-containing resins obtained by copolymerization of vinyl monomers of the formula (d-2).

Specific examples of the above vinyl monomers include monomers of the formula (d-3).

These monomers can be used alone or in combination.

Then, an onium salt-forming substance is reacted with an epoxy group of the above-obtained, fluorine-containing resin in combination with an organic or inorganic acid, thereby to obtain a fluorine-containing resin having a quaternary onium salt.

Examples of the above onium salt-forming substance include a basic amino compound, a tertiary phosphine and a secondary sulfide. These are respectively capable of forming a quaternary ammonium, phosphonium or sulfonium salt.

The above basic amino compound may be any one of polyamines and alkanolamines in addition to a primary amine, a secondary amine and a tertiary amine. Specific examples of the basic amino compound include diethylamine, dipropylamine, N-methylethanolamine, diethanolamine, ethylenediamine, diethylenetriamine, dimethylcyclohexylamine, dimethylethanolamine, triethanolamine, triethylamine, pyrrolidine, piperidine and morpholine. When a polyamine such as diethylenetriamine is used, it is preferred to preliminarily convert it to a ketimine derivative by allowing it to react with a ketone such as acetone, methyl ethyl ketone or a methyl isobutyl ketone.

As the above tertiary phosphine, any phosphine can be practically used if it contains no functional group which hinders an onium ion-forming reaction. Specific examples of the tertiary phosphine include trimethylphosphine, triethylphosphine, tributylphosphine, dimethylphosphine, diethylphosphine, phenyldiethylphosphine, diphenylmethylphosphine, triphenylphosphine, tribenzylphosphine and tetramethylenemethylphosphine.

As the above secondary sulfide, any sulfide can be practically used if it is a sulfide which reacts with an epoxy group and contains no functional group which hinders an onium ion-forming reaction. Specific examples of this sulfide include diethyl sulfide, dipropyl sulfide, dibutyl sulfide, dihexyl sulfide, diphenyl sulfide, ethylphenyl sulfide, tetramethylene sulfide, pentamethylene sulfide, bis(hydroxyethyl) sulfide, bis(hydroxypropyl) sulfide and bis(hydroxybutyl) sulfide.

The above onium salt-forming substances may be used alone or in combination.

The amount thereof for use based on the epoxy group of the above fluorine-containing resin having an epoxy group is 0.2 to 2.0 equivalent weights, preferably 0.5 to 1.2 equivalent weights.

Examples of the above organic acid include formic acid, acetic acid, lactic acid, propionic acid, oxalic acid, acrylic acid, methacrylic acid and p-toluenesulfonic acid. Examples of the above inorganic acid include boric acid, hydrochloric acid, sulfuric acid and phosphoric acid.

The amount of the above acid for use based on the above onium salt-forming substance is 0.2 to 5 equivalent weights, preferably 0.5 to 1.5 equivalent weights.

The reaction of the fluorine-containing resin having an epoxy group, the onium salt-forming substance and the organic or inorganic acid is generally carried out by allowing to react a onium salt-forming substance/organic or inorganic acid mixture with the fluorine-containing resin having an epoxy group. However, the primary amine or secondary amine can be preliminarily allowed to react with the fluorine-containing resin having an epoxy group and then neutralized with the organic or inorganic acid.

The reaction of the fluorine-containing resin having an epoxy group, the onium salt-forming substance and the organic or inorganic acid can be achieved by heating them at about 20° to 200° C., preferably 50° to 150° C., for about 1 to about 5 hours.

The above reaction is generally carried out in a suitable organic solvent. Examples of the organic solvent include aromatic hydrocarbons such as toluene and xylene; alcohols such as n-butanol; esters such as ethyl acetate and n-butyl acetate, ketones such as methyl ethyl ketone and methyl isobutyl ketone; glycol ethers such as ethyl cellosolve; and a variety of commercially available diluents.

The amount of the above organic solvent for use per 100 parts by weight of the fluorine-containing resin is preferably 10 to 100 parts by weight.

The method (II) (in which a vinyl monomer having an epoxy group and an onium salt-forming substance are allowed to react in combination with an organic or inorganic acid, and the resultant vinyl monomer is copolymerized) will be explained hereinafter.

In this method, a vinyl monomer (0.01 to 40 mol %) obtained by reacting a fluorine-containing vinyl monomer (20 to 70 mol %), an onium salt-forming substance and an epoxy group-containing vinyl monomer in combination with an organic or inorganic acid is an essential comonomer, and the fluorine-containing resin of the present invention can be obtained by copolymerizing the above vinyl monomer and, optionally, a hydroxyl group-containing vinyl monomer and/or other vinyl monomer in the same manner as in the production of the fluorine-containing resin having an epoxy group in the method (I).

Specific examples of the above fluorine vinyl monomer, epoxy group-containing vinyl monomer, onium salt-forming substance, organic acid, inorganic acid, hydroxyl group-containing monomer and other vinyl monomer are the same as those described in the above method (I).

A method for allowing to react the onium salt-forming substance with the epoxy group-containing vinyl monomer in combination with the organic or inorganic acid can be carried out in a similar manner to the method for allowing the onium salt-forming substance and the fluorine-containing resin having epoxy group to react in combination with the organic or inorganic acid, described in the method (I).

The fluorine-containing resin obtained by the method (I) or (II) has, as an essential structural unit, at least one of the units of the following formulae (h), (i) and (j).

(1) When the onium salt-forming substance is a basic amino compound:

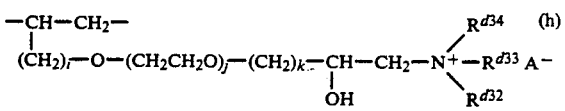

(wherein each of $R^{d32}$, $R^{d33}$ and $R^{d34}$ is, independently of the others, hydrogen, an alkyl group having 1 to 6 carbon atoms, a hydroxylalkyl group having 1 to 6 carbon atoms, phenyl, benzyl or an aminoalkyl group having 1 to 6 carbon atoms, with the proviso that a combination of $R^{d32}$ and $R^{d33}$ or a combination of $R^{d32}$, $R^{d33}$ and $R^{d34}$ can bond together to form a ring structure. $A^-$ is an organic anion or an inorganic anion, i is 0 or 1, j is 0 or an integer of 1 to 5, and k is an integer of 1 to 5).

(2) When the onium salt-forming substance is a tertiary phosphine:

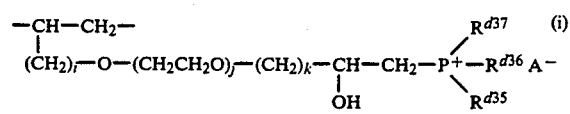

(wherein each of $R^{d35}$, $R^{d36}$ and $R^{d37}$ is, independently of the others, hydrogen, an alkyl group having 1 to 6 carbon atoms, a hydroxyalkyl group having 1 to 6 carbon atoms, phenyl, benzyl or an aminoalkyl group having 1 to 6 carbon atoms, with the proviso that a combination of $R^{d35}$ and $R^{d36}$ or a combination of $R^{d35}$, $R^{d36}$ and $R^{d37}$ can bond together to form a ring structure, $A^-$ is an organic anion or an inorganic anion, i is 0 or 1, j is 0 or an integer of 1 to 5, and k is an integer of 1 to 5).

(3) When the onium salt-forming substance is secondary sulfide:

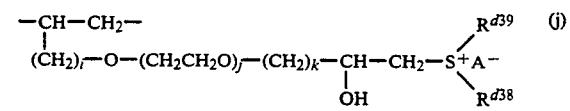

(wherein each of $R^{d38}$ and $R^{d39}$ is, independently of the other, hydrogen, an alkyl group having 1 to 6 atoms, a hydroxyalkyl group having 1 to 8 carbon atoms, phenyl, benzyl or an aminoalkyl group having 1 to 6 carbon atoms, with the proviso that $R^{d38}$ and $R^{d39}$ can bond together to form a ring structure, $A^-$ is an organic anion or an inorganic anion, i is 0 or 1, j is 0 or an integer of 1 to 5, and k is an integer of 1 to 5.)

The amount of the above onium salt introduced is preferably 1 to 40 mol %. When it is intended to impart to the resin a hydrophilic nature or solubility in water, the higher the content is, the more preferable.

The fluorine-containing resin having the above composition is soluble in an organic solvent and excellent in compatibility with a curing agent. Further, a cured coating formed from a coating composition containing this fluorine-containing resin as a main component has gloss, high hardness and excellent weatherability. Moreover, the coating composition is excellent in affinity to a pigment and adhesion to a substrate. The above fluorine-containing resin can be converted to an aqueous coating composition.

The above-described components for the (D) units can be contained alone or in combination in the fluorine-containing resin.

In addition to the above Components (A), (B), (C) and (D), the fluorine-containing resin of the present invention preferably contains a unit (Component (E)) obtained, by copolymerization, from a vinyl monomer belonging to none of the above Components (A), (B), (C) and (D) in order to improve the fluorine-containing resin in flexibility of a coating, impact resistance and other mechanical properties. The content of the Component (E) is not more than 40 mol %. The "content" refers to an amount based on the total resin amount, and the "total resin amount" refers to a sum total of Components (A), (B), (C), (D) and (E).

Examples of the above copolymerizable vinyl monomer to be used for forming the (E) unit include olefins such as ethylene, propylene and isobutylene; haloolefins such as vinyl chloride and vinylidene chloride; vinyl carboxylates such as vinyl acetate, vinyl n-butyrate, vinyl benzoate, vinyl p-tert-butylbenzoate, vinyl pivalate, vinyl 2-ethylhexanoate, vinyl versate and vinyl laurate; isopropenyl carboxylates such as isopropenyl acetate and isopropenyl propionate; linear alkyl vinyl ethers such as ethyl vinyl ether, propyl vinyl ether, butyl vinyl ether, isobutyl vinyl ether, tert-butyl vinyl ether, 2-ethylhexyl vinyl ether, octyl vinyl ether and neopentyl vinyl ether; cycloalky vinyl ethers such as cyclopentyl vinyl ether and cyclohexyl vinyl ether; aryl vinyl ethers such as phenyl vinyl ether; aralkyl vinyl ethers such as benzyl vinyl ether and phenethyl vinyl ether; aromatic vinyl compounds such as vinyltoluene; allyl esters such as allyl formate, allyl acetate, allyl butyrate, allyl benzoate, allyl cyclohexanecarboxylate and allyl cyclohexylpropionate; allyl ethers such as allyl ethyl ether and allyl phenyl ether; esters of acrylic acid and methacrylic acid such as butyl (meth)acrylate, methyl (meth)acrylate, cyclohexyl (meth)acrylate, isobornyl (meth)acrylate and 2-hydroxy-4-(2-methacryloxyethoxy)benzophenone; and acrylamides such as acrylamide and N-methylolacrylamide Of the above vinyl monomers, alkyl vinyl ethers are preferred in view of flexibility of a coating, and of these, ethyl vinyl ether and isobutyl vinyl ether are particularly preferred due to a balance between hardness and flexibility of a coating and easy availability. Neopentyl vinyl ether is useful when it is intended to obtain a coating having high hardness, since the glass transition temperature of the coating is increased.

The fluorine-containing resin having the above composition is soluble in an organic solvent and excellent in compatibility with a curing agent. A cured coating formed from a composition containing this fluorine-containing resin as a main component has gloss, high hardness and excellent weatherability and exhibits improvement in impact resistance and flexibility.

In general, a fluorine-containing resin soluble in an organic solvent has been and is still considered to be deficient in water repellency and oil repellency. The present inventors have found that the fluorine-containing resin of the present invention can be remarkably improved in water and oil repellency by copolymerizing monomers containing a fluoroalkyl group-containing vinyl monomer. A vinyl ether having a fluoroalkyl group is preferred as a fluoroalkyl group-containing vinyl monomer having good copolymerizability with a fluoroolefin. In view of easy availability of raw materials therefor, useful are acrylates and methacrylates having a fluoroalkyl group (to be referred to as "(meth)acrylate having a fluoroalkyl group" hereinafter). Specific examples thereof include fluorovinyl ethers such as pentafluoroethyl vinyl ether and 2-perfluorooctylethyl vinyl ether; and fluoroalkyl (meth)acrylates such as $CH_2=CH-COOCH_2CF_3$,
$CH_2=C(CH_3)COOCH_2CF_3$
$CH_2=CH-COOCH_2CF_2CHF_2$
$CH_2=C(CH_3)COOCH_2CHF_2$
$CH_2=C(CH_3)COOCH(CF_3)_2$
$CH_2=CH-COOCH_2CF_2CHFCF_3$
$CH_2=C(CH_3)COOCH_2(CF_2)_3CF_2H$
$CH_2=CHCOOCH_2(CF_2)_3CF_2H$
$CH_2=C(CH_3)COOCH_2CF_2CHFCF_3$
$CH_2=CH-COOCH_2CH_2C_8F_{17}$
$CH_2=C(CH_3)COOCH_2CH_2C_8F_{17}$

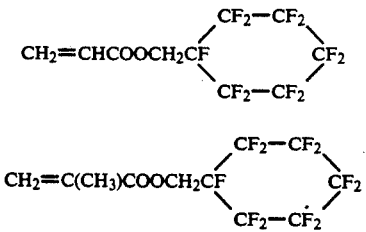

$CH_2=CHCOOCH_2CH_2C_9F_{19}$
$CH_2=C(CH_3)COOCH_2CH_2C_9F_{19}$
$CH_2=CHCOOCH_2CH_2C_{10}F_{21}$
$CH_2=C(CH_3)COOCH_2CH_2C_{10}F_{21}$
$CH_2=CHCOOCH_2CH_2C_{11}F_{23}$
$CH_2=C(CH_3)COOCH_2CH_2C_{11}F_{23}$
$CH_2=CHCOOCH_2CH_2C_{12}F_{25}$
$CH_2=C(CH_3)COOCH_2CH_2C_{12}F_{25}$
$CH_2=C(CH_3)COOCF_2CF_3$ (e-1)

The above compounds may be used alone or in combination. A fluorine-containing resin having the above composition is soluble in an organic solvent and excellent in compatibility with a curing agent, and a cured coating formed from a coating composition containing this fluorine-containing resin as a main component not only has gloss, high hardness and excellent weatherability but also has remarkably improved water and oil repellency.

In the present invention, as a method for imparting a fluorine-containing resin with a variety of functions such as improvement of light stability, improvement of oxidation stability, improvement of stability against radicals, improvement of affinity to a pigment and adhesion to a substrate, improvement of water and oil repellency, improvement of storage stability and affinity to an aqueous coating composition, the present inventors have found it effective to mix the fluorine-containing resin with an acrylic polymer (which refers to Component (T) to be described later) having such functions in addition to the above-described methods.

The resin for a coating composition having a composition for the above functions is produced by any of the following methods (I) to (III).

(I) A fluorine-containing resin (to be referred to as "resin (S)" hereinafter) having the following components:

Component (A): a unit of the above formula (a-1) 20 to 95 mol %
Component (B): a unit of the above formula (b-1) 10 to 80 mol %
Component (C): a unit of the above formula (c-1) 10 to 80 mol % and an acrylic resin (to be referred to as "resin (T)" hereinafter) having, in the molecule, a functional group having the capability of ultraviolet light absorption and/or a functional group having the capability of oxidation prevention and/or a functional group having the capability of binding a radical are blended. The above contents of Components (A), (B) and (C) refer to proportions based on the amount consisting of those of the Components (A), (B) and (C) and other components in the resin (S).

(II) Monomers to constitute the resin (S) are polymerized in the presence of the resin (T).

(III) Monomers to constitute the resin (T) are polymerized in the presence of the resin (S).

As a method for producing the resin for a coating composition, provided by the present invention, any one of the above methods (I) to (III) can be selected. The weight ratio between the resin (S) and the resin (T) can be freely set between 95:5 and 5:95. The resins (S) and (T) can respectively contain components formed from other copolymerizable monomers.

The number average molecular weight ($\overline{Mn}$) of the resin (S) is generally 500 to 200,000, and the number average molecular weight ($\overline{Mn}$) of the resin (T) is generally 500 to 200,000. The content of the functional group(s) in the resin (T) is 3 to 50 mol %, preferably 5 to 3 mol %.

Examples of a functional group having the capability of ultraviolet light absorption, a functional group having the capability of oxidation prevention and a functional group having the capability of binding a radical include a hindered amine type functional group represented by

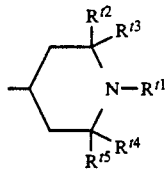

(t-1)

(wherein each of $R^{t1}$, $R^{t2}$, $R^{t3}$, $R^{t4}$ and $R^{t5}$ is, independently of the others, hydrogen or an alkyl group having 1 to 18 carbon atoms), a hindered phenol type functional group represented by

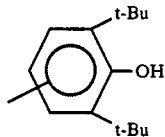

(t-2)

and, besides the above, the above examples also include a benzophenone type functional group and benzotriazole type functional group.

The above functional group having the capability of ultraviolet light absorption, the functional group having the capability of oxidation prevention and the functional group having the capability of binding a radical are generally introduced into the resin by a copolymerization reaction between a derivative having such functional groups and derived from polymerizable monomers such as (meth)acrylic esters, (meth)acrylamide, vinyl ethers or vinyl esters and other copolymerizable (meth)acrylate monomers. Further, there may be employed a method in which an acrylic resin having no such functional group(s) is first prepared and the acrylic resin is modified with a reaction reagent having such functional group(s).

The above hindered amine type vinyl monomer has the aforementioned general formula (d-5), preferably the general formula (d-6). Specific examples thereof include (meth)acrylic ester derivatives such as 4-(meth)acryloyloxy-2,2,6,6-tetramethylpiperidine, 4-(meth)acryloyloxy-1,2,2,6,6-pentamethylpiperidine, 4-(meth)acryloyloxy-1-acetyl-2,2,6,6-tetramethylpiperidine, 4-(meth)acryloyloxy-1,2,2,6,6-pentaethylpiperidine and 4-(meth)acryloyloxyethyloxy-1,2,2,6,6-pentamethylpiperidine; acrylamide derivatives such as 4-(meth)acryloylamino-2,2,6,6-tetramethylpiperidine, 4-(meth)acryloylamino-1,2,2,6,6-pentamethylpiperidine and 4-(meth)acryloylamino-1-acetyl-2,2,6,6-tetramethylpiperidine; crotonic ester derivatives such as 4-crotonoyloxy-2,2,6,6-tetramethylpiperidine and 4-crotonoyloxy-1,2,2,6,6-pentamethylpiperidine; vinyl ether derivatives such as 4-vinyloxy-2,2,6,6-tetramethylpiperidine, 4-vinyloxy-1,2,2,6,6-pentamethylpiperidine, 4-vinyloxy-1-acetyl-2,2,6,6-tetramethylpiperidine, 4-vinyloxy-1,2,2,6,6-pentaethylpiperidine, 4-(2-vinyloxyethyloxy)-1,2,2,6,6-pentamethylpiperidine, vinyl-9-aza-3-ethyl-B,8,9,10,10-pentamethyl-1,5-dioxaspiro[5,5]-undecylmethyl ether and vinyl-9-aza-3-ethyl-8,8,10,10-tetramethyl-1,5-dioxaspiro[5,5]-3-undecylmethyl ether; and allyl derivatives such as 4-allyoxy-2,2,6,6-tetramethylpiperidine, 4-allyloxy-1,2,2,6,6-pentamethylpiperidine, 4-allyoxy-1-acetyl-2,2,6,6-tetramethylpiperidine, allyl-9-aza-3-ethyl-8,8,9,10,10-pentamethyl-1,5-dioxaspiro[5,5]-3-undecylmethyl ether and allyl-9-aza-3-ethyl-8,8,10,10-tetramethyl-1,5-dioxaspiro[5,5]-3-undecylmethyl ether. These may be used alone or in combination.

When the resin (T) is imparted with water and oil repellency, it is preferred to copolymerize a (meth)acrylate having a fluoroalkyl group with other monomers.

Specific examples of the vinyl monomer having a fluoroalkyl group to form the acrylic resin as the resin (T) include fluorovinyl ethers such as pentafluoroethyl vinyl ether and 2-perfluorooctylethyl vinyl ether; and fluoroalkyl (meth)acrylates of the formula (e-1). These vinyl monomers can be used alone or in combination.

The above vinyl monomer having a fluoroalkyl group is used in such an amount that the content of fluorine derived therefrom in the resin (T) is at least 0.01% by weight, more preferably at least 0.1% by weight.

Depending upon use of the resin of the present invention, the resin (T) may have a functional group other than the above functional groups. Examples of the "other" functional group include alkenyl, alkynyl, epoxy, formyl, carboxyl, a salt of a carboxyl group, amino, imino, mercapto, sulfo, an onium salt of nitrogen or sulfur, hydrolyzable silyl, silanol, a group having an amineimide structure, a group having an oxazoline ring, a group having a five-membered carbonate structure, a group having an acid anhydride structure and a group having blocked isocyanate. This functional group can be introduced by copolymerizing a monomer having the functional group, or by first synthesizing a resin having such a functional group and then modifying the resin with a compound having the functional group.

Examples of the monomer having the above functional group include hydroxyl group-containing vinyl monomers of the formula (d-1), epoxy group-containing vinyl monomers of the formula (d-2), hydrolyzable silyl group-containing vinyl monomers of the formula (d-4), and carboxyl group-containing vinyl monomers and hydroxyl group-containing vinyl monomers of the formulae (d-7) and (d-8).

Specific examples of the epoxy-group containing vinyl monomers include monomers of the formula (d-3).

Specific examples of the hydrolyzable silyl group-containing vinyl monomers include vinyltrimethoxysilane, vinyltriethoxysilane, vinyldimethoxysilane, allyltrimethoxysilane, allyltriethoxysilane, allyldimethoxymethylsilane, vinyloxyethoxypropyltrimethoxysilane and 3-trimethoxysilylpropyl (meth)acrylate.

Specific examples of the carboxyl group-containing vinyl monomers include acrylic acid, methacrylic acid, crotonic acid, fumaric acid, maleic acid, half ester of fumaric acid and half ester of maleic acid.

Typical examples of the hydroxyl group-containing vinyl monomers specifically include hydroxyalkyl vinyl ethers such as hydroxymethyl vinyl ether, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, 6-hydroxyhexyl vinyl ether and 4-hydroxycyclohexyl vinyl ether; hydroxyalkyl allyl ethers such as 2-hydroxyallyl vinyl ether, 4-hydroxybutyl allyl ether and ethylene glycol monoallyl ether; hydroxyl group-containing (meth)acrylates such a 2-hydroxyethyl (meth)acrylate and 4-hydroxypropyl (meth)acrylate; hydroxyl group-containing crotonic esters such as 2-hydroxyethyl crotonate and 4-hydroxypropyl crotonate; and an allyl alcohol.

The above-described Component (D), Component (E) and Component (T) are incorporated in order to impart the fluorine-containing resin of the present invention with a variety of functions depending upon use. These components can be used alone or in combination. Further, at least two monomers for Component (D), at least two monomers for Component (E) and at least two monomers for Component (T) can be used in combination. As monomers to form Components (D) and (E), any monomers can be used if these are copolymerizable with the monomers to form Components (A), (B) and (C), and the monomers to form Components (D) and (E) shall not be necessarily limited to those monomers described in the present specification. The copolymerization referred to in the present invention includes 1) alternating copolymerization, 2) random copolymerization, 3) block copolymerization and 4) graft copolymerization, and is not be limited to any form of copolymerization.

The fluorine-containing resin of the present invention can be produced by copolymerizing a mixture of the above-described vinyl monomers in the presence or absence of a solvent by the use, as a polymerization initiating source, of a polymerization initiator or ionizing radiation. Further, the polymerization can be carried out by individually, separately or continuously adding the monomers depending upon copolymerizability of each vinyl monomer and reactivity such as a calorific value.

The polymerization initiator is properly selected from water-soluble and oil-soluble initiator depending upon the form of polymerization or as desired.

Examples of the oil-soluble initiators include azo compounds such as azobisisobutyronitrile and 2,2'-azobis-(2,4-dimethylvaleronitrile); peroxyester type peroxides such as tert-butylperoxypivalate and tert-butylperoxyisobutylate; diacrylperoxide type peroxides such as octanoyl peroxide and lauroyl peroxide; dialkylperoxydicarbonate type peroxides such as diisopropylperoxidicarbonate; and dialkylperoxide type peroxides such as benzoyl peroxide.

Examples of the water-soluble polymerization initiators include persulfates such as potassium persulfate, hydrogen peroxide, redox initiators formed of a combination of these with reducing agents such as sodium hydrogensulfite and sodium thiosulfate; inorganic system initiators prepared from these and a small amount of iron, ferrous salt and silver nitrate; dibasic acid peroxides such as disuccinic acid peroxide, diglutaric acid peroxide and monosuccinic acid peroxide; and organic initiators such as azobisisobutylamidine dibasic acid salt.

The amount of the polymerization initiator for use depends upon its kind and polymerization conditions. In general, the amount thereof based on the total amount of the monomers is 0.005 to 5% by weight, preferably 0.05 to 0.5% by weight.

The polymerization method is not specifically limited. For example, bulk polymerization, suspension polymerization, emulsion polymerization and solution polymerization methods can be used. In view of stability in the operation of the polymerization reaction, preferred are a solution polymerization method using a solvent selected from lower alkyl-substituted benzenes such as xylene and toluene; esters such as butyl acetate; ketones such as methyl isobutyl ketone; alcohols such as tert-butanol; and saturated halogenated hydrocarbons having at least one fluorine atoms, an emulsion polymerization method in an aqueous medium and a bulk polymerization method which obviates separation of the product from a solvent.

When the copolymerization is carried out in an aqueous medium, it is generally preferred to use a suspension agent or an emulsifier as a dispersion stabilizer. When a fluorine-containing resin having a hydroxyl group is used, in order to prevent broadening of the molecular weight distribution and gelation, it is preferred to adjust pH of a reaction solution during the polymerization to 4, preferably to at least 8, by adding a basic buffer. Further, in the case of solution polymerization and bulk polymerization methods, the addition of a basic substance such as potassium carbonate or an amine compound is effective for preventing gelation during polymerization and deferring gelation during storage.

The polymerization method is not specifically limited. Any one of batch, semicontinuous and continuous methods can be employed.

The reaction temperature in the copolymerization is properly selected from the range of, generally, from $-30°$ to $+150°$ C. depending upon the kinds of polymerization initiating source and polymerization medium. The reaction temperature usually selected is in the range of from $0°$ to $100°$ C., preferably in the range of from $10°$ to $90°$ C. The reaction pressure is not specially limited, and the reaction is generally carried out at a pressure of not more than 100 kg/cm². Further, in the copolymerization, a proper chain transfer agent can be added in order to adjust the molecular weight and molecular weight distribution.

The resultant resin can be purified by reprecipitation, or may be used as it is without carrying out the reprecipitation.

In the fluorine-containing resin of the present invention, the number average molecular weight, measured in a tetrahydrofuran as a solvent and monodisperse polystyrene as a reference substance by gel permeation chromatography (CPC), is 500 to 200,000, preferably 2,000 to 100,000, and the glass transition temperature (Tg) is usually $-50°$ to $120°$ C., preferably $-10°$ to $100°$ C.

The fluorine-containing resin that contains a hydroxyl group as a curing site, provided by the present invention, can be heat-cured or cold cured by means of a curing agent used for general thermosetting acrylic coating compositions, such as polyvalent isocyanate, a melamine curing agent, a urea resin curing agent or a polybasic acid curing agent.

Examples of the polyvalent isocyanate preferably include nonyellowing diisocyanate such as hexamethylene diisocyanate and isophorone diisocyanate, heat-dissociating blocked compounds of these diisocyanates, compounds having a uretdion ring, and polyvalent isocyanates having an isocyanurate ring or heat-dissociating blocked compounds thereof. Of these, particularly preferred are polyvalent isocyanates having an isocyanurate ring, which have good compatibility with a fluorine-containing resin, or a heat-dissociating blocked compound thereof. When the fluorine-containing resin is cold-cured in the presence of such a polyvalent isocyanate, the curing can be promoted by adding a known catalyst such as dibutyltin dilaurate.

The present invention provides not only the above novel fluorine-containing resin but also a fluorine-based coating composition containing it as a main agent. When the fluorine-containing resin is converted to a solution type coating composition, a variety of solvents can be used.

Examples of the solvents include aromatic hydrocarbons such as toluene and xylene; alcohols such as n-butanol; esters such as n-butyl acetate; ketones such as methyl isobutyl ketone; glycol ethers such as ethyl cellosolve; and various commercially available diluents.

The above solution-type coating composition can be prepared by homogeneously mixing the fluorine-containing resin and a solvent by means of a mixer generally used for the preparation of coating compositions, such as a ball mill, a paint shaker, a sand mill, a jet mill, a three-roll mill and a kneader. During this mixing, a pigment, a dispersion stabilizer, a viscosity adjuster, a leveling agent, a gelation preventer and an ultraviolet light absorber can be added as required.

The fluorine-containing resin having the above described composition, molecular weight and glass transition temperature, provided by the present invention, is soluble in an organic solvent and excellent in compatibility with a curing agent, and has good storage stability. Moreover, the coating composition containing the fluorine-containing resin as a main agent gives a cured coating which has gloss, high hardness and excellent weatherability. Further, the fluorine-containing resin is copolymerized with various monomers or blended with an acrylic polymer having various functions, whereby there can be obtained the fluorine-containing resin, the coating composition and a coating which are excellent in hardness, impact resistance, flexibility, hydrophilic nature (solubility in water), storage stability, water and oil repellency, pigment dispersibility, adhesion to a substrate, drying properties, a pot life, contamination resistance, and the like.

EXAMPLES

The present invention will be described further in detail by reference to examples. However, the present invention shall not be limited by these examples.

Typical evaluation methods used in the examples are as follows.

(1) Molecular Weights of Resins

Determined on the basis of a calibration curve prepared by gel permeation chromatography using polystyrene as a reference.

(Apparatus) Device: CL-3A, Shimadzu Corporation
Column: TSKgel G-5000 HXL
TSKgel G-4000 HXL
TSKgel G-2000 HXL
Toso Ltd.
Detector: RID-6A, Shimadzu Corporation
Data processing: C-R4A, Shimadzu Corporation
Carrier: Tetrahydrofuran (2) Glass Transition Temperatures (Tg) of Resins Measured with the following apparatus under the following measurement conditions.

(Apparatus): Device for differential thermal, thermogravimetric simultaneous measurement SSC 5000 DSC 200 (supplied by Seiko Denshi Kogyo K. K.)

(Measurement conditions): $-40°$ to $120°$ C., temperature elevation ($5°$ C./minute or $10°$ C./minute)

(3) Hydroxyl Value, Acid Value

Measured according to JIS K-0070.

(4) Gloss, Flexibility and Adhesion (Al)

Measured according to JIS K-5400.

(5) Infrared Absorption Spectrum (IR Spectrum)

Measured with an FT-IR-5M type apparatus supplied by Nippon Bunko K. K.

Measured according to ISO-1522.

(7) Weatherability

Determined according to ASTM G-53

An accelerated weathering test was carried out with a "QUV" tester supplied by The Q-Panel Company, and samples having a gloss retention ratio of at least 90% after 3,000 hours were taken as meeting the standard.

(8) Measurement of Epoxy Value

Carried out according to the ASTM-D-1652 method.

(9) Mixing and Application

A resin solution from each of the examples and comparative examples was mixed with "Durante TPA" (supplied by Asahi Chemical Industry Co., Ltd.) as a curing agent such that the NCO/OH equivalent weight ratio was 1/1, and the resultant composition was adjusted to a viscosity of 15 seconds by a Ford cup #4 with xylene as a diluent, and applied.

(10) Pigment Dispersibility

A resin solution and a pigment were mixed to form a composition having a predetermined concentration, by weight of the pigment, and these components were mutually dispersed with a sand mill for 2 hours. The resultant dispersion was subjected to the above "mixing and application", and the degrees of the gloss and the pigment aggregation were visually evaluated.

The method of evaluation of the pigment dispersibility of carbon black as a pigment will be described in detail in the examples.

(11) Compatibility

The transparency of a clear coating composition according to the above "mixing and application" was visually evaluated.

(12) Contamination Resistance

A coating was contaminated with a felt-tipped marker in red ink, and allowed to stand at 20° C. for 24 hours. The red ink was wiped off with petroleum benzine/ethanol (50/50), and the degree of contamination was examined.

(13) Water Repellency

The contact angle between a coating and water was measured.

(14) Oil Repellency

The contact angle between a coating and tetradecane was measured.

(15) Color Number (APHA Color)

Measured according to ASTM D1209.

(16) Storage Stability

Evaluated on the basis of the ratio between the viscosity of a sample stored at 50° C. for 1 month and that of the sample before the test.

The abbreviations in the examples stand for the following:

| | |
|---|---|
| CTFE | chlorotrifluoroethylene |
| HFP | hexafluoropropylene |
| HBVE | 4-hydroxybutyl vinyl ether |

$$CH_2=CH\diagdown O-(CH_2)_4-OH$$

| | |
|---|---|
| CHBVE | |

$$CH_2=CH\diagdown O-(CH_2)_4-O-\underset{\underset{O}{\|}}{C}-NH-\langle H \rangle$$

| | |
|---|---|
| 2,3-DHF | 2,3-dihydrofuran (to be also referred to as "DHF") |
| 3,4-DH-2-MP | 3,4-dihydro-2-methoxypyran |
| DHDMPO | 3,4-dihydro-4,4-dimethyl-2H-pyran-2-one |
| EVE | Ethyl vinyl ether |
| IBVE | isobutyl vinyl ether |
| GlyAE | glycidyl allyl ether |
| GlyVE | glycidyl vinyl ether |
| VV-9 | vinyl versate (VeoVa 9, supplied by Shell Chemical) |
| VPv | vinyl pivalate |
| MMA | methyl methacrylate |
| CHMA | cyclohexyl methacarylate |
| HEMA | 2-hydroxyethyl methacrylate |
| IBMA | isobornyl methacrylate |
| BA | butyl acrylate |
| BMA | butyl methacrylate |
| HMPB | 2-hydroxy-4-(3-methacryloxy-2-hydroxypropoxy)benzophenone |
| FOEM | 2-perfluorooctylethyl methacrylate |
| FOEA | 2-perfluorooctylethyl acrylate |
| OFPMA | 2,2,3,3,4,4,5,5-octafluoropentyl methacrylate |
| PMPN | 4-methacryloyloxy-1,2,2,6,6-pentamethylpiperidine |
| TMPN | 4-methacryloyloxy-2,2,8,6-tetramethylpiperidine |
| AIBN | azobisisobutyronitrile |
| Perbutyl PV or BPOPV | tetra-butylperoxypivalate [(CH$_3$)$_3$CCOO—O—C(CH$_3$)$_3$] |
| Peroyl O | C$_8$H$_{17}$COO—OOCC$_8$H$_{17}$ |
| OPO | octanoyl peroxide |
| ADVN | 2,2'-azobis-(2,4-dimethylvaleronitrile) |
| CHI | cyclohexyl isocyanate |
| IPDI | 3-isocyanatomethyl-3,5,5-trimethyl-cyclohexyl isocyanate |
| n-Hi | n-hexyl isocyanate |
| BTL | dibutyltin dilaurate |
| MIBK | methyl isobutyl ketone |

EXAMPLE 1-1

A one-liter stainless steel autoclave equipped with an agitator was flushed with a nitrogen gas three times.

Then, the autoclave was charged with 186.5 g of butyl acetate, 70 g of 2,3-DHF, 116.5 g of CTFE and perbutyl PV in an amount of 0.5 mol % based on the total monomer amount, and the temperature inside the autoclave was gradually increased up to 67° C. The monomers were polymerized for 8 hours with stirring, and then unreacted CTFE was removed. The autoclave was opened, and the formed copolymer solution was withdrawn. The copolymer solution was subjected to reprecipitation with n-hexane, and the resultant copolymer was dried.

The above-obtained copolymer had a number average molecular weight of 4,500 and was soluble in solvents such as butyl acetate, toluene and xylene.

EXAMPLE 1-2

A one-liter autoclave equipped with a stainless steel agitator was flushed with a nitrogen gas three times.

Then, the autoclave was charged with 117 g of 4-hydroxybutyl vinyl ether, 125 g of cyclohexyl isocyanate and 242 g of xylene, and the resultant mixture was allowed to react at 80° C. for 6 hours. Thereafter, the autoclave was further charged with 116.5 g of xylene, 116.5 g of chlorotrifluoroethylene and peroyl O in an amount of 0.5 mol % based on the total monomer amount, and the monomers were polymerized at 73° C. for 8 hours.

Then, the reaction solution was treated in the same manner as in Example 1-1, and the results shown in Table 1-1 were obtained.

EXAMPLE 1-3

A copolymer was synthesized from the components shown in Table 1-1 in the same manner as in Examples 1-1 and 1-2 to give the results shown in Table 1-1.

TABLE 1-1

| | | Example No. | | |
|---|---|---|---|---|
| | | 1-1 | 1-2 | 1-3 |
| Charged Components | CTFE | 116.5 g | 116.5 g | 116.5 g |
| | CHI | | 125 g | 75 g |
| | HBVE | | 117 g | 70.2 g |
| | 2,3-DHF | 70 g | | 28 g |
| | Peroyl O | | 0.5 mol % | |
| | Perbutyl PV | 0.5 mol % | | 0.5 mol % |
| | Xylene 1) | | (242 g) 116.5 g | |
| | Butyl acetate | 186.5 g | | (145 g) 145 g |
| | Temperature °C. 1) | 67 | (80) 73 | 67 |
| | Time hr 1) | 8 | (6) 8 | 8 |
| | Yield | | 90% | 80% |
| | Number average molecular weight | 4,500 | 10,500 | 8,200 |
| Solubility | | | | |
| | xylene | soluble | soluble | soluble |
| | toluene | soluble | soluble | soluble |

TABLE 1-1-continued

| | Example No. | | |
|---|---|---|---|
| | 1-1 | 1-2 | 1-3 |
| butyl acetate | soluble | soluble | soluble |

Note 1) Reaction conditions for urethanation in parentheses

EXAMPLE 2-1

126 Grams of CTFE, 47 g of EVE and 50 g of HBVE were polymerized in a xylene/methyl isobutyl ketone (MIBK) mixed solvent in the presence of AIBN as an initiator, and the reaction mixture was subjected to purification and solids content adjustment to give a fluorine-containing copolymer containing a hydroxyl group, which had a solids content of 50%, a resin content hydroxyl value of 130 mgKOH/g (the same unit is to be applied hereinafter) and a number average molecular weight of about 12,000. This copolymer is referred to as [Resin 2-A] hereinafter.

100 Grams of Resin 2-A and 3.9 g of CHI dissolved in 3.9 g of MIBK were allowed to react in the presence of dibutyltin dilaurate as a catalyst at 80° C. for 4 hours until the disappearance of NCO groups was confirmed by infrared absorption spectrum (IR).

The resultant solution of a fluorine-containing resin having a hydroxyl group was a yellowish transparent liquid, and had a solids content of 50%, a resin content hydroxyl value of 88 and a number average molecular weight of about 13,000. This resin solution for a coating composition is referred to a [polyol (1)] hereinafter.

FIG. 1A and FIG. 1B show IR spectra of the material [Resin 2-A] and the product [polyol (1)]. In the IR spectrum chart of [polyol (1)]in FIG. 1B, absorption derived from a urethane bond is observed around 1,700 cm$^1$, and this clearly shows that the [polyol (1)] had a cyclic hydrocarbon group (cyclohexyl group) introduced through a urethane bond.

EXAMPLES 2-2, 2-3 and 2-5

The reaction was carried out in the same manner as in Example 2-1 under the conditions shown in Table 2-1 to give the results shown in Table 2-1.

EXAMPLE 2-4

222 Grams of IPDI and 7.4 g of isobutyl alcohol were allowed to react at 100° C. for 3 hours, and excess IPDI was removed with a thin film evaporator to give a half-blocked compound of IPDI with isobutyl alcohol, having a purity of 93%.

Then the reaction was carried out in the same manner as in Example 2-1 under the conditions shown in Table 2-1. The results shown in Table 2-1 were obtained.

EXAMPLE 2-6

An autoclave was charged with 46 g of HBVE, 60 g of IBVE, 250 g of xylene and 25 g of CHI, and dibutyltin dilaurate in an amount of 40 ppm based on the CHI. The resultant mixture was allowed to react at 60° C. for 1 hour. Then, 119 g of CTFE was charged to the autoclave, and the mixture was polymerized at 87° C. for 8 hours in the presence of perbutyl-PV as an initiator and potassium carbonate as a stabilizer. The reaction mixture was solids-adjusted with xylene to give a solution of a fluorine-containing resin having a hydroxyl group, which had a solids content of 50%, a resin content hydroxyl value of 49 and a number average molecular weight of 9,000. This resin solution is referred to as [polyol (6)] hereinafter.

COMPARATIVE EXAMPLE 2-1

The reaction was carried out in the same manner as in Example 2-1 under the conditions shown in Table 2-1 to give the results shown in Table 2-1.

TABLE 2-1

| | | Example No. | | | | | |
|---|---|---|---|---|---|---|---|
| | | 2-1 | | 2-2 | | 2-3 | |
| | | Resin 2-A | Polyol 1 | Resin 2-A | Polyol 2 | Resin 2-B | Polyol 3 |
| Charged components | | | Resin 2-A 100 g | | | | Resin 2-A 100 g |
| | CHI | | 3.9 g | | 7.5 g | | 4.8 g |
| | IPDI-B Note 1) | | | | | | |
| | n-HI | | | | | | |
| | BTL Note 2) | | 200 ppm | | 200 ppm | | 200 ppm |
| | CTFE | 126 g | | 126 g | | | |
| | HFP | | | | | 216 g | |
| | HBVE | 50 g | | 50 g | | 77 g | |
| Charged components | EVE | 47 g | | 47 g | | | |
| | IBVE | | | | | 78 g | |
| | VV-9 | | | | | | |
| | AIBN | 1.6 g | | 1.6 g | | | |
| | Perbutyl PV | | | | | 1.5 g | |
| | K$_2$CO$_3$ | 7.7 g | | 7.7 g | | 7.7 g | |
| | Xylene | 125 g | | 125 g | | 410 g | |
| | MIBK | 125 g | 3.9 g | 125 g | 7.5 g | | 4.8 g |
| | Temperature °C. | 65 | 80 | 65 | | 67 | 75 |
| | Time hr | 8 | 4 | 8 | | 8 | 4 |
| | Solids content concentration | 50% | 50% | 50% | 50% | 50% | 50% |
| | Hydroxyl value Note 4) | 130 | 88 | 130 | 55 | 87 | 40 |
| | Number average molecular weight | 12,000 | 13,000 | 12,000 | 14,000 | 33,000 | 36,000 |
| | IR chart No. | FIG. 1A | FIG. 1B | | | FIG. 2A | FIG. 2B |

| | Example No. | | | |
|---|---|---|---|---|
| | 2-4 | 2-5 | 2-6 | Comparative Example 2-1 |

TABLE 2-1-continued

|  |  | Polyol 4 | Resin 2-C | Polyol 5 | Polyol 6 | Polyol I |
|---|---|---|---|---|---|---|
| Charged Components | | Resin 2-B 100 g | | Resin 2-C 100 g | | Resin 2-B 100 g |
| | CHI | | | 4.9 g | 25 g | |
| | IPDI-B Note 1) | 10 g | | | | |
| | n-HI | | | | | 4.8 g |
| | BTL Note 2) | 200 ppm | | 200 ppm | 40 PPM Note 2) | 40 ppm |
| | CTFE | | | | 119 g | |
| | HFP | | 216 g | | | |
| | HBVE | | 90 g | | 46 g | |
| | EVE | | | | | |
| | IBVE | | | | 60 g | |
| | VV-9 | | 130 g | | | |
| | AIBN | | | | | |
| | Perbutyl PV | | 1.5 g | | 1.9 g | |
| | $K_2CO_3$ | | 7.7 g | | 7.7 g | |
| | Xylene | | | | 250 g | |
| | MIBK | 10 g | 440 g | 4.9 g | | 4.8 g |
| | Temperature °C. | 80 | 67 | 75 | (60) 67 Note 3) | 75 |
| | Time hr | 4 | 8 | 4 | (1) 8 Note 3) | 4 |
| | Solids content concentration | 50% | 50% | 50% | 50% | 50% |
| | Hydroxyl value Note 4) | 43 | 110 | 60 | 49 | 40 |
| | Number average molecular weight | 40,000 | 30,000 | 34,000 | 9,000 | 36,000 |
| | IR chart No. | | | | | |

Note
1) Half-blocked product of IPDI with isobutyl alcohol
2) Value based on isocyanate
3) Reaction conditions for urethanation in parentheses Radical polymerization conditions not in parentheses
4) Unit: mgKOH/g

EXAMPLES 2-7 to 2-12 AND COMPARATIVE EXAMPLES 2-2 to 2-5

The fluorine-containing resins having a hydroxyl group (polyols (1) to (6)) for a coating composition, obtained in Examples 2-1 to 2-6 were respectively mixed with Duranate TPA-100 (hexamethylene diisocyanate-based isocyanurate type curing agent; NCO content=23.3) as a curing agent such that the OH/NCO equivalent weight ratio was 1.0, and the resultant compositions were adjusted to a viscosity of 15 seconds by a Ford cup #4 with a xylene/MIBK mixed solvent as a diluent. The compositions were respectively applied to form coatings and the coatings were measured for coating properties (Examples 2-7 to 2-12). A system containing the polyol I obtained in Comparative Example 2-1 and systems each of which contained, as a polyol, the resin 2-A, 2-B or 2-C were also applied to form coatings in the same manner as in Examples 2-7 to 2-12, and the coatings were measured for coating properties (Comparative Examples 2-2 to 2-5).

Table 2-2 shows the results.

TABLE 2-2

| | | Physical properties of coating | | | | |
|---|---|---|---|---|---|---|
| Example | Polyol | Coating[1] appearance (compatibility with curing agent) | König hardness | Impact resistance (½" · 500 g) | Adhesion[2] (Al plate) | Weather-[3] ability (QUV) |
| Example 2-7 | Polyol ① | ○ | 125 | 50 or more | ○ | ⊙ |
| Example 2-8 | Polyol ② | ○ | 130 | 50 or more | ○ | ⊙ |
| Example 2-9 | Polyol ③ | ○ | 124 | 50 or more | ⊙ | ⊙ |
| Example 2-10 | Polyol ④ | ○ | 135 | 50 or more | ⊙ | ⊙ |
| Example 2-11 | Polyol ⑤ | ○ | 120 | 50 or more | ○ | ⊙ |
| Example 2-12 | Polyol ⑥ | ○ | 130 | 50 or more | ⊙ | ⊙ |
| Comparative Example 2-2 | Polyol I | ○ | 90 | 50 or more | ○ | ⊙ |
| Comparative Example 2-3 | Resin 2-A | x→○ | 120 | 50 or more | x | ⊙ |
| Comparative Example 2-4 | Resin 2-B | x | 110 | 50 or more | x | * |
| Comparative Example 2-5 | Resin 2-C | x | 100 | 50 or more | x | * |

[1] ○: Transparent coating (compatibility with curing agent = ○).
x→○: Opaque coating at time of coating and the coating became transparent as curing progressed.
x: Opaque coating (compatibility with curing agent = x).
[2] ⊙: 100/100
○: 99/100 ~ 50/100
x: Not more than 49/100
[3] According to ASTM G-53
⊙: Gloss retention ratio of 95% or more after 3000 hours with QUV.
*: Could not be evaluated due to defects in coating appearance.

In Table 2-2, the comparison of Examples 2-7 and 2-8 with Comparative Example 2-3, the comparison of Examples 2-9 and 2-10 with Comparative Example 2-4, the comparison of Example 2-11 with Comparative Example 2-5, and Example 2-12 clearly shows the following: The resin for a coating composition, provided by the present invention, had excellent compatibility with a curing agent, and the coating composition of the present invention had excellent coating properties (particularly hardness and adhesion).

Further, on the basis of the comparison of Example 2-9 with Comparative Example 2-2, the effect of the introduction of a cyclic hydrocarbon group can be understood.

Figure 3A:
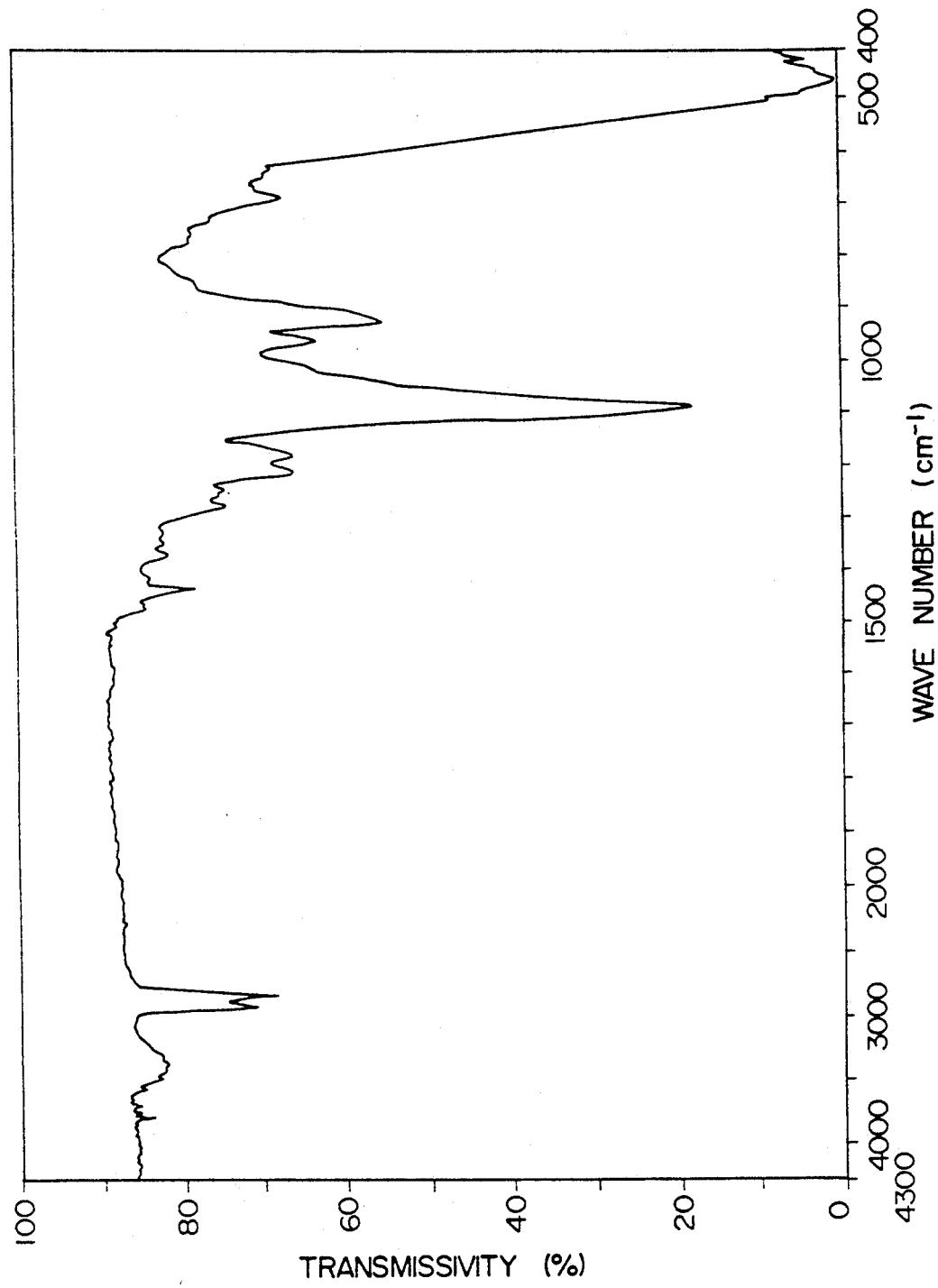

FIG. 3A shows the IR spectrum of the above copolymer. An absorption by an endocyclic C—O stretching derived from the 2,3-DHF unit is observed at 940 cm$^{-1}$, and an absorption by an endocyclic C—H deformation vibration, at 1,450 cm$^{-1}$.

EXAMPLES 3-2 AND 3-3

Fluorine-containing resins were synthesized under the conditions shown in Table 3-1 in the same manner as in Example 3-1 to give the results shown in Table 3-1.

COMPARATIVE EXAMPLE 3-1

Fluorine-containing resin was synthesized under the conditions shown in Table 3-1 in the same manner as in Example 3-1 to give the results shown in Table 3-1.

TABLE 3-1

Figure 4:
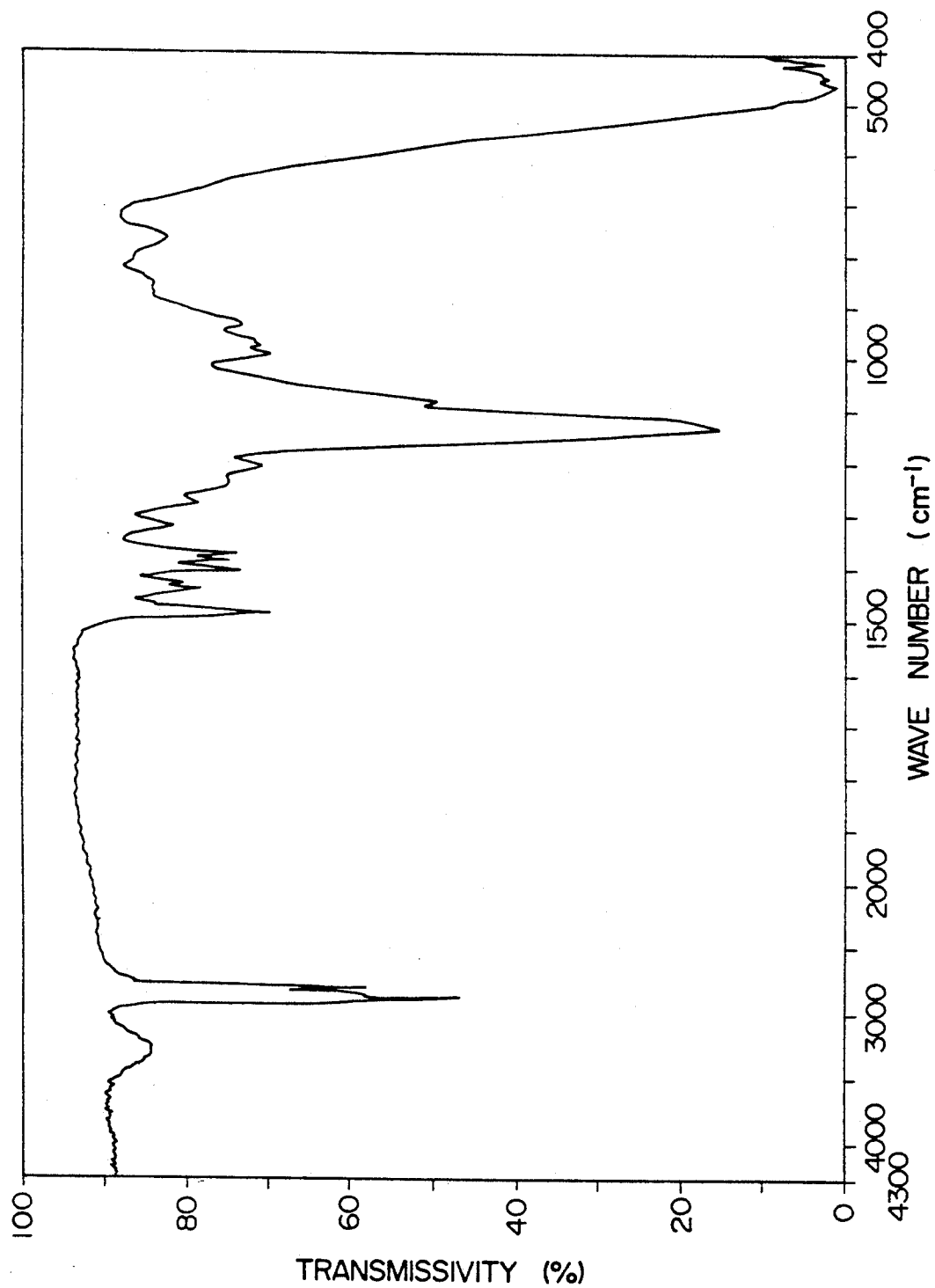
FIG. 4 shows an IR spectrum of the copolymer obtained in Comparative Example 3-1.

| | | Example No. 3-1 | Example No. 3-2 | Example No. 3-3 | Comparative Example 3-1 |
|---|---|---|---|---|---|
| Charged components | CTFE | 117 g | 117 g | 117 g | 117 g |
| | HBVE | 20 g | 23 g | 23 g | 23 g |
| | 2,3-DHF | 58 g | 21 g | | |
| | 3,4-DH-2-MP | | | 34 g | |
| | IBVE | | 50 g | 50 g | 80 g |
| | ADVN | 2.5 g | 2.5 g | 2.5 g | 1.5 g |
| | K$_2$CO$_3$ | 7.7 g | 7.7 g | 7.7 g | 7.7 g |
| | Xylene | 195 g | 210 g | 225 g | 220 g |
| | Temperature °C. | 65 | 65 | 65 | 65 |
| | Time hr | 8 | 8 | 8 | 8 |
| | Yield | 93 g | 160 g | 116 g | 192 g |
| | Solids content concentration | | | | |
| | Hydroxyl value Note) | 74 | 65 | 65 | 65 |
| | Number average molecular weight | 4,000 | 10,000 | 10,000 | 27,000 |
| | Tg | 76 | 31 | 25 | 20 |
| | IR chart No. | FIG. 3A | FIG. 3B | FIG. 3C | FIG. 4 |

Note) Unit: mgKOH/g

EXAMPLE 3-1

A one-liter stainless steel autoclave equipped with an agitator was charged with 7.7 g of potassium carbonate, and flushed with a nitrogen gas three times. Then, the autoclave was charged with 58 g of 2,3-DHF, 20 g of HBVE, 117 g of CTFE, 2.5 g of 2,2'-azobis(2,4-dimethylvaleronitrile) and 195 g of xylene, and the temperature inside the autoclave was gradually increased up to 65° C. These monomers were polymerized for 8 hours, and then unreacted CTFE was removed. The autoclave was opened, and the formed copolymer solution was withdrawn. Potassium carbonate was removed from this copolymer solution by filtration, then the copolymer solution was subjected to reprecipitation with n-hexane, and the resultant copolymer was dried. The yield of the copolymer was 93 g.

The above-obtained copolymer had a number average molecular weight of 4,000, a glass transition temperature of 76° C. and a hydroxyl value of 74 mgKOH/g. The compositional ratio of this copolymer was subjected to elemental analysis to show that it had a CTFE unit/2,3-DHF unit/HBVE unit molar ratio of 48/39/13.

EXAMPLES 3-4 - 3-6

10 Grams of each of the fluorine-containing copolymers obtained in Examples 3-1 to 3-3 was, separately from the others, dissolved in 10 g of xylene, and "Duranate TPA" (supplied by Asahi Chemical Industry Co., Ltd.) as a curing agent was blended with each solution such that the NCO/OH ratio was 1/1. The resultant compositions were adjusted to a viscosity of 15 seconds by a Ford cup #4 with xylene as a diluent, and applied to form coatings.

The above-obtained coatings were baked at 120° C. for 1 hour, and measured for coating properties (Examples 3-4 to 3-6).

Table 3-2 shows the results.

COMPARATIVE EXAMPLE 3-2

A coating was formed from the fluorine-containing copolymer obtained in Comparative Example 3-1 in the same manner as in Examples 3-4 to 3-6, and measured for coating properties.

Table 3-2 shows the results.

TABLE 3-2

| | Resin for coating composition | Example 3-4 Copolymer from Example 3-1 | Example 3-5 Copolymer from Example 3-2 | Example 3-6 Copolymer from Example 3-3 | Comparative Example 3-2 Copolymer from Comparative Example 3-1 |
|---|---|---|---|---|---|
| Coating compo- | (Glass transition | (76° C.) | (31° C.) | (25° C.) | (20° C.) |

TABLE 3-2-continued

| Resin for coating composition | | Example 3-4 Copolymer from Example 3-1 | Example 3-5 Copolymer from Example 3-2 | Example 3-6 Copolymer from Example 3-3 | Comparative Example 3-2 Copolymer from Comparative Example 3-1 |
|---|---|---|---|---|---|
| sition | temperature) | | | | |
| | Curing agent | TPA[1] | TPA[1] | TPA[1] | TPA[1] |
| Physical proper- ties of coating | Transparency[2] of coating | o | o | o | Δ |
| | Gloss of coating | 87% | 86% | 85% | 82% |
| | Hardness of coating | 135 | 130 | 125 | 115 |
| | Flexibility[3] | o | o | o | o |
| | Weatherability[4] | o | o | o | o |

Note
[1] Isocyanurated trimer of hexamethylene diisocyanate NCO content = 23.3%.
[2] o: Excellent transparency, Δ: slightly opaque.
[3] o: Acceptable at 2 mmφ test.
[4] o: QUV test: Gloss retention ratio of not less than 95% after 3000 hours.

As shown in Table 3, the fluorine-containing copolymer according to the present invention has a high glass transition temperature, and, when used as a resin in a coating composition, exhibits excellent coating transparency and gloss. Further, a coating obtained therefrom has high hardness.

EXAMPLE 4-1

A one-liter stainless steel autoclave equipped with an agitator was flushed with a nitrogen gas three times, and charged with 2.1 g of 4-methacryloyloxy-1,2,2,6,6-pentamethylpiperidine, 23.2 g of 4-hydroxybutyl vinyl ether, 21.0 g of 2,3-dihydrofuran, 50.0 g of isobutyl vinyl ether, 116.5 g of chlorotrifluoroethylene, 1.7 g of tert-butylperoxypivalate and 211.0 g of n-butyl acetate. The temperature inside the autoclave was gradually increased up to 65° C. After these monomers were polymerized for 8 hours, the autoclave was opened, and the resultant copolymer solution was withdrawn.

The above copolymer solution was subjected to re-precipitation with n-hexane, and the precipitated copolymer was dried. The yield of the copolymer was 197.6 g.

Figure 5:
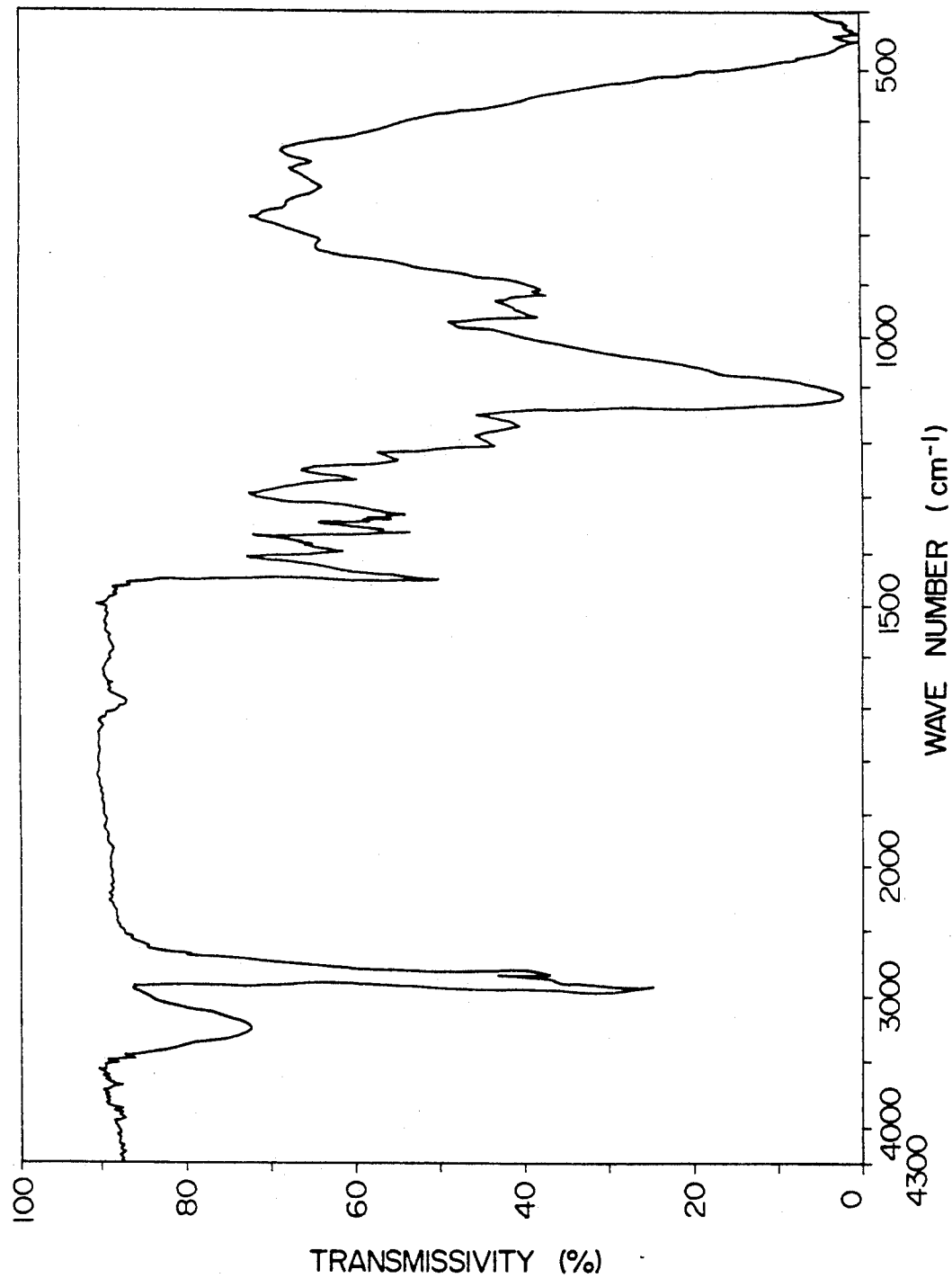
FIG. 5 is an IR spectrum of the fluorine-containing resin obtained in Example 4-1.

The above-obtained copolymer had a number average molecular weight of 9,500, a fluorine content of 26.7 g and a hydroxyl value of 55 mgKOH/g. It was confirmed by chromatography that no unreacted 4-methacryloyloxy-1,2,2,6,6-pentamethylpiperidine was present. FIG. 5 shows the IR spectrum of the fluorine-containing resin.

EXAMPLES 4-2 AND 4-3

A fluorine-containing resin was synthesized under the conditions shown in Table 4-1 in the same manner as in Example 4-1 to give the results shown in Table 4-1.

4-4, 4-5 AND 4-6

10 Grams of each of the fluorine-containing resins obtained in Examples 4-1 to 4-3 was, separately from the others, dissolved in 10 g of xylene (with the exception that 20 g of the fluorine-containing resin solution obtained in Example 4-3 was used), and "Durante TPA" (supplied by Asahi Chemical Industry Co., Ltd.) was added to each solution such that the NCO/OH ratio was 1/1. Thereafter, the resultant compositions were respectively adjusted to a viscosity of 15 seconds by a Ford cup #4 with xylene as a diluent, and applied to form coatings.

The resultant coatings were baked at 120° C. for 1 hour, and measured for coating properties. Further, 10 g of each of the fluorine-containing resins obtained in Examples 4-1, 4-2 and 4-3 was separately dissolved in 10 g of xylene. The resultant solutions were respectively charged into glass bottles, and tightly closed.

The solutions in the bottles were kept at 50° C. for 30 days to observe changes in their viscosities.

Table 4-2 shows the results.

Even after 30 days, almost no change occurred in the viscosities, i.e., the fluorine-containing resins shows excellent storage stability.

TABLE 4-1

| | | Example | | |
|---|---|---|---|---|
| | | 4-1 | 4-2 | 4-3 |
| Charged compo- ments | CTFE | 116.5 g | 116.5 g | 50.0 g |
| | HBVE | 23.2 g | 23.2 g | 9.9 g |
| | 2,3-DHF | 21.0 g | 14.0 g | 9.0 g |
| | PMPN | 2.1 g | 0.48 g | 0.6 g |
| | TMPN | | | |
| | EVE | | 14.4 g | |
| | IBVE | 50.0 g | 39.8 g | 21.3 g |
| | VPv | | | |
| | MMA | | | 1.30 g |
| | HEMA | | | 1.80 g |
| | BA | | | 2.0 g |
| | OFPMA | | | 4.40 g |
| | K$_2$CO$_3$ | | 7.7 g | |
| | Perbutyl PV | 1.7 g | 2.49 g | 1.7 g |
| | Xylene | | | |
| | MIBK | | | |
| | Butyl acetate | 211.0 g | 208.4 g | 100 g |
| | Temperature °C. | 65 | 67 | 65 |
| | Time hr | 8 | 8 | 8 |
| | Fluorine content | 26.7 wt % | | 24.3 wt % |
| | Solids content concentration | | | |
| | Yield | 197.6 g | 20.18 g | 90.7 g |
| | Hydroxyl value Note 1) | 55 | 55 | 59 |
| | Number average molecular weight | 9,500 | 13,300 | 6,300 |
| | Distribution Mw/Mn | | 3.8 | |
| | IR chart No. | FIG. 5 | | |

Note 1) Unit: mgKOH/g

TABLE 4-2

| | | Example 4-4 | Example 4-5 | Example 4-6 |
|---|---|---|---|---|
| Coating compo- sition | Resin for coat- ing composition | Resin from Example 4-1 | Resin from Example 4-2 | Resin from Example 4-3 |

TABLE 4-2-continued

|  |  | Example 4-4 | Example 4-5 | Example 4-6 |
|---|---|---|---|---|
| Properties of coating | Curing agent | TPA[1] | TPA | TPA |
|  | Transparency[2] of coating | o | o | o |
|  | Gloss of coating | 89% | 90% | 90% |
|  | Hardness of coating | 140 | 142 | 142 |
|  | Flexibility[3] | o | o | o |
|  | Weatherability[4] | 95% | 95% | 92% |
| Storage stability[5] |  | 1.10 | 1.20 | 1.20 |

Note
[1] Isocyanurated trimer of hexamethylene diisocyanate NCO content = 23.3%.
[2] o: Excellent transparency, Δ: slightly opaque.
[3] o: Acceptable at 2 mmϕ test.
[4] QUV test: Gloss retention ratio after 3000 hours.
[5] Ratio of viscosity after storage for 1 month to viscosity before storage. (Containing no curing agent.)

EXAMPLES 4-7

The resin obtained in Example 4-2 (adjusted to a solids content of 50%) was evaluated for pot life, drying properties, Al adhesion and storage stability in the following manner. Table 4-3 shows the results.

Drying Properties

Five sheets of gauze were stacked on a coating cured on a glass plate at room temperature (20° C.), a weight of 100 g was placed thereon for 1 minute, and then the weight and gauze were removed. The print of the gauze was visually observed. The time until no print of the gauze was formed was measured.

Pot Life

The time was measured until a coating composition solution containing a curing agent lost its fluidity while it was allowed to stand at room temperature (20°).

Al Adhesion

Measured according to JIS K-5400.

Coating Conditions

Curing agent Duranate TPA-100 (Asahi Chemical Industry Co., Ltd)
NCO/OH = 1
Solids content: 40% adjusted with xylene
Coating thickness: 40-50 microns
Baking conditions: 120° C. 1 hour

Storage Stability

The coating composition containing no curing agent was allowed to stand at 50° C. for 1 month, and then measured for molecular weight.

COMPARATIVE EXAMPLES 4-1 AND 4-2

Commercially available fluorine-containing polyols, supplied by A and B Companies, were evaluated in the same manner as in Example 4-7. Table 4-3 shows the results. The fluorine-containing resin of the present invention was excellent in pot life, drying properties, Al adhesion and storage stability.

TABLE 4-3

|  | Example 4-7 Resin from Example 4-2 | Comp. Example 4-1 Fluorine containing polyol from A company | Comp. Example 4-2 Fluorine containing polyol from B company |
|---|---|---|---|
| Pot life | 110 hours | 75 | 35 |
| Drying properties | 60 | 80 | 90 |
| Al adhesion | 10 | 10 | 6 |
| Storage stability Mw/Mn | Initial 3.8 after one month 3.8 | Initial 3.2 after one month 5.3 |  |

EXAMPLE 5-1

A one-liter stainless steel autoclave equipped with an agitator was flushed with a nitrogen gas three times.

Then, the autoclave was charged with 49 g of 4-hydroxybutyl vinyl ether, 25 g of cyclohexyl isocyanate and 74 g of xylene, and the resultant mixture was allowed to react at 80° C. for 6 hours. Thereafter, the autoclave was charged with 1.3 g of 4-methacryloyloxy-1,2,2,6,6-pentamethylpiperidine, 57 g of isobutyl vinyl ether, 117 g of chlorotrifluoroethylene, 175 g of xylene and 2.8 g of octanoyl peroxide as an initiator, and the monomers were polymerized at 73° C. for 8 hours. After the polymerization, unreacted chlorotrifluoroethylene was removed. Then, the autoclave was opened, and the formed copolymer solution was withdrawn. This copolymer solution was subjected to reprecipitation with n-hexane, and the resultant copolymer was dried. The yield of the copolymer was 238 g.

Figure 6:
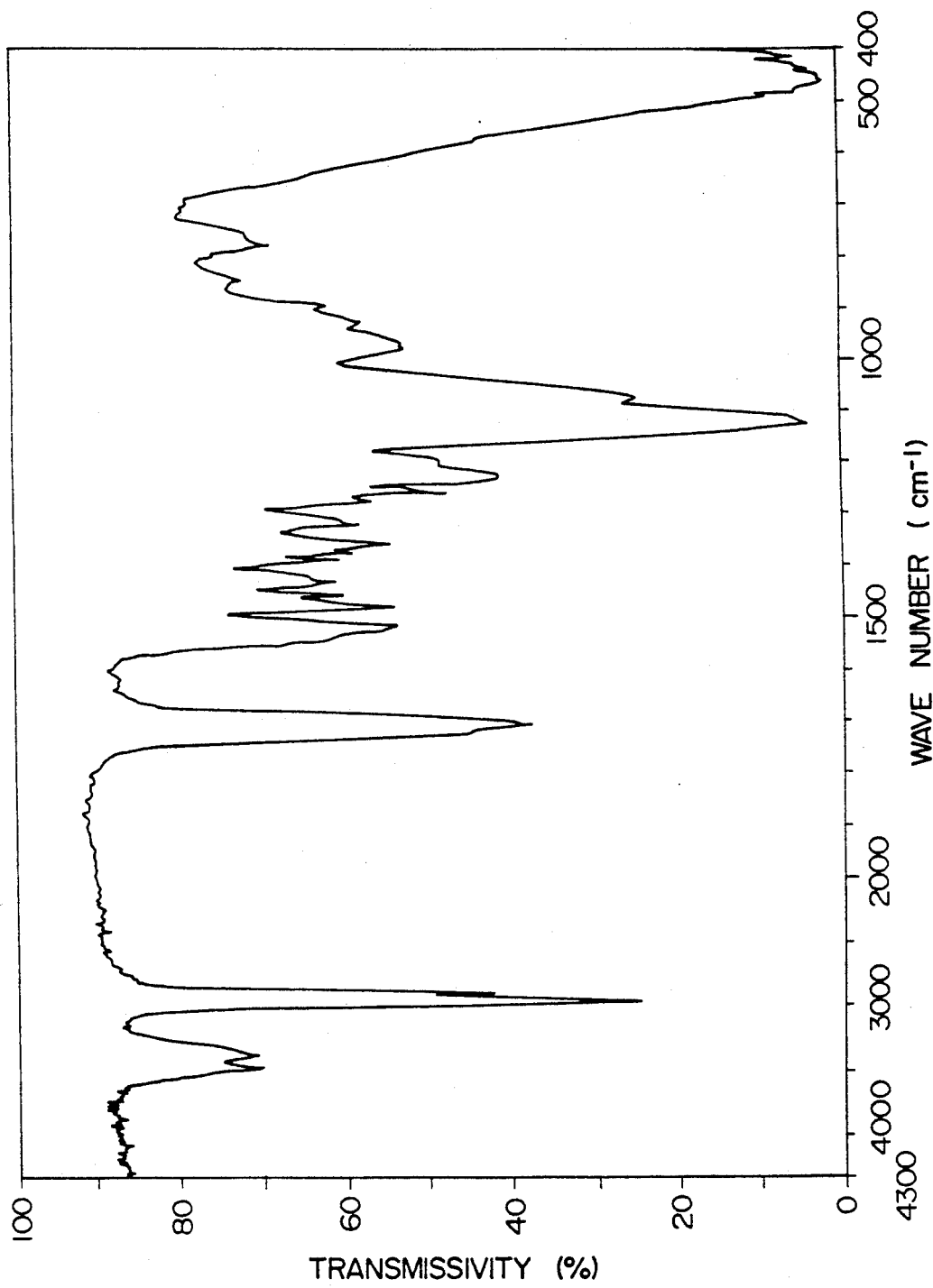
FIG. 6 is an IR spectrum of the fluorine-containing resin obtained in Example 5-1.

The above-obtained copolymer had a number average molecular weight of 8,200, a fluorine content of 22.9%, a hydroxyl value of 51 mgKOH/g and a glass transition temperature of 28° C. FIG. 6 shows the IR spectrum of the obtained fluorine-containing resin.

EXAMPLES 5-2, 5-3 AND 5-4

Fluorine-containing resins were synthesized under the conditions shown in Table 5-1 in the same manner as in Example 5-1 to give the results shown in Table 5-1.

EXAMPLE 5-5

A one-liter stainless steel autoclave equipped with an agitator was flushed with a nitrogen gas three times.

Then, the autoclave was charged with 74 g of 4-hydroxybutyl vinyl ether, 2.0 g of 4-methacryloyloxy-1,2,2,6,6-pentamethylpiperidine, 86 g of isobutyl vinyl ether, 176 g of chlorotrifluoroethylene, 336 g of xylene and 4.2 g of octanoyl peroxide as an initiator, and the monomers were polymerized at 73° C. for 8 hours. After the polymerization, unreacted chlorotrifluoroethylene was removed, the autoclave was opened, and the formed copolymer solution was withdrawn. The copolymer solution was subjected to reprecipitation with n-hexane, and the resultant copolymer was dried. The yield of the copolymer was 317 g.

The above-obtained copolymer had a number average molecular weight of 7,600, a fluorine content of 25.4%, a hydroxyl value of 105 mgKOH/g and a glass transition temperature of 21° C. This copolymer is referred to as Copolymer A-5.

A solution of 100 g of Copolymer 5-A in 111 g of xylene, 11 g of cyclohexyl isocyanate and 20 ppm (based on the solids content) of dibutyltin laurate as a catalyst were mixed, and the resultant mixture was allowed to react at 80° C. for 4 hours until the disappearance of NCO group was confirmed by infrared absorption spectrum (IR).

The resultant fluorine-containing resin solution had a solids content of 50%, a number average molecular weight of 9,300 and a resin content hydroxyl value of 51 mgKOH/g.

EXAMPLE 5-6

A fluorine-containing resin was synthesized under the conditions shown in Table 5-1 in the same manner as in Example 5-5 to give the results shown in Table 5-1.

COMPARATIVE EXAMPLE 5-1

A fluorine-containing resin wa synthesized under the conditions shown in Table 5-1 in the same manner as in Example 5-1 to give the results shown in Table 5-1.

COMPARATIVE EXAMPLE 5-2

A fluorine-containing resin was synthesized under the conditions shown in Table 5-1 in the same manner as in Example 5-1 to give the results shown in Table 5-1.

TABLE 5-1

| | | Example No. | | | |
|---|---|---|---|---|---|
| | | 5-1 | 5-2 | 5-3 | 5-4 |
| Charged components | CHI | 25 g | 38 g | | 25 g |
| | IPDI-B Note 1) | | | | |
| | n-Hi | | | | |
| | BTL Note 2) | | | | |
| | CHBVE | | | 48.2 g | |
| | CTFE | 117.0 g | 117.0 g | 116.5 g | 117.0 g |
| | HBVE | 49 g | 65 g | 25.5 g | 49 g |
| | PMPN | 1.3 g | | 0.48 g | 3 g |
| | TMPN | | 2.5 g | | |
| | IBVE | 57.0 g | 43.0 g | 57.8 g | 58.0 g |
| | HEMA | | | | 9 g |
| | IBMA | | | | 24 g |
| | FOME | | | | 9 g |
| | Perbutyl PV | | | 1.49 g | 4.6 g |
| | OPO | 2.8 g | 2.8 g | | |
| | K$_2$CO$_3$ | | | 7.7 g | |
| | Xylene | (74 g) 175 g | (103 g) 163 g | 250 g | (74 g) 220 g |
| | Temperature °C. 4) | (80) 73 | (80) 73 | 67 | (80) 67 |
| | Time hr 4) | (6) 8 | (6) 8 | 8 | (6) 8 |
| | Fluorine content | 22.9 wt % | 21.4 wt % | | 21.3 wt % |
| | Solids content concentration | | | | |
| | Yield | 238 g | 252 g | 237.0 g | |
| | Hydroxyl value Note 3) | 51 | 60 | 51 | 55 |
| | Molecular weight Mn | 8,200 | 8,900 | 12,300 | 10,000 |
| | Distribution Mw/Mn | | | 4.18 | |
| | Tg °C. | 28 | 32 | 31 | 40 |
| | IR chart No. | FIG. 6 | | | |

| | | Example No. | | | |
|---|---|---|---|---|---|
| | | 5-5 | | | |
| | Copolymer | 5-A | 5-6 | Comparative Example 5-1 | Comparative Example 5-2 |
| Charged components | CHI | | 5-A 100 g 11 g | 5-A 100 g | 5-A 100 g |
| | IPDI-B Note 1) | | | 26 g | |
| | n-HI | | | | 11 g |
| | BTL | | 200 ppm | 200 ppm | 200 ppm |
| | CHBVE | | | | |
| | CTFE | 176 g | | 117 g | |
| | HBVE | 74 g | | 23 g | |
| | PMPN | 2.0 g | | | |
| | TMPN | | | | |
| | IBVE | 86 g | | 80 g | |
| | HEMA | | | | |
| | IBMA | | | | |
| | FOME | | | | |
| | Perbutyl PV | | | | |
| | OPO | 4.2 g | | 2.8 g | |
| | K$_2$CO$_3$ | | | 7.7 g | |
| | Xylene | 336 g | 111 g | 126 g | 220 g | 111 g |
| | Temperature °C. 4) | 73 | 80 | 80 | 73 | |
| | Time hr 4) | 8 | 4 | 4 | 8 | |
| | Fluorine content | 25.4 wt % | | | 25.9 | |
| | Solids content concentration | | 50% | 50% | | 50% |
| | Yield | 317 g | | 212 g | | |

TABLE 5-1-continued

| | | | | | |
|---|---|---|---|---|---|
| Hydroxyl value Note 3) | 105 | 51 | 43 | 46 | 51 |
| Molecular weight Mn | 7,600 | 9,300 | 10,600 | 8,100 | 8,800 |
| Distribution Mw/Mn | | | | | |
| Tg °C. | 21 | | | 21 | |
| IR chart No. | | | | | |

Note
1) Half blocked product of IPDI with isobutyl alcohol
2) Value based on isocyanate
3) Unit: mmKOH/g
4) Reaction conditions for urethanation in parentheses

EXAMPLES 5-7 to 5-12

The fluorine-containing resins obtained in Examples 5-1 to 5-6, which had been adjusted to a solids content of 50% with xylene, were used as a polyol. These resin solutions were respectively mixed with "Duranate TPA" supplied by Asahi Chemical Industry Co., Ltd.) as a curing agent such that the NCO/OH ratio was 1/1. The resultant compositions were adjusted to a viscosity of 15 seconds by a Ford cup #4 with xylene as a diluent, and applied to form coatings. The coatings were baked at 120° C. for 1 hour and evaluated for their coating properties (coating appearance, coating gloss, flexibility, adhesion (Al) and weatherability).

Further, the fluorine-containing resins obtained in Examples 5-1 to 5-6, which had been adjusted to a solids content of 50%, were respectively charged into glass bottles and the bottles tightly closed. Then the resin solutions in the bottles were kept at 50° C. for days to observe changes in their viscosities and evaluate their storage stability.

Table 5-2 shows the properties of these tests. Even after 30 days, almost no change occurred in the viscosity, i.e., the storage stability was excellent.

COMPARATIVE EXAMPLE 5-3, 5-4 AND 5-5

The fluorine-containing resins obtained in Comparative Examples 5-1 and 5-2 and the Copolymer 5-A, which had all been adjusted to a solids content of 50% with xylene, were used as a main agent. These resin solutions were respectively mixed with "Durante TPA" curing agent such that the NCO/OH ratio was 1/1. The resultant compositions were adjusted to a viscosity of 15 seconds by a Ford cup #4 with xylene as a diluent, and applied to form coatings. The coatings were baked at 120° C. for 1 hour and evaluated for their coating properties (coating appearance, coating gloss, flexibility, adhesion (Al) and weatherability). The fluorine-containing resins obtained in Comparative Examples 5-1 and 5-2 and Copolymer 5-A, which had been adjusted to a solids content of 50%, were respectively charged into bottles and the bottles tightly closed. Then the resin solutions in the bottles were kept at 50° C. for 30 days to observe changes in their viscosities and evaluate their storage stability.

Table 5-2 shows the results of these tests.

TABLE 5-2

| | | Physical properties of coating | | | | | | |
|---|---|---|---|---|---|---|---|---|
| Example | Main agent | Coating[1] appearance | Coating[2] gloss | Coating hardness | Flexi-[3] bility | Adhesion (Al) | Weather-[4] ability | Storage[5] stability |
| Example 5-7 | Resin from Example 5-1 | ○ | 84% | 134 | ○ | 10 | ○ | 1.1 |
| Example 5-8 | Resin from Example 5-2 | ○ | 86% | 138 | ○ | 8 | ○ | 1.0 |
| Example 5-10 | Resin from Example 5-4 | ○ | 89% | 140 | ○ | 8 | ○ | 1.0 |
| Example 5-11 | Resin from Example 5-5 | ○ | 84% | 134 | ○ | 10 | ○ | 1.1 |
| Example 5-12 | Resin from Example 5-6 | ○ | 86% | 138 | ○ | 10 | ○ | 1.1 |
| Example 5-9 | Resin from Example 5-3 | ○ | 84% | | ○ | 10 | ○ | 1.0 |
| Comparative Example 5-3 | Resin from Comparative Example 5-1 | Δ→○ | 81% | 110 | ○ | 6 | ○ | Gelation |
| Comparative Example 5-4 | Resin from Comparative Example 5-2 | ○ | 83% | 90 | ○ | 10 | ○ | 1.3 |
| Comparative Example 5-5 | Copolymer 5-A | Δ | * | 105 | ○ | 4 | * | 1.3 |

[1] ○: Excellent transparency, Δ: Slightly opaque, Δ→○: The coating became transparent as curing progressed.
[2] Measured at an incident (light interception) angle of 60° C. according to JIS K-5400.
[3] A sample which did not crack when bent around a 2 mmφ round rod according to JIS K-5400 was taken as ○.
[4] A sample which had a gloss retention ratio of not less than 90% after 3,000 hours under a test with QUV was taken as ○.
[5] A ratio of viscosity after storage for 1 month to viscosity before storage. No curing agent contained.
*Could not be evaluated due to defects in coating appearance.

EXAMPLE 5-13

The resin obtained in Example 5-3 (adjusted to a solids content of 50%) was evaluated for solubility in a solvent and pigment dispersibility in the following manner. Tables 5-3 and 5-4 show the results.

Evaluation on Solubility in Solvent n-Hexane or mineral spirit was added little by little to 1 g of sample, and the amount (mL) of the solvent added until the mixture became opaque was measured.

Evaluation on Pigment Dispersibility

A 200 ml glass bottle was charged with 48.9 g of sample, 2.9 g of carbon black (MA-100, Mitsubishi Kasei Corp), 8.4 g of solvent (xylene Solvesso 100 (Exxon Chemical Japan LTD.)=1/1) and 50 ml of 3 mm$\phi$ glass beads, and these were dispersed with a paint shaker (Red Devil Inc.). After 2 hours or 4 hours, the contents were taken out, the glass beads were removed by filtration with a wire gauze, and the remaining dispersion was coated on a glass plate. The resultant coating was dried at room temperature, and measured for gloss (incident angle 20 degrees).

COMPARATIVE EXAMPLE 5-6 AND 5-7

Commercially available fluorine-containing polyols supplied by A and B Companies were evaluated in the same manner as in Example 5-13. Tables 5-3 and 5-4 show the results. The results show that the fluorine-containing resin of the present invention was excellent in solubility in solvents whether the solvents were high-polar solvents or low-polar solvents. Further, the pigment (carbon black) dispersibility was also excellent even if no dispersion aid was used.

TABLE 5-3

| | Solubility in solvent (dilution value) | | |
|---|---|---|---|
| | Example 5-13 Resin from Example 5-6 | Comparative Example 5-6 Fluorine containing polyol from A company | Comparative Example 5-6 Fluorine containing polyol from B company |
| N-hexane | 30* | x | x |
| Mineral spirit | 40* | x | x |
| Toluene | o | o | o |
| Butyl acetate | o | o | o | o: Not opacified until more than 2000 of dilution value
x: Not dilutable
*: Dilution value = [amount of solvent added up to occurrence of opaque mixture (mL/sample (g)] × 100

TABLE 5-4

| | Pigment dispersibility (gloss value) | |
|---|---|---|
| | Example 5-13 Resin from Example 5-6 | Comparative Example 5-6 Fluorine-containing polyol from A company |
| 2 hours | 37.4% | 20.7% |
| 6 hours | 58.1% | 31.8% |

PREPARATION EXAMPLE 6-1

Preparation of Resin 6-A

A one-liter stainless steel autoclave was charged with 7.7 g of potassium carbonate, and after being flushed with nitrogen, the autoclave was charged with monomers, an initiator and a solvent as shown in Table 6-1. The monomers were polymerized at 67° C. for 8 hours to give Resin 6-A-1 and Resin 6-A-2.

PREPARATION EXAMPLE 6-2

Preparation of Resin 6-B

A one-liter glass reactor was flushed with nitrogen and charged with monomers, an initiator and a solvent as shown in Table 6-2. The monomers were polymerized at 85° C. for 8 hours to give Resin 6-B-1. Resin 2-B-2 and Resin 6-B-3.

PREPARATION EXAMPLE 6-3

Polymerization of Monomers to Constitute Resin 6-A in the Presence of Resin 6-B)

A one-liter stainless steel autoclave was charged with 7.7 g of potassium carbonate and flushed with nitrogen. Then, the autoclave was charged with monomers to constitute (Resin 6-A-1), an initiator and a solvent as shown in Table 6-1, and then with 142 g of a (Resin 6-B-1) solution (solids content 50%/xylene-butyl acetate). These monomers were polymerized at 67° C. for 8 hours to give Resin 6-AB-1.

PREPARATION EXAMPLE 6-4

Polymerization of Monomers to Constitute Resin 6-B in the Presence of Resin 6-A)

A one-liter glass reactor was flushed with nitrogen, and then charged with 125 g of a product prepared by concentrating a (Resin 6-A) solution (solids content 50%/xylene) up to a solids content of 80%. Then, the reactor was charged with monomers to constitute (Resin 6-B-3), an initiator and a solvent as shown in Table 6-2 and 150 g of heptane, and these monomers were polymerized at 85° C. for 8 hours. Thereafter, 25 g of n-butyl acetate was added, and the resultant mixture was gradually cooled to room temperature to give Resin 6-AB-2. This resin solution was an opaline, stable dispersion having a solids content of 50%.

EXAMPLES 6-1 TO 6-7

Resins and resin mixtures having compositions shown in Table 6-3-(a) were evaluated for their coating performances. Table 6-3(b) shows the results.

TABLE 6-1

| | | Resin 6-A-1 | Resin 6-A-2 |
|---|---|---|---|
| Monomers | CTFE | 117 g | 117 g |
| | HBVE | 23 g | 23 g |
| | IBVE | 50 g | 50 g |
| | CHBVE | — | 38 g |
| | DHF | 21 g | — |
| BPOPV | | 2.4 g | 2.4 g |
| Xylene | | 213 g | 230 g |
| Number average molecular weight | | 7,000 | 9,000 |
| Hydroxyl value | | 53 | 50 |

| | | Resin 6-B-1 | Resin 6-B-2 | Resin 6-B-3 |
|---|---|---|---|---|
| Monomers | MMA | 17 g | 16 g | 14 g |
| | CHMA | 40 g | 35 g | 40 g |
| | HEMA | 20 g | 35 g | 20 g |
| | BMA | 20 g | 15 g | 20 g |
| | TMPM | 3 g | 3 g | 3 g |
| | HMPB | — | 1 g | — |
| | FOEM | — | — | 3 g |
| AIBN | | 1 g | 2 g | 2 g |
| Xylene | | 50 g | 70 g | 50 g |
| Butyl acetate | | 50 g | 30 g | 50 g |

TABLE 6-1-continued

| | | | |
|---|---|---|---|
| Number average molecular weight | 15,000 | 9,000 | 10,000 |

TABLE 6-3 (A)

| | Example | | | | | | |
|---|---|---|---|---|---|---|---|
| Example | 6-1 | 6-2 | 6-3 | 6-4 | 6-5 | 6-6 | 6-7 |
| Resin 6-A-1 | 50 | 75 | | | 75 | | |
| Resin 6-A-2 | | | 50 | 25 | | | |
| Resin 6-B-1 | 50 | | 50 | 75 | | | |
| Resin 6-B-2 | | 25 | | | | | |
| Resin 6-B-3 | | | | | 25 | | |
| Resin 6-AB-1 | | | | | | 100 | |
| Resin 6-AB-2 | | | | | | | 100 |

Figures: % by weight

TABLE 6-4 (B)

| | Example | | | | | | |
|---|---|---|---|---|---|---|---|
| Example | 6-1 | 6-2 | 6-3 | 6-4 | 6-5 | 6-6 | 6-7 |
| Coating performance | | | | | | | |
| Compatibility | ○ | ○ | ○ | ○ | ○ | ○ | ○ |
| Gloss | 90 | 87 | 88 | 91 | 87 | 87 | 88 |
| Carbon black[1] | ○ | ○ | ○ | ○ | ○ | ○ | ○ |
| Quinacridone[2] Red | ○ | ○ | ○ | ○ | ○ | ○ | ○ |
| Magic Ink Red | ○ | ○ | ○ | ○ | ○ | ○ | ○ |
| Weather-[3] ability | ○ | ○ | ○ | ○ | ○ | ○ | ○ |
| Water[4] repellency | 88′ | 91′ | 86′ | 83′ | 102′ | 88′ | 101′ |

[1], [2]Evaluation of pigment dispersibility.
[1]PWC = 5% [2]PWC = 12%.
[3]Gloss retention ratio after 3,000 hours with QUV not less than 90%: ○, Less than 90%: x.
[4]Contact angle of water.

As shown in Table 6-3, the resins according to the present invention were excellent in all performances including such as compatibility, resin dispersibility and weatherability.

EXAMPLES 7-1 AND 7-2

A one-liter stainless steel autoclave was charged with 7.7 g of potassium carbonate, and flushed with nitrogen. Then, the autoclave was charged with monomers, an initiator and a solvent as shown in Table 7, and the monomers were polymerized at 67° C. for 8 hours. After the polymerization, the autoclave was opened, and the formed copolymer solution was withdrawn. After potassium carbonate was removed by filtration, the copolymer solution was subjected to reprecipitation with n-hexane, and the resultant copolymer was dried.

EXAMPLES 7-3 AND 7-4

The fluorine-containing copolymers obtained in Examples 7-1 and 7-2, which had been adjusted to a solids content of 50% with xylene, were used as a polyol for paint. These copolymers were respectively mixed with "Duranate PTA" (supplied by Asahi Chemical Industry Co., Ltd.) such that the NCO/OH ratio was 1/1, and the resultant compositions were respectively adjusted to a viscosity of 15 seconds by a Ford cup #4 with xylene as a diluent and applied to form coatings. The coatings were baked at 120° C. for 1 hour, and measured for coating properties (coating appearance, coating gloss, weatherability, water repellency and oil repellency).

Table 7-2 shows the results.

REFERENCE EXAMPLES

A one-liter stainless steel autoclave was charged with 7.7 g of potassium carbonate, and flushed with nitrogen. Then, the autoclave was charged with monomers, an initiator and a solvent shown in Table 7-1, and the monomers were polymerized at 87° C. for 8 hours. After the polymerization, the autoclave was opened, and the formed copolymer solution was withdrawn. After potassium carbonate was removed by filtration, the copolymer solution was subjected to reprecipitation with n-hexane, and the copolymer was dried. Table 7-1 shows the results for this copolymer.

The fluorine-containing copolymers obtained in Referential Example, which had been adjusted to a solids content of 50%, were used as a polyol. These copolymers were respectively mixed with "Duranate TPA" (supplied by Asahi Chemical Industry Co., Ltd.) as a curing agent such that the NCO/OH ratio was 1/1. The resultant compositions were adjusted to a viscosity of 15 seconds by a Ford cup #4 with xylene as a diluent, and applied to form coatings. The coatings were baked at 120° C. for 1 hour and measured for coating properties (coating appearance, gloss, weatherability, water repellency and oil repellency).

Table 7-2 shows the results.

TABLE 7-1

| | | Example 7-1 | Example 7-2 | Referential Example |
|---|---|---|---|---|
| Monomers | CTFE | 89 g | 80 g | 117 g |
| | HBVE | 18 g | 16 g | 23 g |
| | IBVE | 38 g | 34 g | 50 g |
| | CHBVE | — | 50 g | — |
| | DHF | 16 g | — | 21 g |
| | FOEM | — | 4 g | — |
| | FOEA | 8 g | — | — |
| | IBMA | 20 g | 10 g | — |
| | HEMA | 7 g | 2 g | — |
| | MMA | 5 g | 4 g | — |
| | BPOPV | 3.1 g | 1.4 g | 1.7 g |
| Xylene | | — | 200 g | — |
| Butyl acetate | | 200 g | — | 211 g |
| Number average molecular weight | | 7700 | 8600 | 8600 |
| Hydroxyl value | | 60 | 48 | 52 |

TABLE 7-2

| | | Coating properties | | | | |
|---|---|---|---|---|---|---|
| Example | Polyol | Coating[1] appearance | Coating[2] gloss | Weather-[3] ability | Water[4] repellency | Oil[5] repellency |
| Example 7-3 | Resin from Example 7-1 | ○ | 89% | ○ | 101° | 44° |
| Example 7-4 | Resin from Example 7-2 | ○ | 86% | ○ | 102° | 47° |
| Referential Example | Resin from Referential | ○ | 83% | ○ | 93° | 4° |

TABLE 7-2-continued

| | | Coating properties | | | | |
|---|---|---|---|---|---|---|
| Example | Polyol | Coating[1] appearance | Coating[2] gloss | Weather-[3] ability | Water[4] repellency | Oil[5] repellency |
| | Example | | | | | |

[1]○: Excellent transparency
[2]Measured at an incident (light interception) angle of 60° according to JIS K-5400.
[3]A sample which had a gloss retention ratio of not less than 90% after 3,000 hours under a test with QUV was taken as ○.
[4]Contact angle of water.
[5]Contact angle of tetradecane.

As shown in Table 7-2, the resins according to the present invention were excellent in all performances including compatibility, gloss and weatherability; and moreover had remarkably improved water and oil repellency.

EXAMPLE 8

A one-liter stainless steel autoclave equipped with an agitator was charged with 7.7 g of potassium carbonate, and flushed with a nitrogen gas three times.

Then, the autoclave was charged with 0.48 g of 4-methacryloyloxy-1,2,2,6,6-pentamethylpiperidine, 28 g of 4-hydroxydibutyl vinyl ether, 63 g of a reaction product of cyclohexyl isocyanate and 4-hydroxybutyl vinyl ether, 50 g of isobutyl vinyl ether, 117 g of chlorotrifluoroethylene, 258 g of xylene and 1.7 g of tert-butylperoxypivalate as an initiator, and the polymerization was carried out at 67° C. for 8 hours. Potassium carbonate was removed from the formed copolymer solution by filtration to give a copolymer solution having an APHA color evaluation value of 10 and a nonvolatile content of 50.6%.

The above-obtained copolymer had a number average molecular weight of 10,600. Its dispersion ratio (ratio between weight average molecular weight and number average molecular weight) was as small as 3.6, and gelation, etc., were not observed, i.e., the copolymer was excellent in stability. The copolymer had a fluorine content of 22.2% and a hydroxyl value of 52 mgKOH/g.

EXAMPLE 9-1

A one-liter stainless steel autoclave equipped with an agitator was flushed with a nitrogen gas three times.

Then, the autoclave was charged with 49 g of 4-hydroxybutyl vinyl ether, 25 g of cyclohexyl isocyanate and 74 g of xylene, and the resultant mixture was allowed to react at 80° C. for 6 hours. Then, the autoclave was charged with 1.7 g of crotonic acid, 1.2 g of 4-methacryloyloxy-1,2,2,6,6-pentamethylpiperidine, 56 g of isobutyl vinyl ether, 117 g of chlorotrifluoroethylene, 176 g of xylene and 2.8 g of octanoyl peroxide as an initiator, and polymerization was carried out at 73° C. for 8 hours. After the polymerization, unreacted chlorotrifluoroethylene was removed, the autoclave was opened, and the formed copolymer solution was withdrawn. This copolymer solution was subjected to reprecipitation with n-hexane, and the resultant copolymer was dried. The yield of the copolymer was 228 g.

The above-obtained copolymer had a number average molecular weight of 8,700, a fluorine content of 22.8%, a hydroxyl value of 51 mgKOH/g, an acid value of 5 mgKOH/g and a glass transition temperature of 28° C.

EXAMPLES 9-2 AND 9-3

Fluorine-containing resins were synthesized under conditions shown in Table 8-1 in the same manner as in Example 9-1 to give results shown in Table 8-1.

EXAMPLE 9-4

A one-liter stainless steel autoclave equipped with an agitator was flushed with nitrogen gas three times.

Then, the autoclave was charged with 74 g of 4-hydroxybutyl vinyl ether, 2.6 g of crotonic acid, 2 g of 4-methacryloyloxy-1,2,2,6,6-pentamethylpiperidine, 84 g of isobutyl vinyl ether, 176 g of chlorotrifluoroethylene, 336 g of xylene and 4.2 g of octanoyl peroxide as an initiator, and the polymerization was carried out at 73° C. for 8 hours. After the polymerization, unreacted chlorotrifluoroethylene was removed, the autoclave was opened, and the formed copolymer solution was withdrawn. This copolymer solution was subjected to reprecipitation with n-hexane, and the resultant copolymer was dried. The yield of the copolymer was 314 g.

The above-obtained copolymer had a number average molecular weight of 7,800, a fluorine content of 25.4%, a hydroxyl value of 100 mgKOH/g, an acid value of 5 mgKOH/g and a glass transition temperature of 21° C. This copolymer is referred to as Copolymer 9-A.

A solution of 100 g of Copolymer 9-A in 111 g of xylene, 11 g of cyclohexyl isocyanate and 20 ppm (based on the solids content) of dibutyltin dilaurate as a catalyst were mixed, and the resultant mixture was allowed to react at 80° C. for 4 hours until the disappearance of NCO group was confirmed by infrared absorption spectrum (IR).

The above-obtained fluorine-containing resin solution had a solids content of 50%, a number average molecular weight of 9,500, a resin content hydroxyl value of 51 mgKOH/g and a resin content acid value of 4 mgKOH/g.

EXAMPLE 9-5

A one-liter stainless steel autoclave equipped with an agitator was flushed with a nitrogen gas three times.

Then, the autoclave was charged with 84 g of 4-hydroxybutyl vinyl ether, 38 g of cyclohexyl isocyanate and 187 g of xylene, and the resultant mixture was allowed to react at 80° C. for 6 hours. Then, the autoclave was charged with 17.2 g of crotonic acid, 1.2 g of 4-methacryloyloxy-1,2,2,6,6-pentamethylpiperidine, 8 g of isobutyl vinyl ether, 117 g of chlorotrifluoroethylene, 143 g of xylene and 4.6 g of tert-butylperoxypivalate as an initiator, and the polymerization was carried out at 67° C. for 8 hours. After the polymerization, unreacted chlorotrifluoroethylene was removed, the autoclave was opened, and the formed copolymer solution was withdrawn. This copolymer solution was subjected to reprecipitation with n-hexane, and the resultant copolymer was dried. The yield of the copolymer was 83 g.

The above-obtained copolymer had a number average molecular weight of 7,800, a fluorine content of 17.3%, a hydroxyl value of 72 mgKOH/g, an acid value of 26 mgKOH/g and a glass transition temperature of 32° C.

COMPARATIVE EXAMPLES 9-1 AND 9-2

A fluorine-containing resin was synthesized under the conditions shown in Table 8-1 in the same manner as in Example 9-1 to give the results shown in Table 8-1.

pigment weight concentration (PWC=12%). The mixtures were respectively dispersed with a sand mill for 2 hours, and the resultant dispersions as a polyol were respectively mixed and applied to form coatings in the same manner as above. The degrees of gloss and pigment aggregation were visually determined, and the resins were evaluated on their pigment dispersibility.

Table 8-2 shows the results.

COMPARATIVE EXAMPLES 9-3, 9-4 AND 9-5

The fluorine-containing resins obtained in Comparative Examples 9-1 and 9-2, which had been adjusted to

TABLE 8-1

| | | | | | 9-4 Copolymer 9-A | — | 9-5 | Comparative Example 9-1 | Comparative Example 9-2 |
|---|---|---|---|---|---|---|---|---|---|
| | | 9-1 | 9-2 | 9-3 | | | | | |
| Charged components | CHI | 25 g | 38 g | 25 g | | 9-A 100 g 11 g 20 ppm | 38 g | | |
| | BTL Note 1) | | | | | | | | |
| | CTFE | 117.0 g | 117.0 g | 117.0 g | 176 g | | 117 g | 117 g | 117 g |
| | HBVE | 49 g | 65 g | 49 g | 74 g | | 84 g | 23 g | 23 g |
| | 2,3-DHF | | | | | | | | |
| | PMPN | 1.2 g | | | 2.0 g | | | | |
| | TMPN | | 1.2 g | | | | 1.2 g | | |
| | Triethylamine | | | | | | | | |
| | IBVE | 56.0 g | 38.0 g | 57.8 g | 84 g | | 8 g | 80 g | 78 g |
| | Crotonic acid | 1.7 g | 5.2 g | 1.7 g | 2.6 g | | 17.2 g | | 1.7 g |
| | Methyl maleate | | | | | | | | |
| | Perbutyl PV | | | | | | 4.6 g | | |
| | OPO | 2.8 g | 2.8 g | 2.8 g | 4.2 g | | | 2.8 g | 2.8 g |
| | $K_2CO_3$ | | | 7.7 g | | | | 7.7 g | 7.7 g |
| | Xylene Note 2) | (74 g) 176 g | (103 g) 161 g | (74 g) 176 g | 336 g | 111 g | (187 g) 143 g | 220 g | 220 g |
| | Temperature °C. Note 2) | (80) 73 | (80) 73 | (80) 73 | 73 | 80 | (80) 67 | 73 | 73 |
| | Time hr Note 2) | (6) 8 | (6) 8 | (6) 8 | 8 | 4 | (6) 8 | 8 | 8 |
| | Fluorine content | 22.8 wt % | 21.4 wt % | 22.8 wt % | 25.4 wt % | | 17.3 wt % | 25.9 wt % | 25.9 wt % |
| | Solids content concentration | | | | | 50% | | | |
| | Hydroxyl value Note 3) | 51 | 56 | 51 | 100 | 51 | 72 | 46 | 51 |
| | Yield | 228 g | 239 g | 238 g | 314 g | | 283 g | 212 g | 212 g |
| | Acid value Note 4) | 5 | 13 | 1.1 | 5 | 4 | 26 | 0 | 1.2 |
| | Molecular weight Mn | 8,700 | 8,200 | 9,400 | 7,800 | 9,500 | 7,800 | 8,100 | 7,800 |
| | Tg °C. | 28 | 32 | 28 | 21 | | 32 | 21 | 21 |

Note
1) Value based on isocyanate
2) Reaction conditions for urethanation in parentheses
3) Unit: mgKOH/g
4) Unit: mgKOH/g

EXAMPLES 9-6, 9-7, 9-8 AND 9-9

The fluorine-containing resins obtained in Examples 9-1 to 9-4 were respectively adjusted to a solids content of 50% with xylene, and used as a polyol. These resins were respectively mixed with "Duranate TPA" (supplied by Asahi Chemical Industry Co., Ltd.) as a curing agent such that the NCO/OH ratio was 1/1. The resultant compositions were respectively adjusted to a viscosity of 15 seconds by a Ford cup #4 with xylene as a diluent, and applied to form coatings. The coatings were baked at 120° C. for 1 hour, and evaluated for coating properties (coating appearance, coating gloss, coating hardness, flexibility, adhesion (Al) and weatherability).

Further, the fluorine-containing resins obtained in Examples 9-1 to 9-4 were respectively adjusted to a solids content of 50% with xylene, and mixed with a pigment (Quinacridone Red) to obtain a predetermined pigment weight concentration (PWC=12%). The mixtures were respectively a solids content of 50% with xylene, and Copolymer 9-A were used as a polyol. These resins were respectively mixed with "Duranate TPA" (supplied by Asahi Chemical Industry Co., Ltd.) as a curing agent such that the NCO/OH ratio was 1/1. The resultant compositions were respectively adjusted to a viscosity of 15 seconds by Ford cup #4 with xylene as a diluent, and applied to form coatings. The coatings were baked at 120° C. for 1 hour, and evaluated for coating properties (coating appearance, coating gloss, coating hardness, flexibility, adhesion (Al) and weatherability).

Further, the fluorine-containing resins obtained in Comparative Examples 9-1 and 9-2, which had been adjusted to a solids content of 50%, and Copolymer 9-A were respectively mixed with a pigment (Quinacridone Red) to obtain a predetermined pigment weight concentration (PWC=12%). The mixtures were respectively dispersed with a sand mill for 2 hours, and the resultant dispersions as a main agent were respectively mixed and applied to form coatings in the same manner as above. The degrees of gloss and pigment aggregation were visually determined, and the resins were evaluated for their pigment dispersibility.

Table 8-2 shows the results.

EXAMPLES 10-2–10-4

Fluorine-containing resins were synthesized under the conditions shown in Table 10-1 in the same manner as in Example 10-1 to give the results shown in Table 9-1.

TABLE 8-2

| Example | Main agent | Physical properties | | | | | | Pigment dispersibility (Quinacridone Red) |
|---|---|---|---|---|---|---|---|---|
| | | Coating 1) appearance | Coating 2) gloss | Coating hardness | Flexibility 3) | Adhesion (A1) | Weatherability 4) | |
| Example 9-6 | Resin from Example 9-1 | ○ | 84% | 134 | ○ | 10 | ○ | ○ |
| Example 9-7 | Resin from Example 9-2 | ○ | 86% | 138 | ○ | 10 | ○ | ⊙ |
| Example 9-8 | Resin from Example 9-3 | ○ | 84% | 135 | ○ | 10 | ○ | ○ |
| Example 9-9 | Resin from Example 9-4 | ○ | 84% | 134 | ○ | 10 | ○ | ○ |
| Comparative Example 9-3 | Resin from Comparative Example 9-1 | Δ→○ | 81% | 110 | ○ | 6 | ○ | x |
| Comparative Example 9-4 | Resin from Comparative Example 9-2 | Δ→○ | 80% | 108 | ○ | 10 | ○ | Δ |
| Comparative Example 9-5 | Copolymer 9-A | Δ | * | 105 | ○ | 4 | * | x |

1) ○: Excellent transparency, Δ: Slightly opaque, Δ→○: The coating became transparent as curing progressed.
2) Measured at an incident (light interception) angle of 60° C. according to JIS K-5400.
3) A sample which did not crack when bent around a 2 mmφ round rod according to JIS K-5400 was taken as ○.
4) A sample which had a gloss retention ratio of not less than 90% after 3,000 hours under a test with QUV was taken as ○.
*Could not be evaluated due to defects in coating appearance.

As is again clear from the above results, according to the present invention, there can be easily produced a fluorine-containing resin which is soluble in an organic solvent, excellent in compatibility with a curing agent and affinity to various fillers such as a pigment and a reinforcing material, and cold-curable.

Further, this fluorine-containing resin also has high affinity to an aqueous medium and is useful as a material for an aqueous fluorine-based coating composition.

EXAMPLE 10-1

A one-liter stainless steel autoclave equipped with an agitator was flushed with nitrogen gas three times.

Then, the autoclave was charged with 1.7 g of crotonic acid, 14 g of 2,3-dihydrofuran, 1.2 g of 4-methacryloyloxy-1,2,2,6,6-pentamethylpiperidine, 23 g of 4-hydroxybutyl vinyl ether, 38 g of isobutyl vinyl ether, 14 g of ethyl vinyl ether, 117 g of chlorotrifluoroethylene, 209 g of butyl acetate and 1.7 g of tert-butylperoxypivalate as an initiator, and polymerization was carried out at 67° C. for 8 hours. After the polymerization, unreacted chlorotrifluoroethylene was removed, the autoclave was opened, and the formed copolymer solution was withdrawn. This copolymer solution was subjected to reprecipitation with n-hexane, and the resultant copolymer was dried. The yield of the copolymer was 200 g.

The above-obtained copolymer had a number average molecular weight of 10,600, a fluorine content of 27.3%, a hydroxyl value of 54 mgKOH/g, an acid value of 6 mgKOH/g and a glass transition temperature of 38° C.

COMPARATIVE EXAMPLES 10-1 AND 10-2

Fluorine-containing resins were synthesized under the conditions shown in Table 10-1 in the same manner as in Example 10-1 to give the results shown in Table 9-1.

TABLE 9-1

Figure 7A:
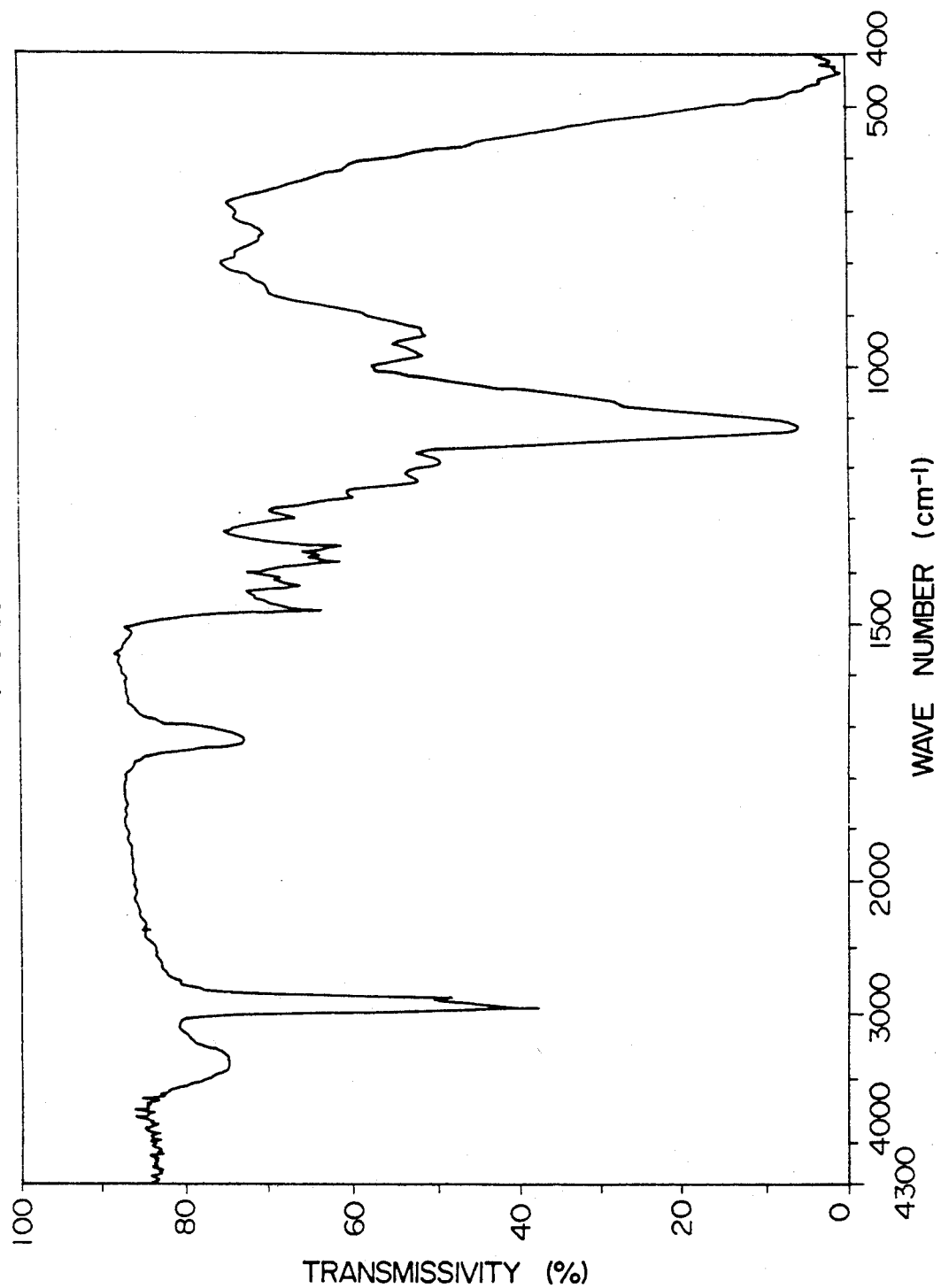
FIG. 7A is an infrared absorption spectrum of the fluorine-containing copolymer obtained in Example 10-2.

| | Example No. | | |
|---|---|---|---|
| | 10-1 | 10-2 | 10-3 |
| CTFE | 117.0 g | 117.0 g | 117.0 g |
| HBVE | 23 g | 23 g | 23 g |
| 2,3-DHF | 14 g | 14 g | 14 g |
| PMPN | 1.2 g | 1.2 g | |
| Triethylamine | | | |
| EVE | 14 g | 14 g | 14 g |
| IBVE | 38.0 g | 34.0 g | 34.0 g |
| Crotonic acid | 1.7 g | 5.2 g | 5.2 g |
| Methyl maleate | | | |
| BPOPV | 1.7 g | 1.7 g | 1.7 g |
| K$_2$CO$_3$ | | | 7.7 g |
| Xylene | | | |
| Butyl acetate | 209 g | 209 g | 208 g |
| Temperature °C. | 67 | 67 | 67 |
| Time hr | 8 | 8 | 8 |
| Fluorine content | 27.3 wt % | 27.3 wt % | 27.3 wt % |
| Hydroxyl value Note 1) | 54 | 55 | 58 |
| Acid value Note 2) | 6 | 16 | 4 |
| Yield | 200 g | 190 g | 197 g |
| Molecular weight Mn | 10,600 | 9,200 | 11,700 |
| Tg °C. | 38 | 39 | 39 |
| IR chart No. | | FIG. 7A | FIG. 7B |

| | Example No. | |
|---|---|---|
| | Comparative | Comparative |

TABLE 9-1-continued

|  | 10-4 | Example 10-1 | Example 10-2 |
|---|---|---|---|
| CTFE | 117.0 g | 117.0 g | 117.0 g |
| HBVE | 46 g | 23 g | 23 g |
| 2,3-DHF | 14 g |  |  |
| PMPN | 2.4 g |  | 1.2 g |
| Triethylamine |  |  |  |
| EVE |  | 14 g | 14 g |
| IBVE | 19 g | 60 g | 58 g |
| Crotonic acid | 1.7 g |  | 1.7 g |
| Methyl maleate |  |  |  |
| BPOPV | 3.4 g | 1.7 g | 1.7 g |
| $K_2CO_3$ |  | 7.7 g |  |
| Xylene |  | 215 g |  |
| Butyl acetate | 216 g |  | 215 g |
| Temperature °C. | 67 | 67 | 67 |
| Time hr | 8 | 8 | 8 |
| Fluorine content | 25.3 wt % | 26.0 wt % | 26.5 wt % |
| Hydroxyl value Note 1) | 107 | 46 | 52 |
| Acid value Note 2) | 46 | 0 | 5 |
| Yield | 173 g | 200 g | 190 g |
| Molecular weight Mn | 6,000 | 9,300 | 9,200 |
| Tg °C. | 38 | 24 | 25 |
| IR chart No. |  |  |  |

Note 1) Unit: mgKOH/g 2) Unit mgKOH/g

EXAMPLES 10-5–10-7

The fluorine-containing copolymers obtained in Examples 10-1 to 10-3 were respectively adjusted to a solids content of 50% with xylene, and used as a polyol. These copolymers were respectively mixed with "Duranate TPA" (supplied by Asahi Chemical Industry Co., Ltd.) as a curing agent such that the NCO/OH ratio was 1/1. The resultant compositions were respectively adjusted to a viscosity of 15 seconds by a Ford cup #4 with xylene as a diluent, and applied to form coatings. The coatings were baked at 120° C. for 1 hour, and evaluated for coating properties (coating appearance, coating gloss, coating hardness, flexibility, adhesion (Al) and weatherability).

Further, the fluorine-containing copolymers obtained in Examples 10-1 to 10-3 were respectively adjusted to a solids content of 50% with xylene, and mixed with a pigment (Quinacridone Red) to obtain a predetermined pigment weight concentration (PWC=12%). The mixtures were respectively dispersed with a sand mill for 2 hours, and the resultant dispersions as a polyol were respectively mixed and applied to form coatings in the same manner as above. The degrees of gloss and pigment aggregation were visually determined, and the resins were evaluated for their pigment dispersibility.

Table 9-2 shows the results.

COMPARATIVE EXAMPLES 10-3 AND 10-4

The fluorine-containing copolymers obtained in Comparative Examples 10-1 and 10-2, which had been adjusted to a solids content of 50% with xylene, were used as a polyol. These copolymers were respectively mixed with "Duranate TPA" (supplied by Asahi Chemical Industry Co., Ltd.) as a curing agent such that the NCO/OH ratio was 1/1. The resultant compositions were respectively adjusted to a viscosity of 15 seconds by a Ford cup #4 with xylene as a diluent, and applied to form coatings. The coatings were baked at 120° C. for 1 hour, and evaluated for coating properties (coating appearance, coating gloss, coating hardness, flexibility, adhesion (Al) and weatherability).

Further, the fluorine-containing resins obtained in Comparative Examples 10-1 and 10-2, which had been adjusted to a solids content of 50%, were respectively mixed with a pigment (Quinacridone Red) to obtain a predetermined pigment weight concentration (PWC=12%). The mixtures were respectively dispersed with a sand mill for 2 hours, and the resultant dispersions as a polyol were respectively mixed and applied to form coatings in the same manner as above. The degrees of gloss and pigment aggregation were visually determined, and the resins were evaluated for their pigment dispersibility.

Table 9-2 shows the results.

TABLE 9-2

|  |  | Physical properties | | | | | | Pigment dispersibility |
|---|---|---|---|---|---|---|---|---|
| Example | Polyol | Coating[1] appearance | Coating[2] gloss | Coating hardness | Flexi-[3] bility | Adhesion (Al) | Weather-[4] ability | (Quniacridone Red) |
| Example 10-5 | Resin from Example 10-1 | ○ | 84% | 138 | ○ | 10 | ○ | ○ |
| Example 10-6 | Resin from Example 10-2 | ○ | 84% | 138 | ○ | 10 | ○ | ⊚ |
| Example 10-7 | Resin from Example 10-3 | ○ | 83% | 135 | ○ | 10 | ○ | ⊚ |
| Comparative Example 10-3 | Resin from Comparative Example 10-1 | Δ→○ | 81% | 110 | ○ | 6 | ○ | x |
| Comparative Example 10-4 | Resin from Comparative Example 10-2 | Δ→○ | 82% | 109 | ○ | 10 | ○ | Δ |

[1]○: Excellent transparency, Δ: Slightly opaque, Δ→○: The coating became transparent as curing progressed.
[2]Measured at an incident (light interception) angle of 60° C. according to JIS K-5400.
[3]A sample which did not crack when bent around a 2 mmφ round rod according to JIS K-5400 was taken as ○.
[4]A sample which had a gloss retention ratio of not less than 90% after 3,000 hours under a test with QUV was taken as ○.

As is again clear from the above results, according to the present invention, there can be easily produced a fluorine-containing copolymer which is soluble in an organic solvent, excellent in compatibility with a curing agent and affinity to various fillers such as a pigment and a reinforcing material, and cold-curable.

Further, this fluorine-containing copolymer also has high affinity to an aqueous medium and is useful as a material for an aqueous fluorine-based coating composition.

EXAMPLE 11-1

A one-liter stainless steel autoclave equipped with an agitator was charged with 7.7 g of potassium carbonate, and flushed with nitrogen gas three times.

Then, the autoclave was charged with 7 g of glycidyl acryl ether, 23 g of 4-hydroxybutyl butyl ether, 14 g of 2,3-dihydrofuran, 14 g of ethyl vinyl ether, 34 g of isobutyl vinyl ether, 117 g of chlorotrifluoroethylene, 209 g of butyl acetate and 1.7 g of tert-butylperoxypivalate as an initiator, and polymerization was carried out at 67° C. for 8 hours. After the polymerization, unreacted chlorotrifluoroethylene was removed, the autoclave was opened, and the formed fluorine-containing resin solution was withdrawn. After potassium carbonate was removed by filtration, this fluorine-containing resin solution was subjected to reprecipitation with n-hexane, and the resultant fluorine-containing resin was dried. The yield of the fluorine-containing resin was 197 g.

The above-obtained fluorine-containing resin had a number average molecular weight of 9,800, a fluorine content of 27.3%, a hydroxyl value of 54 mgKOH/g and an epoxy value of 0.28 mmol/g. This resin is referred to as Resin 11-A.

50 Grams of Resin 11-A was dissolved in 50 g of butyl acetate, and then 1.7 g of bis(hydroxyethyl)sulfide and 0.8 g of acetic acid were added. The resultant mixture was allowed to react at 80° C. for 2 hours to give a nonaqueous fluorine-containing resin solution having a nonvolatile (NV) content of 50.7%. This nonaqueous fluorine-containing resin has a number average molecular weight of 10,600.

EXAMPLES 11-2 AND 11-3

Fluorine-containing resins were synthesized under conditions shown in Table 11-1 in the same manner as in Example 11-1 to give the results shown in Table 10-1.

EXAMPLE 11-4

100 Grams of glycidyl vinyl ether was dissolved in 282 g of butyl acetate, and then 122 g of bis(hydroxyethyl)sulfide and 60 g of acetic acid were added. The resultant mixture was allowed to react at 50° C. for 2 hours. This is referred to as Monomer A solution.

Thereafter, a fluorine-containing resin was synthesized in the same manner as in Example 11-1 under the conditions shown in Table 10-1 to give the results shown in Table 10-1.

TABLE 10-1

| | | Example No. | | | |
|---|---|---|---|---|---|
| | | 11-1 | 11-2 | 11-3 | 11-4 |
| Charged components | Resin | 11-A | 11-A 50 g | 11-A 50 g | 11-A 50 g | |
| | CHI | | | | | |
| | CTFE | 117 g | | | | 117 g |
| | HBVE | 23 g | | | | 23 g |
| | 2,3-DHF | 14 g | | | | 21 g |
| | EVE | 14 g | | | | |
| | IBVE | 34 g | | | | 44 g |
| | GlyAE | 7 g | | | | |
| | GlyVE | | | | | |
| | Monomer A solution | | | | | 34 g |
| Charged components | Perbutyl PV | 1.7 g | | | | 1.7 g |
| | OPO | 1.7 g | | | | 1.7 g |
| | K₂CO₃ | 7.7 g | | | | 7.7 g |
| | bis(hydroxyethyl) sulfide | | 1.7 g | | | |
| | Triethylamine | | | 1.4 g | | |
| | Triphenyl phosphine | | | | 3.6 g | |
| | Diethylsulfide | | | | | |
| | Dibutylamine | | | | | |
| | Acetic acid | | 0.8 g | | 0.8 g | |
| | Lactic acid | | | 1.3 g | | |
| | Hydrochloric acid | | | | | |
| | Xylene | | | | | |
| | Butyl acetate | 209 g | 50 g | 50 g | 50 g | 205 g |
| | Temperature °C. Note 1) | 67 | 80 | 80 | 80 | 67 |
| | Time hr Note 1) | 8 | 2 | 2 | 2 | 8 |
| | Fluorine content | 27.3 wt % | | | | 25.8 wt % |
| | Yield | 197 g | | | | 207 g |
| | Solids content concentration | | 50.7% | 50.6% | 51.3% | |
| | Hydroxyl value Note 2) | 54 | | | | 52 |
| | Epoxy value Note 3) | 0.28 | | | | |
| | Number average molecular weight | 9,800 | 10,600 | 10,300 | 11,300 | 10,400 |

Note
1) Reaction conditions for urethanation in parentheses.
2) Unit: mgKOH/g
3) Unit: mmol/g

EXAMPLES 11-5-11-8

The fluorine-containing resin solutions obtained in Examples 11-1 to 11-3 and the fluorine-containing resin obtained in Example 11-4 were respectively adjusted to a solids content of 50% with xylene, and the resultant solutions as a polyol were respectively mixed with "Duranate TPA" (supplied by Asahi Chemical Industry Co., Ltd.) as a curing agent such that the NCO/OH ratio was 1/1. The resultant compositions were respectively adjusted to a viscosity of 15 seconds by a Ford cup #4 with xylene as a diluent, and applied to form coatings. The coatings were baked at 120° C. for 1 hour, and evaluated for coating properties such as coating appearance, coating gloss, coating hardness, flexibility, adhesion (Al) and weatherability.

Further, the fluorine-containing resin solutions obtained in Examples 11-1 to 11-3 and the fluorine-containing resin obtained in Example 11-4 were respectively adjusted to a solids content of 50% with xylene, and mixed with pigments (Quinacridone Red and carbon black) to obtain a predetermined pigment weight concentration (Quinacridone Red; PWC=12%, carbon black; PWC=5%). The mixtures were respectively dispersed with a sand mill for 2 hours, and the resultant dispersions as a polyol were respectively mixed and applied to form coatings in the same manner as above. The degrees of gloss and pigment aggregation were visually determined, and the resins were evaluated for their pigment dispersibility.

Table 10-2 shows the results.

TABLE 10-2

| Example | Main agent | Coating[1] appearance | Coating[2] gloss | Flexi-[3] bility | Adhesion (Al) | Weather-[4] ability | Pigment dispersibility (Quinacridone Red) | Carbon black |
|---|---|---|---|---|---|---|---|---|
| Example 11-5 | Resin from Example 11-1 | ○ | 84% | ○ | ○ | 10 | ○ | ○ |
| Example 11-6 | Resin from Example 11-2 | ○ | 84% | ○ | ○ | 10 | ○ | ○ |
| Example 11-7 | Resin from Example 11-3 | ○ | 86% | ○ | ○ | 10 | ○ | ○ |
| Example 11-8 | Resin from Example 11-4 | ○ | 84% | ○ | ○ | 10 | ○ | ○ |

[1] ○: Excellent transparency, Δ: Slightly opaque, Δ→○: The coating became transparent as curing progressed.
[2] Measured at an incident (light interception) angle of 60° according to JIS K-5400.
[3] A sample which did not crack when bent around a 2 mmφ round rod according to JIS K-5400 was taken as ○.
[4] A sample which had a gloss retention ratio of not less than 90% after 3,000 hours under a test with QUV was taken as ○.

As is again clear from the above results, according to the present invention, there can be easily produced a fluorine-containing resin which is soluble in an organic solvent, excellent in compatibility with a curing agent and affinity to various fillers such as a pigment and a reinforcing material, and cold-curable.

EXAMPLE 12-1

A one-liter stainless steel autoclave equipped with an agitator was charged with 7.7 g of potassium carbonate, and nitrogen gas was substituted for air in the autoclave three times.

Then, the autoclave was charged with 29% of DHDMPO, 17 g of HBVE, 37 g of IBVE, 85 g of CTFE, 1.8 g of 2,2'-azobis-(2,2-dimethylvaleronitrile) and 168 g of xylene, and the temperature inside the autoclave was gradually increased up to 65° C. After polymerization was carried out for 8 hours, unreacted CTFE was removed, the autoclave was opened, and the formed copolymer solution was withdrawn. After potassium carbonate was removed by filtration, the copolymer solution was subjected to reprecipitation with n-hexane, and the resultant copolymer was dried. The yield of the copolymer was 106 g.

The above-obtained copolymer had a number average molecular weight of 10,000, a glass transition temperature of 23° C. and a hydroxyl value of 88 mgKOH/g.

Figure 8:
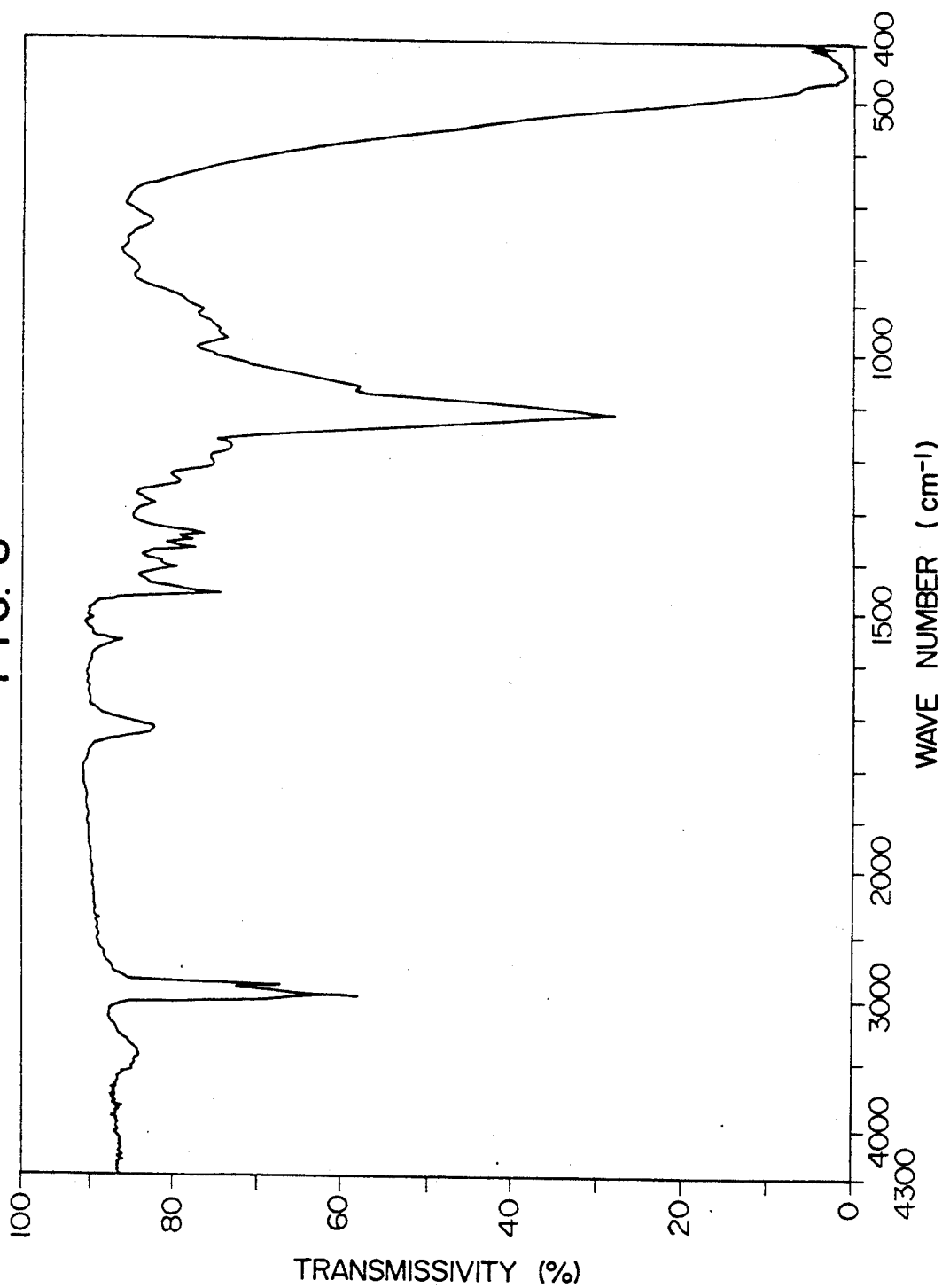
FIG. 8, FIG. 9 and FIG. 10 are IR spectra of copolymers obtained in Example 12-1, Example 12-2 and Example 12-3, respectively.

FIG. 8 shows the IR spectrum of the above copolymer, in which an absorption of an endocyclic C=O stretching derived from the DHDMPO unit is observed at 1,730 cm$^{-1}$.

EXAMPLES 12-2 AND 12-3

Fluorine-containing resins were synthesized in the same manner as in Example 12-1 under conditions shown in Table 12-1 to give the results shown in Table 12-1.

Figure 9:
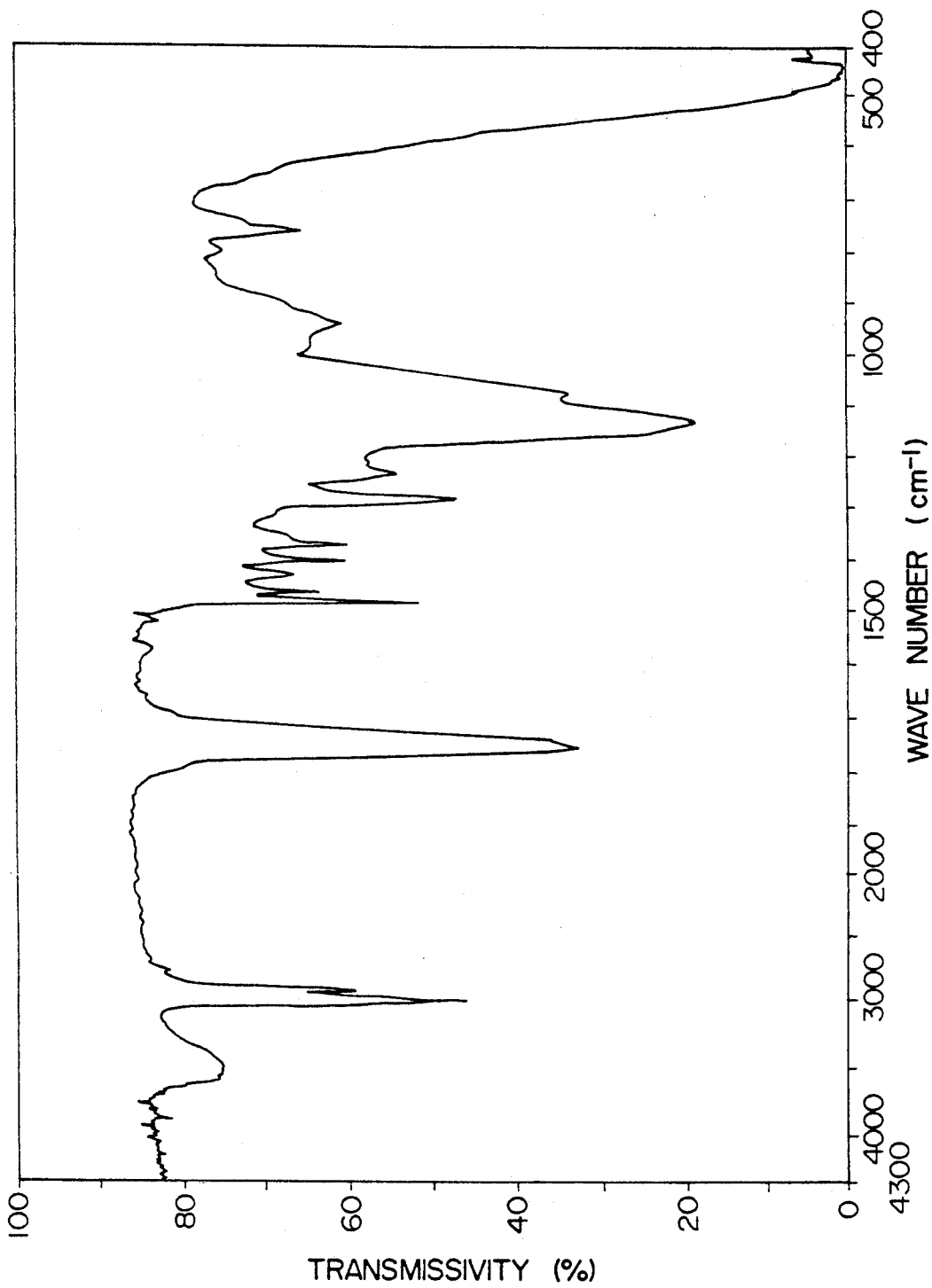
Figure 10:
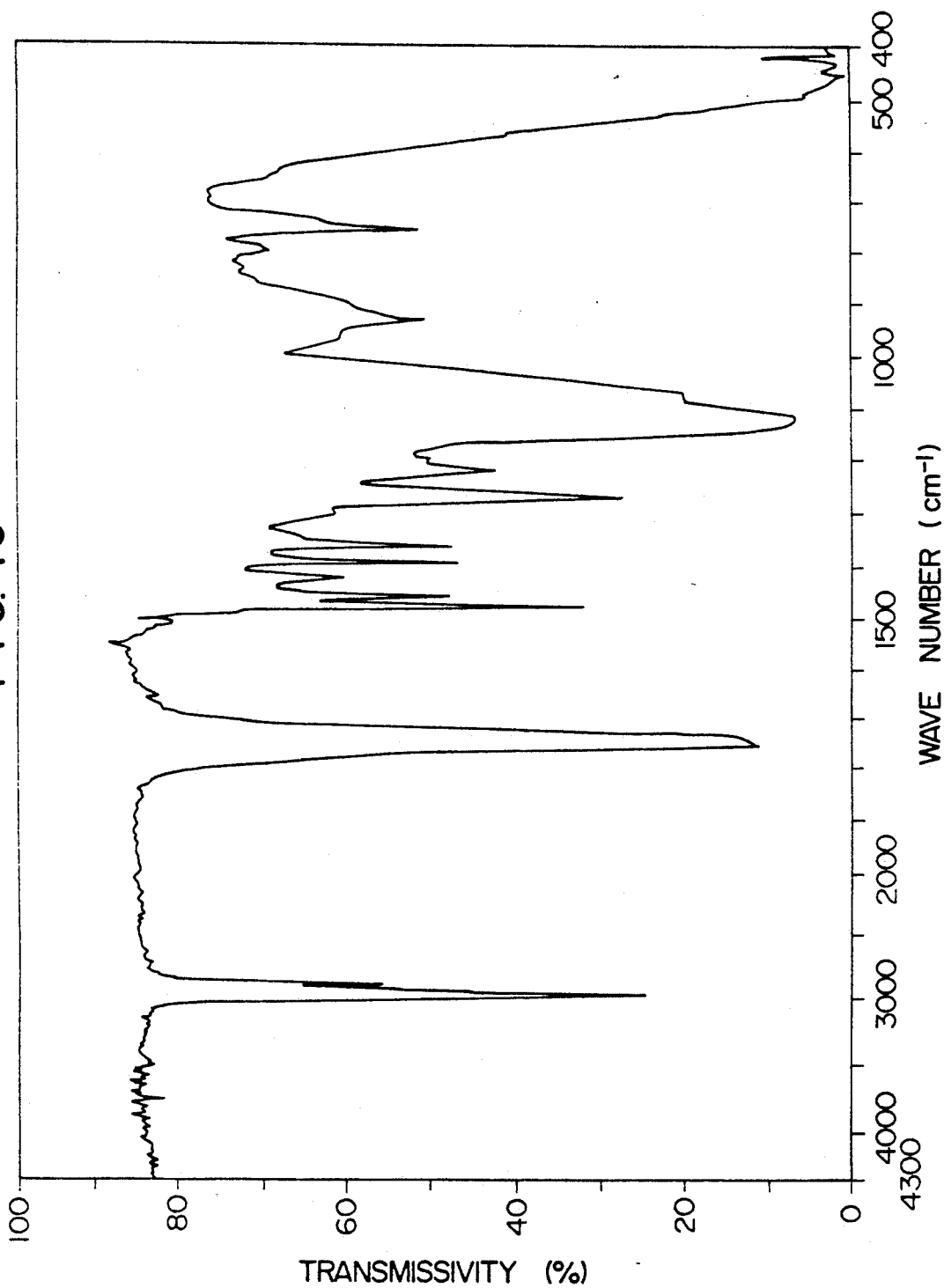

FIGS. 9 and 10 show IR spectra of the copolymers.

TABLE 11-1

| | Example No. | | |
|---|---|---|---|
| | 12-1 | 12-2 | 12-3 |
| CTFE | 85 g | 46.6 g | 46.6 g |
| HBVE | 17 g | 9.3 g | |
| DHDMPO | 29 g | 15.1 g | 15.1 g |
| VPv | | 25.6 g | 35.9 g |
| EVE | | | |
| IBVE | 37 g | | |
| ADVN | 1.8 g | | |
| Perbutyl PV OPO | | 0.97 g | 0.97 g |
| $K_2CO_3$ | 7.7 g | 3.1 g | |
| Xylene | 168 g | 96.6 g | 97.6 g |
| Butyl acetate | | | |
| Temperature °C. | 65 | 67 | 67 |
| Time hr | 8 | 8 | 8 |
| Fluorine content | | | |
| Yield | 106 g | 68.3 g | 65.2 g |
| Solids content concentration | | | |
| Hydroxyl value Note 2) | 68 | 60 | |
| Number average molecular weight | 10,000 | 5,000 | 4,500 |
| Tg | 23 | 37 | 42 |
| IR chart No. | FIG. 8 | FIG. 9 | FIG. 10 |

EXAMPLE 12-4

10 Grams of each of the fluorine-containing copolymers obtained in Examples 12-1 and 12-2 was, separately from other, dissolved in 10 g of xylene, and the resultant mixtures were respectively mixed with "Duranate TPA" (supplied by Asahi Chemical Industry Co., Ltd.) as a curing agent such that the NCO/OH ratio was 1/1. The resultant compositions were respectively adjusted to a viscosity of 15 seconds by a Ford cup #4 with xylene as a diluent, and applied to give rigid coatings having excellent transparency and gloss.

EXAMPLE 12-5

The fluorine-containing copolymer obtained in Example 12-3 was adjusted to a viscosity of 15 seconds by a Ford cup #4 with xylene as a diluent, and applied to give rigid coatings having excellent transparency and gloss.

INDUSTRIAL UTILIZATION

According to the present invention, without any limitation from the kind of a fluoroolefin used, there can be provided a fluorine-containing copolymer which is excellent in solubility in an organic solvent and which is, moreover, excellent in compatibility with a curing agent and cold-curable.

Under moderate conditions, the fluorine-based coating composition containing the above fluorine-containing copolymer as a main component, provided by the present invention, can give a coating having good gloss, rigidity and excellent weatherability.

Further, the fluorine-based coating composition containing the above fluorine-containing resin, provided by the invention, can be suitably applied to substrates of metal materials, inorganic materials such as glass and concrete and organic materials including plastics such as FRP, polyethylene, polypropylene, an ethylene-propylene copolymer, nylon, an acrylic resin, polyester, an ethylene-polyvinyl alcohol copolymer, polyvinyl chloride and polyvinylidene chloride and wood.

For example, the fluorine-based coating composition of the present invention is useful as a baking paint for color steel plates, color aluminum plates and aluminum sashes, or as a cold-drying coating composition applicable at the site.

Further, the fluorine-based coating composition of the present invention is also useful in specific use on aluminum pools, exterior type colored glass, cement roof tiles, automotive top coats, aluminum sashes and the like.

Furthermore, the fluorine-containing resin of the present invention can be imparted with functions such as storage stability, pigment dispersibility, hydrophilic nature (water-solubility), adhesion of a coating, water and oil repellency, and the like.

We claim:

1. A fluorine-containing resin comprising:
   Component A: 20 to 95 mol % of a unit of the following general formula,

wherein each of V, X, Y and Z is, independently of the others, H, F, Cl, an alkyl group having 1 to 6 carbon atoms, or a halo-substituted alkyl group having 1 to 6 carbon atoms, and at least one of these is F, and one or both of
   Component (B): 0 to 80 mol % of a unit of the following general formula,

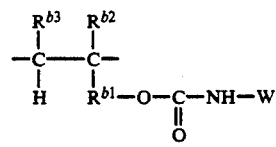

wherein W is a monovalent organic group having a cyclic hydrocarbon group, $R^{b1}$ is a divalent organic group, and each of $R^{b2}$ and $R^{b3}$ is, independently of the other, a hydrogen atom or an alkyl group having 1 to 8 carbon atoms, and
   Component (C): 0 to 80 mol % of a unit of the following formula,

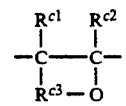

wherein each of $R^{c1}$ and $R^{c2}$ is, independently of the other, hydrogen, an aliphatic hydrocarbon group having 1 to 8 carbon atoms or an alicyclic hydrocarbon group, is a divalent group which can have any substituent, provided that the amounts of components (B) and (C) are not simultaneously zero.

2. A fluorine-containing resin according to claim 1, which further contains at least one of:
   Component (D): not more than 40 mol % of a copolymer unit formed from a vinyl monomer having a functional group, and
   Component (E): not more than 40 mol % of a copolymer unit formed from a vinyl monomer other than the Components (A), (B), (C) and (D).

3. A fluorine-containing resin according to claim 1, which further contains:
   Component (T): not more than 95% by weight, based on the total resin amount, of an acrylic resin having, in the molecule, a functional group capable of absorbing ultraviolet light and/or a functional group capable of preventing oxidation and/or a functional group capable of binding a radical.

4. A fluorine-containing resin according to claim 2, which further contains:
   Component (T): not more than 95% by weight, based on the total resin amount, of an acrylic resin having, in the molecule, a functional group capable of absorbing ultraviolet light and/or a functional group capable of preventing oxidation and/or a functional group capable of binding a radical.

5. A fluorine-containing resin according to claim 1, wherein Component (A) is a copolymer unit formed from fluoroethylene and/or fluoropropene.

6. A fluorine-containing resin according to claim 5, wherein the fluoroethylene is chlorotrifluoroethylene.

7. A fluorine-containing resin according to claim 1, wherein the monovalent organic group having a cyclic hydrocarbon group in Component (B) is a saturated cyclic hydrocarbon group.

8. A fluorine-containing resin according to claim 1, wherein —R$^{c3}$— Component (C) is a divalent saturated hydrocarbon group.

9. A fluorine-containing resin according to claim 2 or 4, wherein Component (D) is a copolymer unit formed from a hydroxyalkyl vinyl ether.

10. A fluorine-containing resin according to claim 2 or 4, wherein Component (E) is a copolymer unit formed from an alkyl vinyl ether.

11. A fluorine-containing resin according to claim 2 or 4, wherein Component (E) is a copolymer unit formed from a vinyl monomer having a fluoroalkyl group.

12. A fluorine-containing resin according to claim 11, wherein the vinyl monomer having a fluoroalkyl group is a (meth)acrylate monomer having a fluoroalkyl group.

13. A fluorine-containing resin according to claim 2 or 4, wherein Component (D) is a copolymer unit formed from a vinyl monomer having a 2,2,6,6-tetrasubstituted piperidinyl group.

14. A fluorine-containing resin according to claim 13, wherein the vinyl monomer having 2,2,6,6-tetrasubstituted piperidinyl group is a compound of the following general formula,

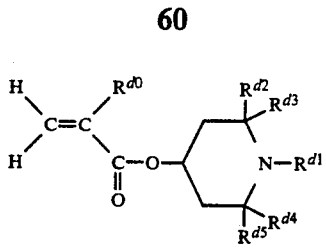

wherein R$^{d0}$ is hydrogen or methyl, R$^{d1}$ is an alkyl group having 1 to 18 carbon atoms or an acyl group having 1 to 18 carbon atoms, and each of R$^{d2}$, R$^{d3}$, R$^{d4}$ and R$^{d5}$ is, independently of the others, an alkyl group having 1 to 18 carbon atoms.

15. A fluorine-containing resin according to claim 2 or 4, wherein Component (D) is a copolymer unit formed from a vinyl monomer having at least one selected from a carboxyl group, an alkylammonium salt of a carboxyl group and an alkali metal salt of a carboxyl group.

16. A fluorine-containing resin according to claim 15, wherein the vinyl monomer is crotonic acid, an alkylammonium salt of crotonic acid or an alkali metal salt of crotonic acid.

17. A fluorine-containing resin according to claim 2 or 4, wherein Component (D) is a copolymer unit formed from a vinyl monomer having an epoxy group.

18. A fluorine-containing resin according to claim 2 or 4, wherein Component (D) is a copolymer unit formed from a vinyl monomer having an onium ion.

19. A fluorine-containing resin according to claim 18, wherein the onium ion is an onium ion derived from an epoxy group and an amino compound.

20. A fluorine-containing resin according to claim 18, wherein the onium ion is an onium ion derived from an epoxy group and a phosphine compound.

21. A fluorine-containing resin according to claim 18, wherein the onium ion is an onium ion derived from an epoxy group and a sulfide compound.

22. A coating composition containing the fluorine-containing resin recited in any one of claims 1 to 8.

* * * * *